US010904815B2

(12) United States Patent
Zhang et al.

(10) Patent No.: US 10,904,815 B2
(45) Date of Patent: Jan. 26, 2021

(54) METHOD FOR TRANSMITTING CONFIGURATION MESSAGE AND APPARATUS

(71) Applicant: Huawei Technologies Co., Ltd., Shenzhen (CN)

(72) Inventors: Liangliang Zhang, Beijing (CN); Bo Lin, Beijing (CN); Hao Bi, Rolling Meadows, IL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 93 days.

(21) Appl. No.: 15/222,600

(22) Filed: Jul. 28, 2016

(65) Prior Publication Data

US 2016/0338140 A1 Nov. 17, 2016

Related U.S. Application Data

(63) Continuation of application No. PCT/CN2014/071819, filed on Jan. 29, 2014.

(51) Int. Cl.
*H04W 36/34* (2009.01)
*H04W 76/15* (2018.01)
(Continued)

(52) U.S. Cl.
CPC ........... *H04W 36/34* (2013.01); *H04W 76/15* (2018.02); *H04W 76/27* (2018.02); *H04W 88/08* (2013.01)

(58) Field of Classification Search
CPC .... H04W 36/34; H04W 88/08; H04W 76/021
See application file for complete search history.

(56) References Cited

U.S. PATENT DOCUMENTS

2013/0343297 A1 12/2013 Dinan
2014/0192775 A1* 7/2014 Li ........................ H04W 76/15 370/331

(Continued)

FOREIGN PATENT DOCUMENTS

CN 102076031 A 5/2011
CN 102932835 A 2/2013

(Continued)

OTHER PUBLICATIONS

3GPP TS 36.300 V10.11.0 (Sep. 2013); 3rd Generation Partnership Project; Technical Specification Group Radio Access Network; "Evolved Universal Terrestrial Radio Access (E-UTRA) and Evolved Universal Terrestrial Radio Access Network (E-UTRAN)"; Overall description; Stage 2(Release 10); 195 pages.

(Continued)

*Primary Examiner* — Andrew Lai
*Assistant Examiner* — Chuong M Nguyen
(74) *Attorney, Agent, or Firm* — Slater Matsil, LLP

(57) ABSTRACT

A process of transmitting a configuration message is efficiently completed. The solution includes receiving a first message from a first node, where the first message includes a configuration of a second node and/or a dual connectivity configuration, and sending a first reply message to the first node if the configuration in the first message is accepted, so that the first node learns that a user terminal accepts the configuration, or sending a second reply message to the first node if the configuration in the first message is not accepted, so that the first node learns that the user terminal does not accept the configuration; or skipping sending any message to the first node if the configuration in the first message is not accepted.

14 Claims, 12 Drawing Sheets

User terminal

First receiving unit 01

First processing unit 02

(51) Int. Cl.
*H04W 76/27* (2018.01)
*H04W 88/08* (2009.01)

(56) References Cited

U.S. PATENT DOCUMENTS

| | | | | |
|---|---|---|---|---|
| 2015/0351119 | A1* | 12/2015 | Song | H04W 72/1268 370/329 |
| 2015/0351139 | A1* | 12/2015 | Zhang | H04W 88/06 370/329 |
| 2016/0128046 | A1* | 5/2016 | Sebire | H04L 5/001 370/329 |
| 2016/0242224 | A1 | 8/2016 | Liu et al. | |

FOREIGN PATENT DOCUMENTS

| | | | |
|---|---|---|---|
| CN | 103024835 | A * | 4/2013 |
| CN | 103024835 | A | 4/2013 |
| CN | 103139911 | A | 6/2013 |
| CN | 103428727 | A | 12/2013 |
| CN | 104468029 | A | 3/2015 |
| EP | 2421324 | A1 | 2/2012 |
| EP | 2493257 | A1 | 8/2012 |

OTHER PUBLICATIONS

3GPP TS 36.331 V9.17.0 (Dec. 2013); 3rd Generation Partnership Project; Technical Specification Group Radio Access Network; "Evolved Universal Terrestrial Radio Access (E-UTRA)"; Radio Resource Control (RRC); Protocol specification (Release 9); 262 pages.

* cited by examiner

METHOD FOR TRANSMITTING CONFIGURATION MESSAGE AND APPARATUS

CROSS-REFERENCE TO RELATED APPLICATIONS

This application is a continuation of International Application No. PCT/CN2014/071819, filed on Jan. 29, 2014, which is hereby incorporated by reference in its entirety.

TECHNICAL FIELD

The present invention relates to the communications field, and in particular, to a method for transmitting a configuration message and an apparatus.

BACKGROUND

With increasing development of science and technology, data is increasingly frequently exchanged between a base station and user equipment, requirements on quality of data exchange also greatly increase accordingly. To adapt to changes in the communications market and meet requirements of increasing communications services, the 3rd Generation Partnership Project (3GPP) introduces concepts of a base station and a cell, so as to expand coverage of the cell and improve a cell system throughput and spectrum efficiency. This type of communications network in which a macro base station and a micro base station coexist is referred to as a heterogeneous network.

However, in an existing interaction process between a base station and a user terminal, before needing to access a designated base station, the user terminal first needs to acquire radio resource control (RRC) reconfiguration information sent by the base station. If the user terminal performs configuration successfully according to the RRC reconfiguration information, the user terminal sends an RRC reconfiguration complete message to the base station. Correspondingly, if the user terminal performs configuration unsuccessfully, the user terminal initiates a connection reestablishment procedure.

Apparently, in an interaction framework in a heterogeneous network, multiple base stations (including a master base station and a secondary base station) are used to serve a same user terminal. Therefore, if an original method for receiving and sending reconfiguration information is used, a problem about how a newly configured base station learns a configuration result of the user terminal that is performed by using the reconfiguration information cannot be resolved, and further, the newly configured base station cannot determine whether new configuration information can be used to communicate with the user terminal.

SUMMARY

Embodiments provide a method for transmitting a configuration message and an apparatus. All possible configuration results are configured, and a first node and/or a second node are notified of the configuration results. Therefore, a process of transmitting a configuration message is efficiently completed.

According to a first aspect, an embodiment provides a method for transmitting a configuration message, including a first receiving unit, configured to receive a first message from a first node, where the first message includes a configuration of a second node and/or a dual connectivity configuration. The method also includes a first processing unit, configured to send a first reply message to the first node if the configuration in the first message is accepted, so that the first node learns that the user terminal accepts the configuration, send a second reply message to the first node if the configuration in the first message is not accepted, so that the first node learns that the user terminal does not accept the configuration, or skip sending any message to the first node if the configuration in the first message is not accepted.

In a first possible implementation manner of the first aspect, the dual connectivity configuration is a configuration applied to both the first node and the second node.

With reference to the first aspect and the first possible implementation manner of the first aspect, in a second possible implementation manner of the first aspect, the first processing unit is further configured to: send a first reply message to the first node if the configuration in the first message is accepted, so that the first node sends, according to the first reply message, a second message to the second node to indicate that the user terminal accepts the configuration; or send a second reply message to the first node if the configuration in the first message is not accepted, so that the first node sends, according to the second reply message, a third message to the second node to indicate that the terminal does not accept the configuration.

With reference to the first aspect and the first and the second possible implementation manners of the first aspect, in a third possible implementation manner of the first aspect, the first message further includes a configuration of the first node.

With reference to the first aspect and the first to the third possible implementation manners of the first aspect, in a fourth possible implementation manner of the first aspect, the first message further includes the configuration of the first node; and the first processing unit is further configured to: provided that the configuration of the first node in the first message is not accepted, send a second reply message to the first node, so that the first node learns that the user terminal does not accept the configuration; or provided that the configuration of the first node in the first message is not accepted, send a second reply message to the first node, so that the first node sends, according to the second reply message, a third message to the second node to indicate that the terminal does not accept the configuration.

With reference to the first aspect and the first to the third possible implementation manners of the first aspect, in a fifth possible implementation manner of the first aspect, the first processing unit is further configured to: if the configuration of the first node in the first message is not accepted, and the configuration of the second node and/or the dual connectivity configuration are not accepted, send a second reply message to the first node, so that the first node learns that the user terminal does not accept the configuration of the first node in the first message and does not accept the configuration of the second node and/or the dual connectivity configuration; or if the configuration of the first node in the first message is not accepted, but the configuration of the second node is accepted, and/or the dual connectivity configuration is accepted, send a second reply message to the first node, so that the first node learns that the user terminal does not accept the configuration of the first node in the first message but accepts the configuration of the second node and/or accepts the dual connectivity configuration; or if the configuration of the first node in the first message is not accepted, and the configuration of the second node and/or the dual connectivity configuration are not accepted, send a second reply message to the first node, so that the first node sends, according to the second reply message, a second message to the second node to indicate that the terminal does not accept the configuration of the second node and/or the dual connectivity configuration; or if the configuration of the first node in the first message is not accepted, but the configuration of the second node is accepted, and/or the dual connectivity configuration is not accepted, send a second reply message to the first node, so that the first node sends, according to the second reply message, a third message to the second node to indicate that the user terminal does not accept the configuration of the first node in the first message or accepts the configuration of the second node and/or does not accept the dual connectivity configuration; or if the configuration of the first node in the first message is not accepted, but the configuration of the second node is accepted, and/or the dual connectivity configuration is not accepted, send a second reply message to the first node, so that the first node sends, according to the second reply message, a third message to the second node to indicate that the user terminal does not accept the configuration of the first node in the first message but accepts the configuration of the second node and/or accepts the dual connectivity configuration.

With reference to the fourth and the fifth possible implementation manners of the first aspect, in a sixth possible implementation manner of the first aspect, a first sending unit, configured to: send the second reply message to the first node if the configuration of the first node in the first message is not accepted, where the second reply message is a radio resource control (RRC) connection reestablishment request message.

With reference to the first aspect and the first to the sixth possible implementation manners of the first aspect, in a seventh possible implementation manner of the first aspect, the first message further includes the configuration of the first node; and the first sending unit is further configured to: if the configuration of the first node is accepted, and the configuration of the second node is accepted, and/or the dual connectivity configuration is accepted, send a first reply message to the first node, so that the first node learns that the user terminal accepts the configurations; or if the configuration of the first node is accepted, but the configuration of the second node is not accepted, and/or the dual connectivity configuration is not accepted, send a second reply message to the first node, so that the first node learns that the user terminal does not accept the configuration or the configurations.

With reference to the seventh possible implementation manner of the first aspect, in an eighth possible implementation manner of the first aspect, the first sending unit is further configured to: if the configuration of the first node is accepted, and the configuration of the second node is accepted, and/or the dual connectivity configuration is accepted, send a first reply message to the first node, so that the first node learns that the user terminal accepts the configuration of the first node and accepts the configuration of the second node and/or accepts the dual connectivity configuration; or if the configuration of the first node is accepted, but the configuration of the second node is not accepted, and/or the dual connectivity configuration is not accepted, send a second reply message to the first node, so that the first node learns that the terminal device accepts the configuration of the first node but does not accept the configuration of the second node and/or does not accept the dual connectivity configuration; or if the configuration of the first node is accepted, and the configuration of the second node is accepted, and/or the dual connectivity configuration is accepted, send a first reply message to the first node, so that the first node sends, according to the first reply message, a second message to the second node to indicate that the user terminal accepts the configuration of the second node and/or accepts the dual connectivity configuration; or if the configuration of the first node is accepted, but the configuration of the second node is not accepted, and/or the dual connectivity configuration is not accepted, send a second reply message to the first node, so that the first node sends, according to the second reply message, a third message to the second node to indicate that the user terminal does not accept the configuration of the second node and/or does not accept the dual connectivity configuration.

With reference to the seventh and the eighth possible implementation manners of the first aspect, in a ninth possible implementation manner of the first aspect, the first sending unit is further configured to: if the configuration of the first node is accepted, but the configuration of the second node is not accepted, and/or the dual connectivity configuration is not accepted, send a second reply message to the first node, so that the first node learns that the user terminal does not accept the configuration or the configurations, where the second reply message is an RRC connection reconfiguration complete message or an RRC connection reestablishment request message; or if the configuration of the first node is accepted, and the configuration of the second node is accepted, and/or the dual connectivity configuration is accepted, send a first reply message to the first node, so that the first node learns that the user terminal accepts the configurations, where the first reply message is an RRC connection reconfiguration complete message.

With reference to the first aspect and the first to the ninth possible implementation manners of the first aspect, in a tenth possible implementation manner of the first aspect, the first receiving unit is further configured to receive a fourth message sent by the first node, where the fourth message includes at least an updated configuration provided by the second node; and the first sending unit is further configured to: if the updated configuration that is in the fourth message and provided by the second node is accepted, send a first reply message to the first node, so that the first node learns that the user terminal accepts the configuration; or if the updated configuration that is in the fourth message and provided by the second node is not accepted, send a second reply message to the first node, so that the first node learns that the user terminal does not accept the configuration.

With reference to the fourth to the ninth possible implementation manners of the first aspect, in an eleventh possible implementation manner of the first aspect, the first processing unit is further configured to perform one or more of the following: triggering an RRC reestablishment procedure; releasing configurations of all secondary serving cells (Scells); deleting the configurations of all the Scells; releasing configurations of all secondary stations or second stations; deleting the configurations of all the secondary stations or the second stations; resetting media access control (MAC); applying a basic configuration of a primary cell of the first node; triggering an RRC reestablishment procedure; releasing the configuration of the second node and/or the dual connectivity configuration included in the first message; resetting the configuration of the second node and/or the dual connectivity configuration included in the first message; releasing a configuration related to the second node; deleting the configuration related to the second node; communicating with the second node by using a configuration before the first message is received; communicating with the first node by using the configuration before the first message is received; or communicating with the first node by using the configuration of the first node included in the first message.

With reference to the first aspect and the first to the eleventh possible implementation manners of the first aspect, in a twelfth possible implementation manner of the first aspect, the first message further includes a radio resource configuration of the second node, and the radio resource configuration is used by the user terminal to access the second node or synchronize with the second node; the first processing unit is further configured to initiate random access to the second node; and the first sending unit is further configured to: if the random access succeeds, send a third reply message to the first node to indicate that the user terminal successfully accesses the second node and/or the user terminal accepts the configuration; or if the random access fails, send a fourth reply message to the first node to indicate that the user terminal fails to access the second node and/or the user terminal does not accept the configuration.

With reference to the first aspect and the first to the twelfth possible implementation manners of the first aspect, in a thirteenth possible implementation manner of the first aspect, the first message further includes the radio resource configuration of the second node, and the radio resource configuration is used by the user terminal to access the second node or synchronize with the second node; the first processing unit is further configured to initiate random access to the second node; and the first sending unit is further configured to: if the random access succeeds, send a third reply message to the first node to indicate that the user terminal successfully accesses the second node; or if the random access fails, send a fourth reply message to the first node to indicate that the user terminal fails to access the second node.

With reference to the first aspect and the first to the thirteenth possible implementation manners of the first aspect, in a fourteenth possible implementation manner of the first aspect, each of the first reply message to the fourth reply message includes success indication information and/or failure indication information; the success indication information includes at least one or more of the following: reconfiguration success, configuration success, SeNB reconfiguration success, SeNB configuration success, dual connectivity reconfiguration success, dual connectivity configuration success, access success, or random access channel (RACH) success; and the failure indication information includes at least one or more of the following: reconfiguration failure, configuration failure, SeNB reconfiguration failure, SeNB configuration failure, dual connectivity reconfiguration failure, dual connectivity configuration failure, access failure, or RACH failure.

According to a second aspect, an embodiment provides a node, including a second sending unit configured to send a first message to a user terminal, where the first message includes a configuration of a second node and/or a dual connectivity configuration. The second sending unit also includes a second receiving unit, configured to receive a first reply message from the user terminal to learn that the user terminal accepts the configuration, or receive a second reply message from the user terminal to learn that the user terminal does not accept the configuration.

In a first possible implementation manner of the second aspect, the second receiving unit is further configured to receive a fifth message sent by the second node, where the fifth message includes the configuration of the second node and/or the dual connectivity configuration.

With reference to the second aspect and the first possible implementation manner of the second aspect, in a second possible implementation manner of the second aspect, the first message and/or the fifth message further includes a configuration of the first node.

With reference to the second aspect and the first and the second possible implementation manners of the second aspect, in a third possible implementation manner of the second aspect, a first reply message sent by the user terminal is received, where the first reply message is used to indicate: the configuration of the first node is accepted, and the configuration of the second node is accepted, and/or the dual connectivity configuration is accepted; or the configuration of the first node is accepted, but the configuration of the second node is not accepted, and/or the dual connectivity configuration is accepted; or the configuration of the first node is not accepted, and the configuration of the second node is not accepted, and/or the dual connectivity configuration is accepted; or the configuration of the first node is not accepted, but the configuration of the second node is accepted, and/or the dual connectivity configuration is accepted.

With reference to the second aspect and the first to the third possible implementation manners of the second aspect, in a fourth possible implementation manner of the second aspect, the second sending unit is further configured to: if the first reply message is received from the user terminal, send, according to the first reply message, a second message to the second node to indicate a configuration success of the user terminal; or if the second reply message is received from the user terminal, send, according to the second reply message, a third message to the second node to indicate a configuration failure of the user terminal.

With reference to the fourth possible implementation manner of the second aspect, in a fifth possible implementation manner of the second aspect, the configuration success includes a second node configuration success and/or a dual connectivity configuration success; or the configuration failure includes a second node configuration failure and/or a dual connectivity configuration failure.

With reference to the second aspect and the first to the fifth possible implementation manners of the second aspect, in a sixth possible implementation manner of the second aspect, the second receiving unit is further configured to receive a sixth message from the second node, where the sixth message includes an updated configuration provided by the second node; and the second sending unit is further configured to: generate a fourth message according to the updated configuration that is in the sixth message and provided by the second node, and send the fourth message to the user terminal, where the fourth message includes the updated configuration provided by the second node.

With reference to the second aspect and the first to the sixth possible implementation manners of the second aspect, in a seventh possible implementation manner of the second aspect, the node further includes: a second processing unit, configured to determine whether the second reply message sent by the user terminal is received within a first preset time period; where the second sending unit is further configured to: if the second reply message sent by the user terminal is not received within the first preset time period, send a third message to the second node to indicate a configuration failure of the user terminal.

With reference to the second aspect and the first to the seventh possible implementation manners of the second aspect, in an eighth possible implementation manner of the second aspect, the first message includes a radio resource configuration of the second node, and the radio resource configuration is used by the user terminal to access the second node or synchronize with the second node; and the second receiving unit is further configured to: receive a first reply message from the user terminal, where the first reply message is used to indicate that the user terminal successfully accesses the second node and/or the user terminal accepts the configuration; or receive a second reply message from the user terminal, where the second reply message is used to indicate that the user terminal fails to access the second node and/or the user terminal does not accept the configuration.

With reference to the second aspect and the first to the seventh possible implementation manners of the second aspect, in a ninth possible implementation manner of the second aspect, the first message includes a radio resource configuration of the second node, and the radio resource configuration is used by the user terminal to access the second node or synchronize with the second node; and the second receiving unit is further configured to: receive a third reply message from the user terminal, where the third reply message is used to indicate that the user terminal successfully accesses the second node; and/or receive a seventh message from the second node, where the seventh message is used to indicate that the user terminal successfully accesses the second node.

With reference to the second aspect and the first to the seventh possible implementation manners of the second aspect, in a tenth possible implementation manner of the second aspect, the first message includes a radio resource configuration of the second node, and the radio resource configuration is used by the user terminal to access the second node or synchronize with the second node; and the second receiving unit is further configured to: receive a fourth reply message from the user terminal, where the fourth reply message is used to indicate that the user terminal fails to access the second node; and/or receive an eighth message from the second node, where the eighth message is used to indicate that the user terminal fails to access the second node.

With reference to the second aspect and the first to the seventh possible implementation manners of the second aspect, in an eleventh possible implementation manner of the second aspect, the first message includes a radio resource configuration of the second node, and the radio resource configuration is used by the user terminal to access the second node or synchronize with the second node; the second processing unit is further configured to determine whether the fourth reply message sent by the user terminal is received within a second preset time period; and the second sending unit is further configured to: if the fourth reply message sent by the user terminal is not received within the second preset time period, and the third reply message sent by the user terminal is not received within the second preset time period, send a seventh message to the second node to indicate that the user terminal fails to access the second node.

With reference to the second aspect and the first to the eleventh possible implementation manners of the second aspect, in a twelfth possible implementation manner of the second aspect, each of the first reply message to the fourth reply message includes success indication information and/or failure indication information; the success indication information includes at least one or more of the following: reconfiguration success, configuration success, SeNB reconfiguration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, SeNB configuration failure, dual connectivity reconfiguration failure, dual connectivity configuration failure, access failure, or RACH failure.

According to a third aspect, an embodiment provides a node, including: a third sending unit, configured to send a fifth message to a first node, where the fifth message includes a configuration of the second node and/or a dual connectivity configuration; and a third receiving unit, configured to: receive from the first node a second message indicating the configuration success of a terminal device; or receive from the first node a third message indicating the configuration failure of a user terminal.

In a first possible implementation manner of the third aspect, the third sending unit is further configured to send a fifth message to the first node, so that the first node sends a first message to the user terminal according to the fifth message, where the first message and/or the fifth message include the configuration of the second node and/or the dual connectivity configuration.

With reference to the third aspect and the first possible implementation manner of the third aspect. In a second possible implementation manner of the third aspect, the first message and/or the fifth message further include a configuration of the first node.

With reference to the third aspect and the first and the second possible implementation manners of the third aspect, in a third possible implementation manner of the third aspect, the third sending unit is further configured to: generate a sixth message according to the third message, and send the sixth message to the first node, where the sixth message includes an updated configuration provided by the second node.

With reference to the third aspect and the first to the third possible implementation manners of the third aspect, in a fourth possible implementation manner of the third aspect, the fifth message further includes a radio resource configuration of the second node, and the radio resource configuration is used by the user terminal to access the second node or synchronize with the second node.

With reference to the third aspect and the first to the fourth possible implementation manners of the third aspect, in a fifth possible implementation manner of the third aspect, the third receiving unit is further configured to receive random access initiated by the user terminal; and the third sending unit is further configured to: if the random access succeeds, send a seventh message to the first node, so that the first node learns that the user terminal successfully accesses the second node; or if the random access fails, send an eighth message to the first node, where the eighth message is used by the user terminal to learn a failure in access to the second node.

With reference to the third aspect and the first to the fourth possible implementation manners of the third aspect, in a sixth possible implementation manner of the third aspect, the third receiving unit is further configured to receive random access initiated by the user terminal; and the third sending unit is further configured to: if the random access succeeds, send a seventh message to the first node, so that the first node learns that the user terminal successfully accesses the second node; or if the random access fails, send an eighth message to the first node, where the eighth message is used by the user terminal to access the second node unsuccessfully.

With reference to the third aspect and the first to the fourth possible implementation manners of the third aspect, in a seventh possible implementation manner of the third aspect, the third receiving unit is further configured to: receive from the first node a second message indicating an access success of the user terminal; or receive from the first node a third message indicating an access failure of the user terminal; or receive from the first node a second message indicating the configuration success and an access success of the user terminal; or receive from the first node a second message indicating the configuration success and an access failure of the user terminal; or receive from the first node a third message used to instruct to delete a cell the user terminal fails to access, or instruct to delete the second node so that the second node does not communicate with the user terminal any more.

With reference to the third aspect and the first to the seventh possible implementation manners of the third aspect, in an eighth possible implementation manner of the third aspect, the node further includes: a third processing unit, configured to perform one or more of the following: triggering an RRC reestablishment procedure; releasing a configuration and/or context information that are related to the user terminal; deleting the configuration and/or the context information that are related to the user terminal; deleting a secondary cell configuration that is of the second node and related to the terminal, where a secondary cell is a cell that provides a service for the terminal, and the secondary cell is a secondary cell between the user terminal and the second node; releasing the configuration of the second node and/or the dual connectivity configuration included in the fifth message; resetting the configuration of the second node and/or the dual connectivity configuration included in the fifth message; communicating with the user terminal by using a configuration before the first message is received; or triggering an RRC reestablishment procedure of the user terminal on the second node.

With reference to the third aspect and the first to the eighth possible implementation manners of the third aspect, in a ninth possible implementation manner of the third aspect, each of the first reply message to a fourth reply message includes success indication information and/or failure indication information; the success indication information includes at least one or more of the following: reconfiguration success, configuration success, SeNB reconfiguration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, SeNB configuration failure, dual connectivity reconfiguration failure, dual connectivity configuration failure, access failure, or RACH failure.

According to a fourth aspect, this embodiment provides a user terminal, including: a receiver, configured to receive a first message from a first node, where the first message includes a configuration of a second node and/or a dual connectivity configuration; and a processor, configured to: send a first reply message to the first node if the configuration in the first message is accepted, so that the first node learns that the user terminal accepts the configuration; or send a second reply message to the first node if the configuration in the first message is not accepted, so that the first node learns that the user terminal does not accept the configuration; or skip sending any message to the first node if the configuration in the first message is not accepted.

In a first possible implementation manner of the fourth aspect, the dual connectivity configuration is a configuration applied to both the first node and the second node.

With reference to the fourth aspect and the first possible implementation manner of the fourth aspect, in a second possible implementation manner of the fourth aspect, the processor is further configured to: send a first reply message to the first node if the configuration in the first message is accepted, so that the first node sends, according to the first reply message, a second message to the second node to indicate that the user terminal accepts the configuration; or send a second reply message to the first node if the configuration in the first message is not accepted, so that the first node sends, according to the second reply message, a third message to the second node to indicate that the terminal does not accept the configuration.

With reference to the fourth aspect and the first and the second possible implementation manners of the fourth aspect, in a third possible implementation manner of the fourth aspect, the first message further includes a configuration of the first node.

With reference to the fourth aspect and the first to the third possible implementation manners of the fourth aspect, in a fourth possible implementation manner of the fourth aspect, the first message further includes the configuration of the first node; and the processor is further configured to: provided that the configuration of the first node in the first message is not accepted, send a second reply message to the first node, so that the first node learns that the user terminal does not accept the configuration; or provided that the configuration of the first node in the first message is not accepted, send a second reply message to the first node, so that the first node sends, according to the second reply message, a third message to the second node to indicate that the terminal does not accept the configuration.

With reference to the fourth aspect and the first to the third possible implementation manners of the fourth aspect, in a fifth possible implementation manner of the fourth aspect, the processor is further configured to: if the configuration of the first node in the first message is not accepted, and the configuration of the second node and/or the dual connectivity configuration are not accepted, send a second reply message to the first node, so that the first node learns that the user terminal does not accept the configuration of the first node in the first message and does not accept the configuration of the second node and/or the dual connectivity configuration; or if the configuration of the first node in the first message is not accepted, but the configuration of the second node is accepted, and/or the dual connectivity configuration is accepted, send a second reply message to the first node, so that the first node learns that the user terminal does not accept the configuration of the first node in the first message but accepts the configuration of the second node and/or accepts the dual connectivity configuration; or if the configuration of the first node in the first message is not accepted, and the configuration of the second node and/or the dual connectivity configuration are not accepted, send a second reply message to the first node, so that the first node sends, according to the second reply message, a second message to the second node to indicate that the terminal does not accept the configuration of the second node and/or the dual connectivity configuration; or if the configuration of the first node in the first message is not accepted, but the configuration of the second node is accepted, and/or the dual connectivity configuration is not accepted, send a second reply message to the first node, so that the first node sends, according to the second reply message, a third message to the second node to indicate that the user terminal does not accept the configuration of the first node in the first message or accepts the configuration of the second node and/or does not accept the dual connectivity configuration; or if the configuration of the first node in the first message is not accepted, but the configuration of the second node is accepted, and/or the dual connectivity configuration is not accepted, send a second reply message to the first node, so that the first node sends, according to the second reply message, a third message to the second node to indicate that the user terminal does not accept the configuration of the first node in the first message but accepts the configuration of the second node and/or accepts the dual connectivity configuration.

With reference to the fourth aspect and the first to the fifth possible implementation manners of the fourth aspect, in a sixth possible implementation manner of the fourth aspect, the user terminal further includes: a transmitter, configured to: send the second reply message to the first node if the configuration of the first node in the first message is not accepted, where the second reply message is an RRC connection reestablishment request message.

With reference to the fourth aspect and the first to the sixth possible implementation manners of the fourth aspect, in a seventh possible implementation manner of the fourth aspect, the first message further includes the configuration of the first node; and the transmitter is further configured to: if the configuration of the first node is accepted, and the configuration of the second node is accepted, and/or the dual connectivity configuration is accepted, send a first reply message to the first node, so that the first node learns that the user terminal accepts the configurations; or if the configuration of the first node is accepted, but the configuration of the second node is not accepted, and/or the dual connectivity configuration is not accepted, send a second reply message to the first node, so that the first node learns that the user terminal does not accept the configuration or the configurations.

With reference to the seventh possible implementation manner of the fourth aspect, in an eighth possible implementation manner of the fourth aspect, the transmitter is further configured to: if the configuration of the first node is accepted, and the configuration of the second node is accepted, and/or the dual connectivity configuration is accepted, send a first reply message to the first node, so that the first node learns that the user terminal accepts the configuration of the first node and accepts the configuration of the second node and/or accepts the dual connectivity configuration; or if the configuration of the first node is accepted, but the configuration of the second node is not accepted, and/or the dual connectivity configuration is not accepted, send a second reply message to the first node, so that the first node learns that the terminal device accepts the configuration of the first node but does not accept the configuration of the second node and/or does not accept the dual connectivity configuration; or if the configuration of the first node is accepted, and the configuration of the second node is accepted, and/or the dual connectivity configuration is accepted, send a first reply message to the first node, so that the first node sends, according to the first reply message, a second message to the second node to indicate that the user terminal accepts the configuration of the second node and/or accepts the dual connectivity configuration; or if the configuration of the first node is accepted, but the configuration of the second node is not accepted, and/or the dual connectivity configuration is not accepted, send a second reply message to the first node, so that the first node sends, according to the second reply message, a third message to the second node to indicate that the user terminal does not accept the configuration of the second node and/or does not accept the dual connectivity configuration.

With reference to the seventh and the eighth possible implementation manners of the fourth aspect, in a ninth possible implementation manner of the fourth aspect, the transmitter is further configured to: if the configuration of the first node is accepted, but the configuration of the second node is not accepted, and/or the dual connectivity configuration is not accepted, send a second reply message to the first node, so that the first node learns that the user terminal does not accept the configuration or the configurations, where the second reply message is an RRC connection reconfiguration complete message or an RRC connection reestablishment request message; or if the configuration of the first node is accepted, and the configuration of the second node is accepted, and/or the dual connectivity configuration is accepted, send a first reply message to the first node, so that the first node learns that the user terminal accepts the configurations, where the first reply message is an RRC connection reconfiguration complete message.

With reference to the fourth aspect and the first to the ninth possible implementation manners of the fourth aspect, in a tenth possible implementation manner of the fourth aspect, the receiver is further configured to receive a fourth message sent by the first node, where the fourth message includes at least an updated configuration provided by the second node; and the transmitter is further configured to: if the updated configuration that is in the fourth message and provided by the second node is accepted, send a first reply message to the first node, so that the first node learns that the user terminal accepts the configuration; or if the updated configuration that is in the fourth message and provided by the second node is not accepted, send a second reply message to the first node, so that the first node learns that the user terminal does not accept the configuration.

With reference to the fourth possible implementation manner to the ninth possible implementation manners of the fourth aspect, in an eleventh possible implementation manner of the fourth aspect, the processor is further configured to perform one or more of the following: triggering an RRC reestablishment procedure; releasing configurations of all secondary serving cells Scells; deleting the configurations of all the Scells; releasing configurations of all secondary stations or second stations; deleting the configurations of all the secondary stations or the second stations; resetting MAC; applying a basic configuration of a primary cell of the first node; triggering an RRC reestablishment procedure; releasing the configuration of the second node and/or the dual connectivity configuration included in the first message; resetting the configuration of the second node and/or the dual connectivity configuration included in the first message; releasing a configuration related to the second node; deleting the configuration related to the second node; communicating with the second node by using a configuration before the first message is received; communicating with the first node by using the configuration before the first message is received; or communicating with the first node by using the configuration of the first node included in the first message.

With reference to the fourth aspect and the first to the eleventh possible implementation manners of the fourth aspect, in a twelfth possible implementation manner of the fourth aspect, the first message further includes a radio resource configuration of the second node, and the radio resource configuration is used by the user terminal to access the second node or synchronize with the second node; the processor is further configured to initiate random access to the second node; and the transmitter is further configured to: if the random access succeeds, send a third reply message to the first node to indicate that the user terminal successfully accesses the second node and/or the user terminal accepts the configuration; or if the random access fails, send a fourth reply message to the first node to indicate that the user terminal fails to access the second node and/or the user terminal does not accept the configuration.

With reference to the fourth aspect and the first to the twelfth possible implementation manners of the fourth aspect, in a thirteenth possible implementation manner of the fourth aspect, the first message further includes the radio resource configuration of the second node, and the radio resource configuration is used by the user terminal to access the second node or synchronize with the second node; the processor is further configured to initiate random access to the second node; and the transmitter is further configured to: if the random access succeeds, send a third reply message to the first node to indicate that the user terminal successfully accesses the second node; or if the random access fails, send a fourth reply message to the first node to indicate that the user terminal fails to access the second node.

With reference to the fourth aspect and the first to the thirteenth possible implementation manners of the fourth aspect, in a fourteenth possible implementation manner of the fourth aspect, each of the first reply message to the fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, SeNB configuration failure, dual connectivity reconfiguration failure, dual connectivity configuration failure, access failure, or RACH failure.

According to a fifth aspect, an embodiment provides a node, including: a transmitter, configured to send a first message to a user terminal, where the first message includes a configuration of a second node and/or a dual connectivity configuration; and a receiver, configured to: receive a first reply message from the user terminal to learn that the user terminal accepts the configuration; or receive a second reply message from the user terminal to learn that the user terminal does not accept the configuration.

In a first possible implementation manner of the fifth aspect, the receiver is further configured to receive a fifth message sent by the second node, where the fifth message includes the configuration of the second node and/or the dual connectivity configuration.

With reference to the fifth aspect and the first possible implementation manner of the fifth aspect, in a second possible implementation manner of the fifth aspect, the first message and/or the fifth message further includes a configuration of the first node.

With reference to the fifth aspect and the first and the second possible implementation manners of the fifth aspect, in a third possible implementation manner of the fifth aspect, a first reply message sent by the user terminal is received, where the first reply message is used to indicate: the configuration of the first node is accepted, and the configuration of the second node is accepted, and/or the dual connectivity configuration is accepted; or the configuration of the first node is accepted, but the configuration of the second node is not accepted, and/or the dual connectivity configuration is accepted; or the configuration of the first node is not accepted, and the configuration of the second node is not accepted, and/or the dual connectivity configuration is accepted; or the configuration of the first node is not accepted, but the configuration of the second node is accepted, and/or the dual connectivity configuration is accepted.

With reference to the fifth aspect and the first to the third possible implementation manners of the fifth aspect, in a fourth possible implementation manner of the fifth aspect, the transmitter is further configured to: if the first reply message is received from the user terminal, send, according to the first reply message, a second message to the second node to indicate a configuration success of the user terminal; or if the second reply message is received from the user terminal, send, according to the second reply message, a third message to the second node to indicate a configuration failure of the user terminal.

With reference to the fifth aspect and the first to the fourth possible implementation manners of the fifth aspect, in a fifth possible implementation manner of the fifth aspect, the configuration success includes a second node configuration success and/or a dual connectivity configuration success; or the configuration failure includes a second node configuration failure and/or a dual connectivity configuration failure.

With reference to the fifth aspect and the first to the fifth possible implementation manners of the fifth aspect, in a sixth possible implementation manner of the fifth aspect, the receiver is further configured to receive a sixth message from the second node, where the sixth message includes an updated configuration provided by the second node; and the transmitter is further configured to: generate a fourth message according to the updated configuration that is in the sixth message and provided by the second node, and send the fourth message to the user terminal, where the fourth message includes the updated configuration provided by the second node.

With reference to the fifth aspect and the first to the sixth possible implementation manners of the fifth aspect, in a seventh possible implementation manner of the fifth aspect, the node further includes: a processor, configured to determine whether the second reply message sent by the user terminal is received within a first preset time period; where the transmitter is further configured to: if the second reply message sent by the user terminal is not received within the first preset time period, send a third message to the second node to indicate a configuration failure of the user terminal.

With reference to the fifth aspect and the first to the seventh possible implementation manners of the fifth aspect, in an eighth possible implementation manner of the fifth aspect, the first message includes a radio resource configuration of the second node, and the radio resource configuration is used by the user terminal to access the second node or synchronize with the second node; and the receiver is further configured to: receive a first reply message from the user terminal, where the first reply message is used to indicate that the user terminal successfully accesses the second node and/or the user terminal accepts the configuration; or receive a second reply message from the user terminal, where the second reply message is used to indicate that the user terminal fails to access the second node and/or the user terminal does not accept the configuration.

With reference to the fifth aspect and the first to the eighth possible implementation manners of the fifth aspect, in a ninth possible implementation manner of the fifth aspect, the first message includes a radio resource configuration of the second node, and the radio resource configuration is used by the user terminal to access the second node or synchronize with the second node; and the receiver is further configured to: receive a third reply message from the user terminal, where the third reply message is used to indicate that the user terminal successfully accesses the second node; and/or receive a seventh message from the second node, where the seventh message is used to indicate that the user terminal successfully accesses the second node.

With reference to the fifth aspect and the first to the ninth possible implementation manners of the fifth aspect, in a tenth possible implementation manner of the fifth aspect, the first message includes a radio resource configuration of the second node, and the radio resource configuration is used by the user terminal to access the second node or synchronize with the second node; and the receiver is further configured to: receive a fourth reply message from the user terminal, where the fourth reply message is used to indicate that the user terminal fails to access the second node; and/or receive an eighth message from the second node, where the eighth message is used to indicate that the user terminal fails to access the second node.

With reference to the fifth aspect and the first to the tenth possible implementation manners of the fifth aspect, in an eleventh possible implementation manner of the fifth aspect, the first message includes a radio resource configuration of the second node, and the radio resource configuration is used by the user terminal to access the second node or synchronize with the second node; the processor is further configured to determine whether the fourth reply message sent by the user terminal is received within a second preset time period; and the transmitter is further configured to: if the fourth reply message sent by the user terminal is not received within the second preset time period, and the third reply message sent by the user terminal is not received within the second preset time period, send a seventh message to the second node to indicate that the user terminal fails to access the second node.

With reference to the fifth aspect and the first to the eleventh possible implementation manners of the fifth aspect, in a twelfth possible implementation manner of the fifth aspect, each of the first reply message to the fourth reply message includes success indication information and/or failure indication information; the success indication information includes at least one or more of the following: reconfiguration success, configuration success, SeNB reconfiguration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

According to a sixth aspect, an embodiment provides a node, including: a transmitter, configured to send a fifth message to a first node, where the fifth message includes a configuration of the second node and/or a dual connectivity configuration; and a receiver, configured to: receive from the first node a second message indicating the configuration success of a terminal device; or receive from the first node a third message indicating the configuration failure of a user terminal.

In a first possible implementation manner of the sixth aspect, the transmitter is further configured to send a fifth message to the first node, so that the first node sends a first message to the user terminal according to the fifth message, where the first message and/or the fifth message include the configuration of the second node and/or the dual connectivity configuration.

With reference to the sixth aspect and the first possible implementation manner of the sixth aspect, in a second possible implementation manner of the sixth aspect, the first message and/or the fifth message further includes a configuration of the first node.

With reference to the sixth aspect and the first and the second possible implementation manners of the sixth aspect, in a third possible implementation manner of the sixth aspect, the transmitter is further configured to: generate a sixth message according to the third message, and send the sixth message to the first node, where the sixth message includes an updated configuration provided by the second node.

With reference to the sixth aspect and the first to the third possible implementation manners of the sixth aspect, in a fourth possible implementation manner of the sixth aspect, the fifth message further includes a radio resource configuration of the second node, and the radio resource configuration is used by the user terminal to access the second node or synchronize with the second node.

With reference to t the fourth possible implementation manner of the sixth aspect, in a fifth possible implementation manner of the sixth aspect, the receiver is further configured to receive random access initiated by the user terminal; and the transmitter is further configured to: if the random access succeeds, send a seventh message to the first node, so that the first node learns that the user terminal successfully accesses the second node; or if the random access fails, send an eighth message to the first node, where the eighth message is used by the user terminal to learn a failure in access to the second node.

With reference to the fourth possible implementation manner of the sixth aspect, in a sixth possible implementation manner of the sixth aspect, the receiver is further configured to receive random access initiated by the user terminal; and the transmitter is further configured to: if the random access succeeds, send a seventh message to the first node, so that the first node learns that the user terminal successfully accesses the second node; or if the random access fails, send an eighth message to the first node, where the eighth message is used by the user terminal to access the second node unsuccessfully.

With reference to the fourth possible implementation manner of the sixth aspect, in a seventh possible implementation manner of the sixth aspect, the receiver is further configured to: receive from the first node a second message indicating an access success of the user terminal; or receive from the first node a third message indicating an access failure of the user terminal; or receive from the first node a second message indicating the configuration success and an access success of the user terminal; or receive from the first node a second message indicating the configuration success and an access failure of the user terminal; or receive from the first node a third message used to instruct to delete a cell the user terminal fails to access, or instruct to delete the second node so that the second node does not communicate with the user terminal any more.

With reference to the sixth aspect and the first to the seventh possible implementation manners of the sixth aspect, in an eighth possible implementation manner of the sixth aspect, the node further includes: a processor, configured to perform one or more of the following: triggering an RRC reestablishment procedure; releasing a configuration and/or context information that are related to the user terminal; deleting the configuration and/or the context information that are related to the user terminal; deleting a secondary cell configuration that is of the second node and related to the terminal, where a secondary cell is a cell that provides a service for the terminal, and the secondary cell is a secondary cell between the user terminal and the second node; releasing the configuration of the second node and/or the dual connectivity configuration included in the fifth message; resetting the configuration of the second node and/or the dual connectivity configuration included in the fifth message; communicating with the user terminal by using a configuration before the first message is received; or triggering an RRC reestablishment procedure of the user terminal on the second node.

With reference to the sixth aspect and the first to the eighth possible implementation manners of the sixth aspect, in a ninth possible implementation manner of the sixth aspect, each of the first reply message to a fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

According to a seventh aspect, embodiments provide a method for transmitting a configuration message, including: receiving a first message from a first node, where the first message includes a configuration of a second node and/or a dual connectivity configuration; and sending a first reply message to the first node if the configuration in the first message is accepted, so that the first node learns that a user terminal accepts the configuration; or sending a second reply message to the first node if the configuration in the first message is not accepted, so that the first node learns that the user terminal does not accept the configuration; or skipping sending any message to the first node if the configuration in the first message is not accepted.

In a first possible implementation manner of the seventh aspect, the dual connectivity configuration is a configuration applied to both the first node and the second node.

With reference to the seventh aspect and the first possible implementation manner of the seventh aspect, in a second possible implementation manner of the seventh aspect, the method further includes: sending a first reply message to the first node if the configuration in the first message is accepted, so that the first node sends, according to the first reply message, a second message to the second node to indicate that the user terminal accepts the configuration; or sending a second reply message to the first node if the configuration in the first message is not accepted, so that the first node sends, according to the second reply message, a third message to the second node to indicate that the terminal does not accept the configuration.

With reference to the seventh aspect and the first and the second possible implementation manners of the seventh aspect, in a third possible implementation manner of the seventh aspect, the first message further includes a configuration of the first node.

With reference to the seventh aspect and the first to the third possible implementation manners of the seventh aspect, in a fourth possible implementation manner of the seventh aspect, the first message further includes the configuration of the first node; and after the receiving a first message from a first node, the method further includes: provided that the configuration of the first node in the first message is not accepted, sending a second reply message to the first node, so that the first node learns that the user terminal does not accept the configuration; or provided that the configuration of the first node in the first message is not accepted, sending a second reply message to the first node, so that the first node sends, according to the second reply message, a third message to the second node to indicate that the terminal does not accept the configuration.

With reference to the seventh aspect and the first to the third possible implementation manners of the seventh aspect, in a fifth possible implementation manner of the seventh aspect, the method further includes: if the configuration of the first node in the first message is not accepted, and the configuration of the second node and/or the dual connectivity configuration are not accepted, sending a second reply message to the first node, so that the first node learns that the user terminal does not accept the configuration of the first node in the first message and does not accept the configuration of the second node and/or the dual connectivity configuration; or if the configuration of the first node in the first message is not accepted, but the configuration of the second node is accepted, and/or the dual connectivity configuration is accepted, sending a second reply message to the first node, so that the first node learns that the user terminal does not accept the configuration of the first node in the first message but accepts the configuration of the second node and/or accepts the dual connectivity configuration; or if the configuration of the first node in the first message is not accepted, and the configuration of the second node and/or the dual connectivity configuration are not accepted, sending a second reply message to the first node, so that the first node sends, according to the second reply message, a second message to the second node to indicate that the terminal does not accept the configuration of the second node and/or the dual connectivity configuration; or if the configuration of the first node in the first message is not accepted, but the configuration of the second node is accepted, and/or the dual connectivity configuration is not accepted, sending a second reply message to the first node, so that the first node sends, according to the second reply message, a third message to the second node to indicate that the user terminal does not accept the configuration of the first node in the first message or accepts the configuration of the second node and/or does not accept the dual connectivity configuration; or if the configuration of the first node in the first message is not accepted, but the configuration of the second node is accepted, and/or the dual connectivity configuration is not accepted, sending a second reply message to the first node, so that the first node sends, according to the second reply message, a third message to the second node to indicate that the user terminal does not accept the configuration of the first node in the first message but accepts the configuration of the second node and/or accepts the dual connectivity configuration.

With reference to the fourth and the fifth possible implementation manners of the seventh aspect, in a sixth possible implementation manner of the seventh aspect, the method further includes: sending the second reply message to the first node if the configuration of the first node in the first message is not accepted, where the second reply message is an RRC connection reestablishment request message.

With reference to the seventh aspect and the first to the third possible implementation manners of the seventh aspect, in a seventh possible implementation manner of the seventh aspect, the first message further includes the configuration of the first node; and after the receiving a first message from a first node, the method further includes: if the configuration of the first node is accepted, and the configuration of the second node is accepted, and/or the dual connectivity configuration is accepted, sending a first reply message to the first node, so that the first node learns that the user terminal accepts the configurations; or if the configuration of the first node is accepted, but the configuration of the second node is not accepted, and/or the dual connectivity configuration is not accepted, sending a second reply message to the first node, so that the first node learns that the user terminal does not accept the configuration or the configurations.

With reference to the seventh possible implementation manner of the seventh aspect, in an eighth possible implementation manner of the seventh aspect, the method further includes: if the configuration of the first node is accepted, and the configuration of the second node is accepted, and/or the dual connectivity configuration is accepted, sending a first reply message to the first node, so that the first node learns that the user terminal accepts the configuration of the first node and accepts the configuration of the second node and/or accepts the dual connectivity configuration; or if the configuration of the first node is accepted, but the configuration of the second node is not accepted, and/or the dual connectivity configuration is not accepted, sending a second reply message to the first node, so that the first node learns that the terminal device accepts the configuration of the first node but does not accept the configuration of the second node and/or does not accept the dual connectivity configuration; or if the configuration of the first node is accepted, and the configuration of the second node is accepted, and/or the dual connectivity configuration is accepted, sending a first reply message to the first node, so that the first node sends, according to the first reply message, a second message to the second node to indicate that the user terminal accepts the configuration of the second node and/or accepts the dual connectivity configuration; or if the configuration of the first node is accepted, but the configuration of the second node is not accepted, and/or the dual connectivity configuration is not accepted, sending a second reply message to the first node, so that the first node sends, according to the second reply message, a third message to the second node to indicate that the user terminal does not accept the configuration of the second node and/or does not accept the dual connectivity configuration.

With reference to the seventh and the eighth possible implementation manners of the seventh aspect, in a ninth possible implementation manner of the seventh aspect, the method further includes: if the configuration of the first node is accepted, but the configuration of the second node is not accepted, and/or the dual connectivity configuration is not accepted, sending a second reply message to the first node, so that the first node learns that the user terminal does not accept the configuration or the configurations, where the second reply message is an RRC connection reconfiguration complete message or an RRC connection reestablishment request message; or if the configuration of the first node is accepted, and the configuration of the second node is accepted, and/or the dual connectivity configuration is accepted, sending a first reply message to the first node, so that the first node learns that the user terminal accepts the configurations, where the first reply message is an RRC connection reconfiguration complete message.

With reference to the seventh aspect and the first to the ninth possible implementation manners of the seventh aspect, in a tenth possible implementation manner of the seventh aspect, after the sending a second reply message to the first node, the method further includes: receiving a fourth message sent by the first node, where the fourth message includes at least an updated configuration provided by the second node; and if the updated configuration that is in the fourth message and provided by the second node is accepted, sending a first reply message to the first node, so that the first node learns that the user terminal accepts the configuration; or if the updated configuration that is in the fourth message and provided by the second node is not accepted, sending a second reply message to the first node, so that the first node learns that the user terminal does not accept the configuration.

With reference to the fourth to the tenth possible implementation manners of the seventh aspect, in an eleventh possible implementation manner of the seventh aspect, the sending a second reply message to the first node further includes one or more of the following: triggering an RRC reestablishment procedure; releasing configurations of all secondary serving cells Scells; deleting the configurations of all the Scells; releasing configurations of all secondary stations or second stations; deleting the configurations of all the secondary stations or the second stations; resetting MAC; applying a basic configuration of a primary cell of the first node; triggering an RRC reestablishment procedure; releasing the configuration of the second node and/or the dual connectivity configuration included in the first message; resetting the configuration of the second node and/or the dual connectivity configuration included in the first message; releasing a configuration related to the second node; deleting the configuration related to the second node; communicating with the second node by using a configuration before the first message is received; communicating with the first node by using the configuration before the first message is received; or communicating with the first node by using the configuration of the first node included in the first message.

With reference to the seventh aspect and the first to the eleventh possible implementation manners of the seventh aspect, in a twelfth possible implementation manner of the seventh aspect, the first message further includes a radio resource configuration of the second node, and the radio resource configuration is used by the user terminal to access the second node or synchronize with the second node; and after the receiving a first message from a first node, the sending a first reply message to the first node if the configuration in the first message is accepted, so that the first node learns that a user terminal accepts the configuration; or the sending a second reply message to the first node if the configuration in the first message is not accepted, so that the first node learns that the user terminal does not accept the configuration; or the skipping sending any message to the first node if the configuration in the first message is not accepted includes: initiating random access to the second node; and if the random access succeeds, sending a third reply message to the first node to indicate that the user terminal successfully accesses the second node and/or the user terminal accepts the configuration; or if the random access fails, sending a fourth reply message to the first node to indicate that the user terminal fails to access the second node and/or the user terminal does not accept the configuration.

With reference to the seventh aspect and the first to the twelfth possible implementation manners of the seventh aspect, in a thirteenth possible implementation manner of the seventh aspect, the first message further includes the radio resource configuration of the second node, and the radio resource configuration is used by the user terminal to access the second node or synchronize with the second node; and after the sending a first reply message to the first node if the configuration in the first message is accepted, so that the first node learns that a user terminal accepts the configuration, the method further includes: initiating random access to the second node; and if the random access succeeds, sending a third reply message to the first node to indicate that the user terminal successfully accesses the second node; or if the random access fails, sending a fourth reply message to the first node to indicate that the user terminal fails to access the second node.

With reference to the seventh aspect and the first to the thirteenth possible implementation manners of the seventh aspect, in a fourteenth possible implementation manner of the seventh aspect, each of the first reply message to the fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

According to an eighth aspect, an embodiment provides a method for transmitting a configuration message, including: sending a first message to a user terminal, where the first message includes a configuration of a second node and/or a dual connectivity configuration; and receiving a first reply message from the user terminal to learn that the user terminal accepts the configuration; or receiving a second reply message from the user terminal to learn that the user terminal does not accept the configuration.

In a first possible implementation manner of the eighth aspect, before the sending a first message to a user terminal, the method further includes: receiving a fifth message sent by the second node, where the fifth message includes the configuration of the second node and/or the dual connectivity configuration.

With reference to the eighth aspect and the first possible implementation manner of the eighth aspect, in a second possible implementation manner of the eighth aspect, the first message and/or the fifth message further include a configuration of the first node.

With reference to the eighth aspect and the first and the second possible implementation manners of the eighth aspect, in a third possible implementation manner of the eighth aspect, the method further includes: receiving a first reply message sent by the user terminal, where the first reply message is used to indicate: the configuration of the first node is accepted, and the configuration of the second node is accepted, and/or the dual connectivity configuration is accepted; or the configuration of the first node is accepted, but the configuration of the second node is not accepted, and/or the dual connectivity configuration is accepted; or the configuration of the first node is not accepted, and the configuration of the second node is not accepted, and/or the dual connectivity configuration is accepted; or the configuration of the first node is not accepted, but the configuration of the second node is accepted, and/or the dual connectivity configuration is accepted.

With reference to the eighth aspect and the first to the third possible implementation manners of the eighth aspect, in a fourth possible implementation manner of the eighth aspect, the method further includes: if the first reply message is received from the user terminal, sending, according to the first reply message, a second message to the second node to indicate a configuration success of the user terminal; or if the second reply message is received from the user terminal, sending, according to the second reply message, a third message to the second node to indicate a configuration failure of the user terminal.

With reference to the fourth possible implementation manner of the eighth aspect, in a fifth possible implementation manner of the eighth aspect, the configuration success includes a second node configuration success and/or a dual connectivity configuration success; or the configuration failure includes a second node configuration failure and/or a dual connectivity configuration failure.

With reference to the eighth aspect and the first to the fifth possible implementation manners of the eighth aspect, in a sixth possible implementation manner of the eighth aspect, after the sending, according to the second reply message, a third message to the second node to indicate a configuration failure of the user terminal, the method further includes: receiving a sixth message from the second node, where the sixth message includes an updated configuration provided by the second node; and generating a fourth message according to the updated configuration that is in the sixth message and provided by the second node, and sending the fourth message to the user terminal, where the fourth message includes the updated configuration provided by the second node.

With reference to the eighth aspect and the first to the sixth possible implementation manners of the eighth aspect, in a seventh possible implementation manner of the eighth aspect, after the sending a first message to a user terminal, the method further includes: determining whether the second reply message sent by the user terminal is received within a first preset time period; and if the second reply message sent by the user terminal is not received within the first preset time period, sending a third message to the second node to indicate a configuration failure of the user terminal.

With reference to the eighth aspect and the first to the seventh possible implementation manners of the eighth aspect, in an eighth possible implementation manner of the eighth aspect, the first message includes a radio resource configuration of the second node, and the radio resource configuration is used by the user terminal to access the second node or synchronize with the second node; and after the sending a first message to a user terminal, the method further includes: receiving a first reply message from the user terminal, where the first reply message is used to indicate that the user terminal successfully accesses the second node and/or the user terminal accepts the configuration; or receiving a second reply message from the user terminal, where the second reply message is used to indicate that the user terminal fails to access the second node and/or the user terminal does not accept the configuration.

With reference to the eighth aspect and the first to the seventh possible implementation manners of the eighth aspect, in a ninth possible implementation manner of the eighth aspect, the first message includes a radio resource configuration of the second node, and the radio resource configuration is used by the user terminal to access the second node or synchronize with the second node; and after the receiving a first reply message from the user terminal, the method further includes: receiving a third reply message from the user terminal, where the third reply message is used to indicate that the user terminal successfully accesses the second node; and/or receiving a seventh message from the second node, where the seventh message is used to indicate that the user terminal successfully accesses the second node.

With reference to the eighth aspect and the first to the seventh possible implementation manners of the eighth aspect, in a tenth possible implementation manner of the eighth aspect, the first message includes a radio resource configuration of the second node, and the radio resource configuration is used by the user terminal to access the second node or synchronize with the second node; and after the receiving a first reply message from the user terminal, the method further includes: receiving a fourth reply message from the user terminal, where the fourth reply message is used to indicate that the user terminal fails to access the second node; and/or receiving an eighth message from the second node, where the eighth message is used to indicate that the user terminal fails to access the second node.

With reference to the eighth aspect and the first to the seventh possible implementation manners of the eighth aspect, in an eleventh possible implementation manner of the eighth aspect, the first message includes a radio resource configuration of the second node, and the radio resource configuration is used by the user terminal to access the second node or synchronize with the second node; and after the first message is sent to the user terminal or after the receiving a first reply message from the user terminal, the method further includes: determining whether the fourth reply message sent by the user terminal is received within a second preset time period; and if the fourth reply message sent by the user terminal is not received within the second preset time period, and the third reply message sent by the user terminal is not received within the second preset time period, sending a seventh message to the second node to indicate that the user terminal fails to access the second node.

With reference to the eighth aspect and the first to the eleventh possible implementation manners of the eighth aspect, in a twelfth possible implementation manner of the eighth aspect, each of the first reply message to the fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

According to a ninth aspect, an embodiment provides a method for transmitting a configuration message, including: sending a fifth message to a first node, where the fifth message includes a configuration of the second node and/or a dual connectivity configuration; and receiving from the first node a second message indicating the configuration success of a terminal device; or receiving from the first node a third message indicating the configuration failure of a user terminal.

In a first possible implementation manner of the ninth aspect, the method further includes: sending a fifth message to the first node, so that the first node sends a first message to the user terminal according to the fifth message, where the first message and/or the fifth message include the configuration of the second node and/or the dual connectivity configuration.

With reference to the ninth aspect and the first possible implementation manner of the ninth aspect, in a second possible implementation manner of the ninth aspect, the first message and/or the fifth message further include a configuration of the first node.

With reference to the ninth aspect and the first and the second possible implementation manners of the ninth aspect, in a third possible implementation manner of the ninth aspect, after the receiving a third message from the first node to indicate that the user terminal performs configuration unsuccessfully according to the first message, the method further includes: generating a sixth message according to the third message, and sending the sixth message to the first node, where the sixth message includes an updated configuration provided by the second node.

With reference to the ninth aspect and the first to the third possible implementation manners of the ninth aspect, in a fourth possible implementation manner of the ninth aspect, the fifth message further includes a radio resource configuration of the second node, and the radio resource configuration is used by the user terminal to access the second node or synchronize with the second node.

With reference to the fourth possible implementation manner of the ninth aspect, in a fifth possible implementation manner of the ninth aspect, after the receiving from the first node a second message indicating a configuration success of the user terminal, the method further includes: receiving random access initiated by the user terminal; and if the random access succeeds, sending a seventh message to the first node, so that the first node learns that the user terminal successfully accesses the second node; or if the random access fails, sending an eighth message to the first node, where the eighth message is used by the user terminal to learn a failure in access to the second node.

With reference to the fourth possible implementation manner of the ninth aspect, in a sixth possible implementation manner of the ninth aspect, after the sending a fifth message to a first node, the method further includes: receiving random access initiated by the user terminal; and if the random access succeeds, sending a seventh message to the first node, so that the first node learns that the user terminal successfully accesses the second node; or if the random access fails, sending an eighth message to the first node, where the eighth message is used by the user terminal to access the second node unsuccessfully.

With reference to the fifth possible implementation manner of the ninth aspect, in a seventh possible implementation manner of the ninth aspect, after the sending a fifth message to a first node, the method further includes: receiving from the first node a second message indicating an access success of the user terminal; or receiving from the first node a third message indicating an access failure of the user terminal; or receiving from the first node a second message indicating the configuration success and an access success of the user terminal; or receiving from the first node a second message indicating the configuration success and an access failure of the user terminal; or receiving from the first node a third message used to instruct to delete a cell the user terminal fails to access, or instruct to delete the second node so that the second node does not communicate with the user terminal any more.

With reference to the ninth aspect and the first to the seventh possible implementation manners of the ninth aspect, in an eighth possible implementation manner of the ninth aspect, after the receiving a third message from the first node to indicate that the user terminal performs configuration unsuccessfully according to the first message, the method further includes one or more of the following: triggering an RRC reestablishment procedure; releasing a configuration and/or context information that are related to the user terminal; deleting the configuration and/or the context information that are related to the user terminal; deleting a secondary cell configuration that is of the second node and related to the terminal, where a secondary cell is a cell that provides a service for the terminal, and the secondary cell is a secondary cell between the user terminal and the second node; releasing the configuration of the second node and/or the dual connectivity configuration included in the fifth message; resetting the configuration of the second node and/or the dual connectivity configuration included in the fifth message; communicating with the user terminal by using a configuration before the first message is received; or triggering an RRC reestablishment procedure of the user terminal on the second node.

With reference to the ninth aspect and the first to the eighth possible implementation manners of the ninth aspect, in a ninth possible implementation manner of the ninth aspect, each of the first reply message to a fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

According to a tenth aspect, this embodiment provides a user terminal, including: a fourth receiving unit, configured to receive a first message from a first node, where the first message includes a radio resource configuration of a second node, and the radio resource configuration is used by the user terminal to access the second node or synchronize with the second node; a fourth processing unit, configured to initiate random access to the second node; and a fourth sending unit, configured to: if the random access succeeds, send a third reply message to the first node to indicate that the user terminal successfully accesses the second node and/or the configuration succeeds; or if the random access fails, send a fourth reply message to the first node to indicate that the user terminal fails to access the second node and/or the configuration fails.

In a first possible implementation manner of the tenth aspect, the first message further includes one or more of the following: a configuration of the first node, a configuration of the second node, or a dual connectivity configuration.

With reference to the tenth aspect and the first possible implementation manner of the tenth aspect, in a second possible implementation manner of the tenth aspect, the fourth sending unit is further configured to: send a first reply message to the first node if the configuration included in the first message is accepted, so that the first node learns that the user terminal accepts the configuration or the configuration succeeds.

With reference to the tenth aspect and the first possible implementation manner of the tenth aspect, in a third possible implementation manner of the tenth aspect, the fourth sending unit is further configured to: when the first message includes the configuration of the second node and/or the dual connectivity configuration, if the configuration of the second node and/or the dual connectivity configuration are accepted, send a third reply message to the first node to indicate that the configuration or the configurations succeeds or succeed; or when the first message includes the configuration of the first node in addition to the configuration of the second node and/or the dual connectivity configuration, if the configuration of the first node is accepted, and the configuration of the second node and/or the dual connectivity configuration are accepted, send a third reply message to the first node to indicate that the configurations succeed.

With reference to the tenth aspect and the first possible implementation manner of the tenth aspect, in a fourth possible implementation manner of the tenth aspect, the fourth sending unit is further configured to: if the configuration of the first node is accepted, but the configuration of the second node and/or the dual connectivity configuration are not accepted, send a third reply message to the first node to indicate that the configuration of the first node is accepted but the configuration of the second node and/or the dual connectivity configuration are not accepted; or when the first message includes the configuration of the second node and/or the dual connectivity configuration, if the configuration of the second node and/or the dual connectivity configuration are not accepted, send a third reply message to the first node to indicate that the configuration or the configurations fails or fail.

With reference to the third and the fourth possible implementation manners of the tenth aspect, in a fifth possible implementation manner of the tenth aspect, the fourth sending unit is further configured to: if access succeeds, send a third reply message to the first node to indicate that the access succeeds and the configuration succeeds; or if access fails, send a fourth reply message to the first node to indicate that the access fails and the configuration succeeds.

With reference to the fourth possible implementation manner of the tenth aspect, in a sixth possible implementation manner of the tenth aspect, the fourth sending unit is further configured to: if access succeeds, send a third reply message to the first node to indicate that the access succeeds and indicate that the configuration of the first node is accepted but the configuration of the second node and/or the dual connectivity configuration are not accepted; or if access fails, send a fourth reply message to the first node to indicate that the access fails and indicate that the configuration of the first node is accepted but the configuration of the second node and/or the dual connectivity configuration are not accepted.

With reference to the third to the sixth possible implementation manners of the tenth aspect, in a seventh possible implementation manner of the tenth aspect, the third reply message is an RRC reconfiguration complete message; and/or the fourth reply message is an RRC reconfiguration complete message.

With reference to the tenth aspect and the first to the seventh possible implementation manners of the tenth aspect, in an eighth possible implementation manner of the tenth aspect, the fourth processing unit is further configured to perform one or more of the following: triggering an RRC reestablishment procedure; releasing the configuration of the second node and/or the dual connectivity configuration included in the first message; resetting the configuration of the second node and/or the dual connectivity configuration included in the first message; releasing a configuration related to the second node; deleting the configuration related to the second node; communicating with the second node by using a configuration before the first message is received; communicating with the first node by using the configuration before the first message is received; or communicating with the first node by using the configuration of the first node included in the first message.

With reference to the tenth aspect and the first to the eighth possible implementation manners of the tenth aspect, in a ninth possible implementation manner of the tenth aspect, each of the first reply message to the fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

According to an eleventh aspect, an embodiment provides a node, including: a fifth sending unit, configured to send a first message to a terminal device, where the first message includes a radio resource configuration of a second node, and the radio resource configuration is used by the terminal device to access the second node or synchronize with the second node; and a fifth receiving unit, configured to: receive a third reply message sent by the terminal device, where the third reply message is used to indicate that the terminal device successfully accesses the second node and/or the configuration succeeds; or receive a fourth reply message sent by the terminal device, where the fourth reply message is used to indicate that the terminal device fails to access the second node and/or the configuration fails.

In a first possible implementation manner of the eleventh aspect, the first message further includes one or more of the following: a configuration of the first node, a configuration of the second node, or a dual connectivity configuration.

With reference to the eleventh aspect and the first possible implementation manner of the eleventh aspect, in a second possible implementation manner of the eleventh aspect, the fifth receiving unit is further configured to: if the terminal device accepts the configuration included in the first message, receive a first reply message sent by the terminal device, so that the first node learns that the terminal device accepts the configuration.

With reference to the second possible implementation manner of the eleventh aspect, in a third possible implementation manner of the eleventh aspect, the fifth receiving unit is further configured to: when the first message includes the configuration of the second node and/or the dual connectivity configuration, if the terminal device accepts the configuration of the second node and/or the dual connectivity configuration, receive a first reply message to learn that the configuration or the configurations succeeds or succeed; or when the first message includes the configuration of the first node in addition to the configuration of the second node and/or the dual connectivity configuration, if the terminal device accepts the configuration of the first node and accepts the configuration of the second node and/or the dual connectivity configuration, receive a first reply message to learn that the configurations succeed.

With reference to the second possible implementation manner of the eleventh aspect, in a fourth possible implementation manner of the eleventh aspect, the fifth receiving unit is further configured to: when the first message includes the configuration of the second node and/or the dual connectivity configuration, if the terminal device does not accept the configuration of the second node and/or the dual connectivity configuration, receive a second reply message to learn the configuration failure of the terminal device; or when the first message includes the configuration of the first node in addition to the configuration of the second node and/or the dual connectivity configuration, if the terminal device accepts the configuration of the first node but does not accept the configuration of the second node and/or the dual connectivity configuration, receive a second reply message to learn that the terminal device accepts the configuration of the first node but does not accept the configuration of the second node and/or the dual connectivity configuration.

With reference to the eleventh aspect and the first possible implementation manner of the eleventh aspect, in a fifth possible implementation manner of the eleventh aspect, the fifth receiving unit is further configured to: when the first message includes the configuration of the second node and/or the dual connectivity configuration, and the terminal device accepts the configuration of the second node and/or the dual connectivity configuration, if the terminal device successfully accesses the second node, receive a third reply message to learn that the configuration or the configurations succeeds or succeed and/or the access succeeds, or if the terminal device fails to access the second node, receive a fourth reply message to learn that the configuration or the configurations succeeds or succeed and/or the access succeeds; or when the first message includes the configuration of the first node in addition to the configuration of the second node and/or the dual connectivity configuration, and the terminal device accepts the configuration of the first node and accepts the configuration of the second node and/or the dual connectivity configuration, if the terminal device successfully accesses the second node, receive a third reply message to learn that the configurations succeed and/or the access succeeds, or if the terminal device fails to access the second node, receive a fourth reply message to learn that the configurations succeed and/or the access succeeds.

With reference to the eleventh aspect and the first to the fifth possible implementation manners of the eleventh aspect, in a sixth possible implementation manner of the eleventh aspect, each of the first reply message to the fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following:

reconfiguration failure, configuration failure, SeNB reconfiguration failure, second node configuration failure, SeNB configuration failure, dual connectivity reconfiguration failure, dual connectivity configuration failure, access failure, or RACH failure.

According to a twelfth aspect, embodiments provides a node, including: a sixth receiving unit, configured to receive random access initiated by the user terminal; and a sixth sending unit, configured to: if the terminal device successfully accesses the second node, send a seventh message to the first node, where the seventh message is used to indicate that the terminal device successfully accesses the second node or successfully accesses a cell of the second node; or if the terminal device fails to access the second node, send an eighth message to the first node, where the seventh message is used to indicate that the terminal device fails to access the second node or fails to access a cell of the second node.

In a first possible implementation manner of the twelfth aspect, the sixth receiving unit is further configured to: before the seventh message or the eighth message is sent to the first node, receive a second message from the first node to learn a configuration success of the user terminal; or receive a third message from the first node to learn a configuration failure of the user terminal.

With reference to the first possible implementation manner of the twelfth aspect, in a second possible implementation manner of the twelfth aspect, the sixth sending unit is further configured to send a fifth message to the first node, where the fifth message includes a radio resource configuration of the second node, and the radio resource configuration is used by the terminal device to access the second node or synchronize with the second node.

With reference to the twelfth aspect and the first and the second possible implementation manners of the twelfth aspect, in a third possible implementation manner of the twelfth aspect, the fifth message further includes one or more of a configuration of the first node, a configuration of the second node, or a dual connectivity configuration.

With reference to the twelfth aspect and the first to the third possible implementation manners of the twelfth aspect, in a fourth possible implementation manner of the twelfth aspect, the sixth receiving unit is further configured to: receive a ninth message from the first node, where the ninth message is used to indicate that the terminal device successfully accesses the second node; or receive a tenth message from the first node, where the tenth message is used to indicate that the terminal device fails to access the second node.

With reference to the twelfth aspect and the first to the fourth possible implementation manners of the twelfth aspect, in a fifth possible implementation manner of the twelfth aspect, each of the first message to the tenth message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

According to a thirteenth aspect, an embodiment provides a user terminal, including: a receiver, configured to receive a first message from a first node, where the first message includes a radio resource configuration of a second node, and the radio resource configuration is used by the user terminal to access the second node or synchronize with the second node; a processor, configured to initiate random access to the second node; and a transmitter, configured to: if the random access succeeds, send a third reply message to the first node to indicate that the user terminal successfully accesses the second node and/or the configuration succeeds; or if the random access fails, send a fourth reply message to the first node to indicate that the user terminal fails to access the second node and/or the configuration fails.

In a first possible implementation manner of the thirteenth aspect, the first message further includes one or more of the following: a configuration of the first node, a configuration of the second node, or a dual connectivity configuration.

With reference to the thirteenth aspect and the first possible implementation manner of the thirteenth aspect, in a second possible implementation manner of the thirteenth aspect, the transmitter is further configured to: send a first reply message to the first node if the configuration included in the first message is accepted, so that the first node learns that the user terminal accepts the configuration or the configuration succeeds.

With reference to the thirteenth aspect and the first possible implementation manner of the thirteenth aspect, in a third possible implementation manner of the thirteenth aspect, the transmitter is further configured to: when the first message includes the configuration of the second node and/or the dual connectivity configuration, if the configuration of the second node and/or the dual connectivity configuration are accepted, send a third reply message to the first node to indicate that the configuration or the configurations succeeds or succeed; or when the first message includes the configuration of the first node in addition to the configuration of the second node and/or the dual connectivity configuration, if the configuration of the first node is accepted, and the configuration of the second node and/or the dual connectivity configuration are accepted, send a third reply message to the first node to indicate that the configurations succeed.

With reference to the thirteenth aspect and the first possible implementation manner of the thirteenth aspect, in a fourth possible implementation manner of the thirteenth aspect, the transmitter is further configured to: if the configuration of the first node is accepted, but the configuration of the second node and/or the dual connectivity configuration are not accepted, send a third reply message to the first node to indicate that the configuration of the first node is accepted but the configuration of the second node and/or the dual connectivity configuration are not accepted; or when the first message includes the configuration of the second node and/or the dual connectivity configuration, if the configuration of the second node and/or the dual connectivity configuration are not accepted, send a third reply message to the first node to indicate that the configuration or the configurations fails or fail.

With reference to the third and the fourth possible implementation manners of the thirteenth aspect, in a fifth possible implementation manner of the thirteenth aspect, the transmitter is further configured to: if access succeeds, send a third reply message to the first node to indicate that the access succeeds and the configuration succeeds; or if access fails, send a fourth reply message to the first node to indicate that the access fails and the configuration succeeds.

With reference to the fourth possible implementation manner of the thirteenth aspect, in a sixth possible implementation manner of the thirteenth aspect, the transmitter is further configured to: if access succeeds, send a third reply message to the first node to indicate that the access succeeds and indicate that the configuration of the first node is accepted but the configuration of the second node and/or the dual connectivity configuration are not accepted; or if access fails, send a fourth reply message to the first node to indicate that the access fails and indicate that the configuration of the first node is accepted but the configuration of the second node and/or the dual connectivity configuration are not accepted.

With reference to the third to the sixth possible implementation manners of the thirteenth aspect, in a seventh possible implementation manner of the thirteenth aspect, the third reply message is an RRC reconfiguration complete message; and/or the fourth reply message is an RRC reconfiguration complete message.

With reference to the thirteenth aspect and the first to the seventh possible implementation manners of the thirteenth aspect, in an eighth possible implementation manner of the thirteenth aspect, the processor is further configured to perform one or more of the following: triggering an RRC reestablishment procedure; releasing the configuration of the second node and/or the dual connectivity configuration included in the first message; resetting the configuration of the second node and/or the dual connectivity configuration included in the first message; releasing a configuration related to the second node; deleting the configuration related to the second node; communicating with the second node by using a configuration before the first message is received; communicating with the first node by using the configuration before the first message is received; or communicating with the first node by using the configuration of the first node included in the first message.

With reference to the thirteenth aspect and the first to the eighth possible implementation manners of the thirteenth aspect, in a ninth possible implementation manner of the thirteenth aspect, each of the first reply message to the fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

According to a fourteenth aspect, an embodiment provides a node, including: a transmitter, configured to send a first message to a terminal device, where the first message includes a radio resource configuration of a second node, and the radio resource configuration is used by the terminal device to access the second node or synchronize with the second node; and a receiver, configured to: receive a third reply message sent by the terminal device, where the third reply message is used to indicate that the terminal device successfully accesses the second node and/or the configuration succeeds; or receive a fourth reply message sent by the terminal device, where the fourth reply message is used to indicate that the terminal device fails to access the second node and/or the configuration fails.

In a first possible implementation manner of the fourteenth aspect, the first message further includes one or more of the following: a configuration of the first node, a configuration of the second node, or a dual connectivity configuration.

With reference to the fourteenth aspect and the first possible implementation manner of the fourteenth aspect, in a second possible implementation manner of the fourteenth aspect, the receiver is further configured to: if the terminal device accepts the configuration included in the first message, receive a first reply message sent by the terminal device, so that the first node learns that the terminal device accepts the configuration.

With reference to the second possible implementation manner of the fourteenth aspect, in a third possible implementation manner of the fourteenth aspect, the receiver is further configured to: when the first message includes the configuration of the second node and/or the dual connectivity configuration, if the terminal device accepts the configuration of the second node and/or the dual connectivity configuration, receive a first reply message to learn that the configuration or the configurations succeeds or succeed; or when the first message includes the configuration of the first node in addition to the configuration of the second node and/or the dual connectivity configuration, if the terminal device accepts the configuration of the first node and accepts the configuration of the second node and/or the dual connectivity configuration, receive a first reply message to learn that the configurations succeed.

With reference to the second possible implementation manner of the fourteenth aspect, in a fourth possible implementation manner of the fourteenth aspect, the receiver is further configured to: when the first message includes the configuration of the second node and/or the dual connectivity configuration, if the terminal device does not accept the configuration of the second node and/or the dual connectivity configuration, receive a second reply message to learn the configuration failure of the terminal device; or when the first message includes the configuration of the first node in addition to the configuration of the second node and/or the dual connectivity configuration, if the terminal device accepts the configuration of the first node but does not accept the configuration of the second node and/or the dual connectivity configuration, receive a second reply message to learn that the terminal device accepts the configuration of the first node but does not accept the configuration of the second node and/or the dual connectivity configuration.

With reference to the fourteenth aspect and the first possible implementation manner of the fourteenth aspect, in a fifth possible implementation manner of the fourteenth aspect, the receiver is further configured to: when the first message includes the configuration of the second node and/or the dual connectivity configuration, and the terminal device accepts the configuration of the second node and/or the dual connectivity configuration, if the terminal device successfully accesses the second node, receive a third reply message to learn that the configuration or the configurations succeeds or succeed and/or the access succeeds, or if the terminal device fails to access the second node, receive a fourth reply message to learn that the configuration or the configurations succeeds or succeed and/or the access succeeds; or when the first message includes the configuration of the first node in addition to the configuration of the second node and/or the dual connectivity configuration, and the terminal device accepts the configuration of the first node and accepts the configuration of the second node and/or the dual connectivity configuration, if the terminal device successfully accesses the second node, receive a third reply message to learn that the configurations succeed and/or the access succeeds, or if the terminal device fails to access the second node, receive a fourth reply message to learn that the configurations succeed and/or the access succeeds.

With reference to the fourteenth aspect and the first to the fifth possible implementation manners of the fourteenth aspect, in a sixth possible implementation manner of the fourteenth aspect, each of the first reply message to the fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

According to a fifteenth aspect, an embodiment provides a node, including: a receiver, configured to receive random access initiated by the user terminal; and a transmitter, configured to: if the terminal device successfully accesses the second node, send a seventh message to the first node, where the seventh message is used to indicate that the terminal device successfully accesses the second node or successfully accesses a cell of the second node; or if the terminal device fails to access the second node, send an eighth message to the first node, where the seventh message is used to indicate that the terminal device fails to access the second node or fails to access a cell of the second node.

In a first possible implementation manner of the fifteenth aspect, the receiver is further configured to: before the seventh message or the eighth message is sent to the first node, receive a second message from the first node to learn a configuration success of the user terminal; or receive a third message from the first node to learn a configuration failure of the user terminal.

With reference to the fifteenth aspect and the first possible implementation manner of the fifteenth aspect, in a second possible implementation manner of the fifteenth aspect, the transmitter is further configured to send a fifth message to the first node, where the fifth message includes a radio resource configuration of the second node, and the radio resource configuration is used by the terminal device to access the second node or synchronize with the second node.

With reference to the fifteenth aspect and the first and the second possible implementation manners of the fifteenth aspect, in a third possible implementation manner of the fifteenth aspect, the fifth message further includes one or more of a configuration of the first node, a configuration of the second node, or a dual connectivity configuration.

With reference to the fifteenth aspect and the first to the third possible implementation manners of the fifteenth aspect, in a fourth possible implementation manner of the fifteenth aspect, the receiver is further configured to: receive a ninth message from the first node, where the ninth message is used to indicate that the terminal device successfully accesses the second node; or receive a tenth message from the first node, where the tenth message is used to indicate that the terminal device fails to access the second node.

With reference to the fifteenth aspect and the first to the fourth possible implementation manners of the fifteenth aspect, in a fifth possible implementation manner of the fifteenth aspect, each of the first message to the tenth message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

According to a sixteenth aspect, an embodiment provides a method for transmitting a configuration message, including: receiving a first message from a first node, where the first message includes a radio resource configuration of a second node, and the radio resource configuration is used by the user terminal to access the second node or synchronize with the second node; initiating random access to the second node; and if the random access succeeds, sending a third reply message to the first node to indicate that the user terminal successfully accesses the second node and/or the configuration succeeds; or if the random access fails, sending a fourth reply message to the first node to indicate that the user terminal fails to access the second node and/or the configuration fails.

In a first possible implementation manner of the sixteenth aspect, the first message further includes one or more of the following: a configuration of the first node, a configuration of the second node, or a dual connectivity configuration.

With reference to the sixteenth aspect and the first possible implementation manner of the sixteenth aspect, in a second possible implementation manner of the sixteenth aspect, before the initiating random access to the second node or before the sending a third reply message, the method further includes: sending a first reply message to the first node if the configuration included in the first message is accepted, so that the first node learns that the user terminal accepts the configuration or the configuration succeeds.

With reference to the sixteenth aspect and the first possible implementation manner of the sixteenth aspect, in a third possible implementation manner of the sixteenth aspect, the method further includes: when the first message includes the configuration of the second node and/or the dual connectivity configuration, if the configuration of the second node and/or the dual connectivity configuration are accepted, sending a third reply message to the first node to indicate that the configuration or the configurations succeeds or succeed; or when the first message includes the configuration of the first node in addition to the configuration of the second node and/or the dual connectivity configuration, if the configuration of the first node is accepted, and the configuration of the second node and/or the dual connectivity configuration are accepted, sending a third reply message to the first node to indicate that the configurations succeed.

With reference to the sixteenth aspect and the first possible implementation manner of the sixteenth aspect, in a fourth possible implementation manner of the sixteenth aspect, the method further includes: if the configuration of the first node is accepted, but the configuration of the second node and/or the dual connectivity configuration are not accepted, sending a third reply message to the first node to indicate that the configuration of the first node is accepted but the configuration of the second node and/or the dual connectivity configuration are not accepted; or when the first message includes the configuration of the second node and/or the dual connectivity configuration, if the configuration of the second node and/or the dual connectivity configuration are not accepted, sending a third reply message to the first node to indicate that the configuration or the configurations fails or fail.

With reference to the third and the fourth possible implementation manners of the sixteenth aspect, in a fifth possible implementation manner of the sixteenth aspect, the method further includes: if access succeeds, sending a third reply message to the first node to indicate that the access succeeds and the configuration succeeds; or if access fails, sending a fourth reply message to the first node to indicate that the access fails and the configuration succeeds.

With reference to the fourth possible implementation manner of the sixteenth aspect, in a sixth possible implementation manner of the sixteenth aspect, the method further includes: if access succeeds, sending a third reply message to the first node to indicate that the access succeeds and indicate that the configuration of the first node is accepted but the configuration of the second node and/or the dual connectivity configuration are not accepted; or if access fails, sending a fourth reply message to the first node to indicate that the access fails and indicate that the configuration of the first node is accepted but the configuration of the second node and/or the dual connectivity configuration are not accepted.

With reference to the third to the sixth possible implementation manners of the sixteenth aspect, in a seventh possible implementation manner of the sixteenth aspect, the third reply message is an RRC reconfiguration complete message; and/or the fourth reply message is an RRC reconfiguration complete message.

With reference to the sixteenth aspect and the first to the seventh possible implementation manners of the sixteenth aspect, in an eighth possible implementation manner of the sixteenth aspect, the sending a fourth reply message to the first node further includes one or more of the following: triggering an RRC reestablishment procedure; releasing the configuration of the second node and/or the dual connectivity configuration included in the first message; resetting the configuration of the second node and/or the dual connectivity configuration included in the first message; releasing a configuration related to the second node; deleting the configuration related to the second node; communicating with the second node by using a configuration before the first message is received; communicating with the first node by using the configuration before the first message is received; or communicating with the first node by using the configuration of the first node included in the first message.

With reference to the sixteenth aspect and the first to the eighth possible implementation manners of the sixteenth aspect, in a ninth possible implementation manner of the sixteenth aspect, each of the first reply message to the fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

According to a seventeenth aspect, an embodiment provides a method for transmitting a configuration message, including: sending a first message to a terminal device, where the first message includes a radio resource configuration of a second node, and the radio resource configuration is used by the terminal device to access the second node or synchronize with the second node; and receiving a third reply message sent by the terminal device, where the third reply message is used to indicate that the terminal device successfully accesses the second node and/or the configuration succeeds; or receiving a fourth reply message sent by the terminal device, where the fourth reply message is used to indicate that the terminal device fails to access the second node and/or the configuration fails.

In a first possible implementation manner of the seventeenth aspect, the first message further includes one or more of the following: a configuration of a first node, a configuration of the second node, or a dual connectivity configuration.

With reference to the second possible implementation solution of the seventeenth aspect, in a second possible implementation solution of the seventeenth aspect, after the sending a first message to a terminal device or before the receiving a third reply message sent by the terminal device, the method further includes: if the terminal device accepts the configuration included in the first message, receiving a first reply message sent by the terminal device, so that the first node learns that the terminal device accepts the configuration.

With reference to the seventeenth aspect and the first and the second possible implementation solutions of the seventeenth aspect, in a third possible implementation solution of the seventeenth aspect, after the sending a first message to a terminal device, the method further includes: when the first message includes the configuration of the second node and/or the dual connectivity configuration, if the terminal device accepts the configuration of the second node and/or the dual connectivity configuration, receiving, by the first node, a first reply message to learn that the configuration or the configurations succeeds or succeed; or when the first message includes the configuration of the first node in addition to the configuration of the second node and/or the dual connectivity configuration, if the terminal device accepts the configuration of the first node and accepts the configuration of the second node and/or the dual connectivity configuration, receiving, by the first node, a first reply message to learn that the configurations succeed.

With reference to the second possible implementation solution of the seventeenth aspect, in a fourth possible implementation solution of the seventeenth aspect, the method further includes: when the first message includes the configuration of the second node and/or the dual connectivity configuration, if the terminal device does not accept the configuration of the second node and/or the dual connectivity configuration, receiving, by the first node, a second reply message to learn the configuration failure of the terminal device; or when the first message includes the configuration of the first node in addition to the configuration of the second node and/or the dual connectivity configuration, if the terminal device accepts the configuration of the first node but does not accept the configuration of the second node and/or the dual connectivity configuration, receiving, by the first node, a second reply message to learn that the terminal device accepts the configuration of the first node but does not accept the configuration of the second node and/or the dual connectivity configuration.

With reference to the seventeenth aspect and the first possible implementation manner of the seventeenth aspect, in a fifth possible implementation solution of the seventeenth aspect, when the first message includes the configuration of the second node and/or the dual connectivity configuration, and the terminal device accepts the configuration of the second node and/or the dual connectivity configuration, if the terminal device successfully accesses the second node, receiving, by the first node, a third reply message to learn that the configuration or the configurations succeeds or succeed and/or the access succeeds; or if the terminal device fails to access the second node, receiving, by the first node, a fourth reply message to learn that the configuration or the configurations succeeds or succeed and/or the access succeeds; or when the first message includes the configuration of the first node in addition to the configuration of the second node and/or the dual connectivity configuration, and the terminal device accepts the configuration of the first node and accepts the configuration of the second node and/or the dual connectivity configuration, if the terminal device successfully accesses the second node, receiving, by the first node, a third reply message to learn that the configurations succeed and/or the access succeeds; or if the terminal device fails to access the second node, receiving, by the first node, a fourth reply message to learn that the configurations succeed and/or the access succeeds.

With reference to the seventeenth aspect and the first to the fifth possible implementation solutions of the seventeenth aspect, in a sixth possible implementation solution of the seventeenth aspect, each of the first reply message to the fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

According to an eighteenth aspect, an embodiment provides a method for transmitting a configuration message, including: receiving random access initiated by the user terminal; and if the terminal device successfully accesses the second node, sending a seventh message to the first node, where the seventh message is used to indicate that the terminal device successfully accesses the second node or successfully accesses a cell of the second node; or if the terminal device fails to access the second node, sending an eighth message to the first node, where the seventh message is used to indicate that the terminal device fails to access the second node or fails to access a cell of the second node.

In a first possible implementation manner of the eighteenth aspect, the method further includes: before the seventh message or the eighth message is sent to the first node, receiving a second message from the first node to learn a configuration success of the user terminal; or receiving a third message from the first node to learn a configuration failure of the user terminal.

With reference to the eighteenth aspect and the first possible implementation manner of the eighteenth aspect, in a second possible implementation manner of the eighteenth aspect, before the receiving a second message from the first node to learn a configuration success of the user terminal; or receiving a third message from the first node to learn a configuration failure of the user terminal, the method further includes: sending a fifth message to the first node, where the fifth message includes a radio resource configuration of the second node, and the radio resource configuration is used by the terminal device to access the second node or synchronize with the second node.

With reference to the eighteenth aspect and the first and the second possible implementation manners of the eighteenth aspect, in a third possible implementation manner of the eighteenth aspect, the fifth message further includes one or more of a configuration of the first node, a configuration of the second node, or a dual connectivity configuration.

With reference to the eighteenth aspect and the first to the third possible implementation manners of the eighteenth aspect, in a fourth possible implementation manner of the eighteenth aspect, after the receiving random access initiated by the user terminal, the method further includes: receiving a ninth message from the first node, where the ninth message is used to indicate that the terminal device successfully accesses the second node; or receiving a tenth message from the first node, where the tenth message is used to indicate that the terminal device fails to access the second node.

With reference to the eighteenth aspect and the first to the fourth possible implementation manners of the eighteenth aspect, in a fifth possible implementation manner of the eighteenth aspect, each of the first message to the tenth message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

The embodiments provide a method for transmitting a configuration message and an apparatus. A first message is received from a first node, where the first message includes at least a configuration of a second node and/or a dual connectivity configuration. A first reply message is sent to the first node if a configuration in the first message is accepted, so that the first node learns that a user terminal accepts the configuration; or a second reply message is sent to the first node if a configuration in the first message is not accepted, so that the first node learns that a user terminal does not accept the configuration; or no message is sent to the first node if a configuration in the first message is not accepted or the configuration cannot be completed. In the solution, information in a first message is received and configured, all possible configuration results are analyzed, and a first node and/or a second node are notified of the configuration results. Therefore, a process of transmitting a configuration message is efficiently completed.

BRIEF DESCRIPTION OF THE DRAWINGS

To describe the technical solutions in the embodiments more clearly, the following briefly describes the accompanying drawings required for describing the embodiments or the prior art. Apparently, the accompanying drawings in the following description show merely some embodiments, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments with reference to the accompanying drawings in the embodiments. Apparently, the described embodiments are merely some but not all of the embodiments. All other embodiments obtained by a person of ordinary skill in the art based on the embodiments without creative efforts shall fall within the protection scope of embodiments.

The embodiments are applied to a wireless communications system, and the wireless communications system includes at least user equipment and at least two base stations.

The user equipment may be a wireless terminal or may be a wired terminal. The wireless terminal may refer to a device that provides voice and/or data connectivity for a user, a handheld device with a radio connection function, or another processing device connected to a radio modem. The wireless terminal may communicate with one or more core networks by using a radio access network (RAN). The wireless terminal may be a mobile terminal such as a mobile phone (or referred to as a "cellular" phone) or a computer with a mobile terminal.

The base station (for example, an access point) may refer to a device that is in an access network and communicates, over an air interface, with the wireless terminal by using one or more sectors. The base station may be configured to mutually convert a received over-the-air frame and an IP packet and serve as a router between the wireless terminal and a rest portion of the access network, where the rest portion of the access network may include an Internet Protocol (IP) network. The base station may further coordinate attribute management of the air interface. For example, the base station may be a base transceiver station (BTS) in global system for mobile communications (GSM) or code division multiple access (CDMA), or may be a NodeB (NodeB) in wideband CDMA (WCDMA), or may be an evolved NodeB (eNB or e-NodeB) in long term evolution (LTE), which is not limited in the embodiments.

Embodiment 1

Figure 1:
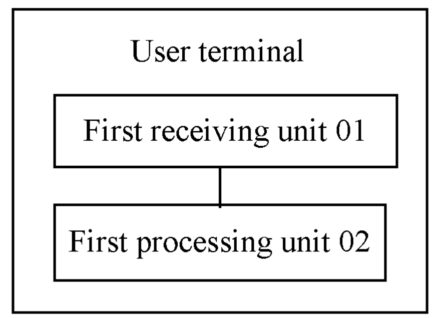
FIG. 1 is a schematic structural diagram 1 of a user terminal according to an embodiment.

As shown in FIG. 1, this embodiment provides a user terminal, including: a first receiving unit 01, configured to receive a first message from a first node, where the first message includes a configuration of a second node and/or a dual connectivity configuration; and a first processing unit 02, configured to: send a first reply message to the first node if the configuration in the first message is accepted, so that the first node learns that the user terminal accepts the configuration; or send a second reply message to the first node if the configuration in the first message is not accepted, so that the first node learns that the user terminal does not accept the configuration; or skip sending any message to the first node if the configuration in the first message is not accepted.

Further, the dual connectivity configuration is a configuration applied to both the first node and the second node.

Further, the first processing unit 02 is further configured to: send a first reply message to the first node if the configuration in the first message is accepted, so that the first node sends, according to the first reply message, a second message to the second node to indicate that the user terminal accepts the configuration; or send a second reply message to the first node if the configuration in the first message is not accepted, so that the first node sends, according to the second reply message, a third message to the second node to indicate that the terminal does not accept the configuration.

Further, the first message further includes a configuration of the first node.

Further, the first message further includes the configuration of the first node.

The first processing unit 02 is further configured to: provided that the configuration of the first node in the first message is not accepted, send a second reply message to the first node, so that the first node learns that the user terminal does not accept the configuration; or provided that the configuration of the first node in the first message is not accepted, send a second reply message to the first node, so that the first node sends, according to the second reply message, a third message to the second node to indicate that the terminal does not accept the configuration.

Further, the first processing unit 02 is further configured to: if the configuration of the first node in the first message is not accepted, and the configuration of the second node and/or the dual connectivity configuration are not accepted, send a second reply message to the first node, so that the first node learns that the user terminal does not accept the configuration of the first node in the first message and does not accept the configuration of the second node and/or the dual connectivity configuration; or if the configuration of the first node in the first message is not accepted, but the configuration of the second node is accepted, and/or the dual connectivity configuration is accepted, send a second reply message to the first node, so that the first node learns that the user terminal does not accept the configuration of the first node in the first message but accepts the configuration of the second node and/or accepts the dual connectivity configuration; or if the configuration of the first node in the first message is not accepted, and the configuration of the second node and/or the dual connectivity configuration are not accepted, send a second reply message to the first node, so that the first node sends, according to the second reply message, a second message to the second node to indicate that the terminal does not accept the configuration of the second node and/or the dual connectivity configuration; or if the configuration of the first node in the first message is not accepted, but the configuration of the second node is accepted, and/or the dual connectivity configuration is not accepted, send a second reply message to the first node, so that the first node sends, according to the second reply message, a third message to the second node to indicate that the user terminal does not accept the configuration of the first node in the first message or accepts the configuration of the second node and/or does not accept the dual connectivity configuration; or if the configuration of the first node in the first message is not accepted, but the configuration of the second node is accepted, and/or the dual connectivity configuration is not accepted, send a second reply message to the first node, so that the first node sends, according to the second reply message, a third message to the second node to indicate that the user terminal does not accept the configuration of the first node in the first message but accepts the configuration of the second node and/or accepts the dual connectivity configuration.

Figure 2:
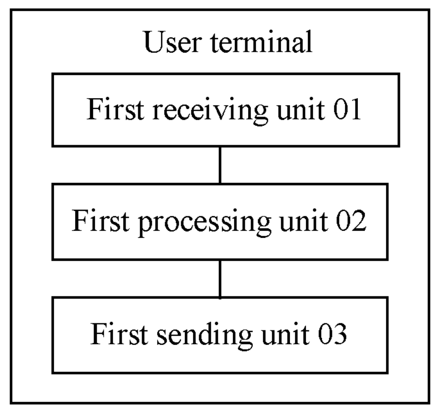
FIG. 2 is a schematic structural diagram 2 of a user terminal according to an embodiment.

Further, as shown in FIG. 2, the user terminal further includes: a first sending unit 03, configured to: send the second reply message to the first node if the configuration of the first node in the first message is not accepted, where the second reply message is a radio resource control (RRC) connection reestablishment request message.

Further, the first message further includes the configuration of the first node.

The first sending unit 03 is further configured to: if the configuration of the first node is accepted, and the configuration of the second node is accepted, and/or the dual connectivity configuration is accepted, send a first reply message to the first node, so that the first node learns that the user terminal accepts the configurations; or if the configuration of the first node is accepted, but the configuration of the second node is not accepted, and/or the dual connectivity configuration is not accepted, send a second reply message to the first node, so that the first node learns that the user terminal does not accept the configuration or the configurations.

Further, the first sending unit 03 is further configured to: if the configuration of the first node is accepted, and the configuration of the second node is accepted, and/or the dual connectivity configuration is accepted, send a first reply message to the first node, so that the first node learns that the user terminal accepts the configuration of the first node and accepts the configuration of the second node and/or accepts the dual connectivity configuration; or if the configuration of the first node is accepted, but the configuration of the second node is not accepted, and/or the dual connectivity configuration is not accepted, send a second reply message to the first node, so that the first node learns that the terminal device accepts the configuration of the first node but does not accept the configuration of the second node and/or does not accept the dual connectivity configuration; or if the configuration of the first node is accepted, and the configuration of the second node is accepted, and/or the dual connectivity configuration is accepted, send a first reply message to the first node, so that the first node sends, according to the first reply message, a second message to the second node to indicate that the user terminal accepts the configuration of the second node and/or accepts the dual connectivity configuration; or if the configuration of the first node is accepted, but the configuration of the second node is not accepted, and/or the dual connectivity configuration is not accepted, send a second reply message to the first node, so that the first node sends, according to the second reply message, a third message to the second node to indicate that the user terminal does not accept the configuration of the second node and/or does not accept the dual connectivity configuration.

Further, the first sending unit 03 is further configured to: if the configuration of the first node is accepted, but the configuration of the second node is not accepted, and/or the dual connectivity configuration is not accepted, send a second reply message to the first node, so that the first node learns that the user terminal does not accept the configuration or the configurations, where the second reply message is an RRC connection reconfiguration complete message or an RRC connection reestablishment request message; or if the configuration of the first node is accepted, and the configuration of the second node is accepted, and/or the dual connectivity configuration is accepted, send a first reply message to the first node, so that the first node learns that the user terminal accepts the configurations, where the first reply message is an RRC connection reconfiguration complete message.

Further, the first receiving unit 01 is further configured to receive a fourth message sent by the first node, where the fourth message includes at least an updated configuration provided by the second node; and the first sending unit 03 is further configured to: if the updated configuration that is in the fourth message and provided by the second node is accepted, send a first reply message to the first node, so that the first node learns that the user terminal accepts the configuration; or if the updated configuration that is in the fourth message and provided by the second node is not accepted, send a second reply message to the first node, so that the first node learns that the user terminal does not accept the configuration.

Further, the first processing unit 02 is further configured to perform one or more of the following: triggering an RRC reestablishment procedure; releasing configurations of all secondary serving cells Scells; deleting the configurations of all the Scells; releasing configurations of all secondary stations or second stations; deleting the configurations of all the secondary stations or the second stations; resetting media access control (MAC); applying a basic configuration of a primary cell of the first node; triggering an RRC reestablishment procedure; releasing the configuration of the second node and/or the dual connectivity configuration included in the first message; resetting the configuration of the second node and/or the dual connectivity configuration included in the first message; releasing a configuration related to the second node; deleting the configuration related to the second node; communicating with the second node by using a configuration before the first message is received; communicating with the first node by using the configuration before the first message is received; or communicating with the first node by using the configuration of the first node included in the first message.

Further, the first message further includes a radio resource configuration of the second node, and the radio resource configuration is used by the user terminal to access the second node or synchronize with the second node; the first processing unit 02 is further configured to initiate random access to the second node; and the first sending unit 03 is further configured to: if the random access succeeds, send a third reply message to the first node to indicate that the user terminal successfully accesses the second node and/or the user terminal accepts the configuration; or if the random access fails, send a fourth reply message to the first node to indicate that the user terminal fails to access the second node and/or the user terminal does not accept the configuration.

Further, the first message further includes the radio resource configuration of the second node, and the radio resource configuration is used by the user terminal to access the second node or synchronize with the second node; the first processing unit 02 is further configured to initiate random access to the second node; and the first sending unit 03 is further configured to: if the random access succeeds, send a third reply message to the first node to indicate that the user terminal successfully accesses the second node; or if the random access fails, send a fourth reply message to the first node to indicate that the user terminal fails to access the second node.

Further, each of the first reply message to the fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or random access channel (RACH) success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

Figure 3:
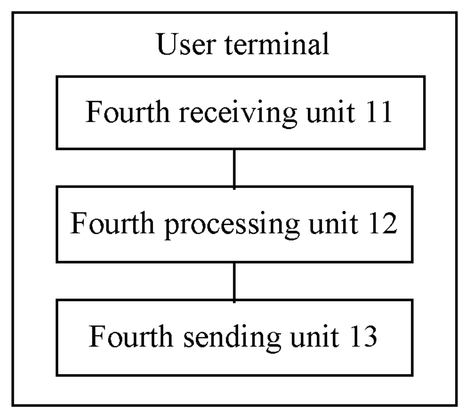
FIG. 3 is a schematic structural diagram 3 of a user terminal according to an embodiment.

As shown in FIG. 3, this embodiment provides a user terminal, including: a fourth receiving unit 11, configured to receive a first message from a first node, where the first message includes a radio resource configuration of a second node, and the radio resource configuration is used by the user terminal to access the second node or synchronize with the second node; a fourth processing unit 12, configured to initiate random access to the second node; and a fourth sending unit 13, configured to: if the random access succeeds, send a third reply message to the first node to indicate that the user terminal successfully accesses the second node and/or the configuration succeeds; or if the random access fails, send a fourth reply message to the first node to indicate that the user terminal fails to access the second node and/or the configuration fails.

Further, the first message further includes one or more of the following: a configuration of the first node, a configuration of the second node, or a dual connectivity configuration.

Further, the fourth sending unit 13 is further configured to: send a first reply message to the first node if the configuration included in the first message is accepted, so that the first node learns that the user terminal accepts the configuration or the configuration succeeds.

Further, the fourth sending unit 13 is further configured to: when the first message includes the configuration of the second node and/or the dual connectivity configuration, if the configuration of the second node and/or the dual connectivity configuration are accepted, send a third reply message to the first node to indicate that the configuration or the configurations succeeds or succeed; or when the first message includes the configuration of the first node in addition to the configuration of the second node and/or the dual connectivity configuration, if the configuration of the first node is accepted, and the configuration of the second node and/or the dual connectivity configuration are accepted, send a third reply message to the first node to indicate that the configurations succeed.

Further, the fourth sending unit 13 is further configured to: if the configuration of the first node is accepted, but the configuration of the second node and/or the dual connectivity configuration are not accepted, send a third reply message to the first node to indicate that the configuration of the first node is accepted but the configuration of the second node and/or the dual connectivity configuration are not accepted; or when the first message includes the configuration of the second node and/or the dual connectivity configuration, if the configuration of the second node and/or the dual connectivity configuration are not accepted, send a third reply message to the first node to indicate that the configuration or the configurations fails or fail.

Further, the fourth sending unit 13 is further configured to: if access succeeds, send a third reply message to the first node to indicate that the access succeeds and the configuration succeeds; or if access fails, send a fourth reply message to the first node to indicate that the access fails and the configuration succeeds.

Further, the fourth sending unit 13 is further configured to: if access succeeds, send a third reply message to the first node to indicate that the access succeeds and indicate that the configuration of the first node is accepted but the configuration of the second node and/or the dual connectivity configuration are not accepted; or if access fails, send a fourth reply message to the first node to indicate that the access fails and indicate that the configuration of the first node is accepted but the configuration of the second node and/or the dual connectivity configuration are not accepted.

Further, the third reply message is an RRC reconfiguration complete message; and/or the fourth reply message is an RRC reconfiguration complete message.

Further, the fourth processing unit 02 is further configured to perform one or more of the following: triggering an RRC reestablishment procedure; releasing the configuration of the second node and/or the dual connectivity configuration included in the first message; resetting the configuration of the second node and/or the dual connectivity configuration included in the first message; releasing a configuration related to the second node; deleting the configuration related to the second node; communicating with the second node by using a configuration before the first message is received; communicating with the first node by using the configuration before the first message is received; or communicating with the first node by using the configuration of the first node included in the first message.

Further, each of the first reply message to the fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

The user terminal provided in this embodiment receives a first message from a first node, where the first message includes at least a configuration of a second node and/or a dual connectivity configuration; and sends a first reply message to the first node if the configuration in the first message is accepted, so that the first node learns that the user terminal accepts the configuration; or sends a second reply message to the first node if the configuration in the first message is not accepted, so that the first node learns that the user terminal does not accept the configuration; or skips sending any message to the first node if the configuration in the first message is not accepted or the configuration cannot be completed. In the solution, information in a first message is received and configured, all possible configuration results are analyzed, and a first node and/or a second node are notified of the configuration results. Therefore, a process of transmitting a configuration message is efficiently completed.

Embodiment 2

Figure 4:
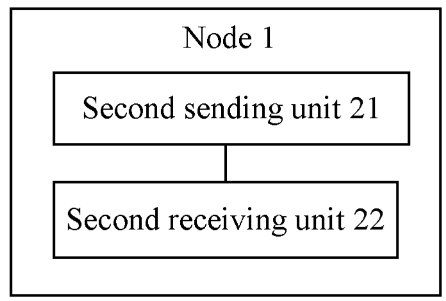
FIG. 4 is a schematic structural diagram 1 of a node 1 according to an embodiment.

As shown in FIG. 4, this embodiment provides a node 1, including: a second sending unit 21, configured to send a first message to a user terminal, where the first message includes a configuration of a second node and/or a dual connectivity configuration; and a second receiving unit 22, configured to: receive a first reply message from the user terminal to learn that the user terminal accepts the configuration; or receive a second reply message from the user terminal to learn that the user terminal does not accept the configuration.

Further, the second receiving unit 22 is further configured to receive a fifth message sent by the second node, where the fifth message includes the configuration of the second node and/or the dual connectivity configuration.

Further, the first message and/or the fifth message further include a configuration of the first node.

Further, a first reply message sent by the user terminal is received, where the first reply message is used to indicate: the configuration of the first node is accepted, and the configuration of the second node is accepted, and/or the dual connectivity configuration is accepted; or the configuration of the first node is accepted, but the configuration of the second node is not accepted, and/or the dual connectivity configuration is accepted; or the configuration of the first node is not accepted, and the configuration of the second node is not accepted, and/or the dual connectivity configuration is accepted; or the configuration of the first node is not accepted, but the configuration of the second node is accepted, and/or the dual connectivity configuration is accepted.

Further, the second sending unit 21 is further configured to: if the first reply message is received from the user terminal, send, according to the first reply message, a second message to the second node to indicate a configuration success of the user terminal; or if the second reply message is received from the user terminal, send, according to the second reply message, a third message to the second node to indicate a configuration failure of the user terminal.

Further, the configuration success includes a second node configuration success and/or a dual connectivity configuration success; or the configuration failure includes a second node configuration failure and/or a dual connectivity configuration failure.

Further, the second receiving unit 22 is further configured to receive a sixth message from the second node, where the sixth message includes an updated configuration provided by the second node; and the second sending unit 21 is further configured to: generate a fourth message according to the updated configuration that is in the sixth message and provided by the second node, and send the fourth message to the user terminal, where the fourth message includes the updated configuration provided by the second node.

Figure 5:
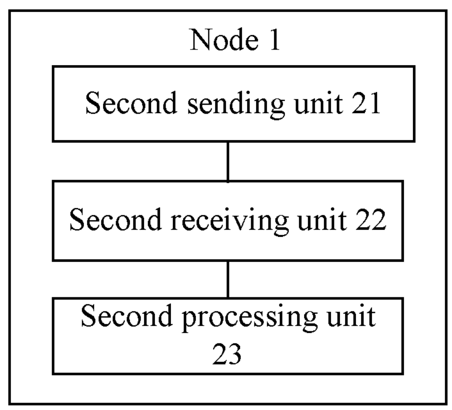
FIG. 5 is a schematic structural diagram 2 of a node 1 according to an embodiment.

Further, as shown in FIG. 5, the node 1 further includes: a second processing unit 23, configured to determine whether the second reply message sent by the user terminal is received within a first preset time period, where the second sending unit 21 is further configured to: if the second reply message sent by the user terminal is not received within the first preset time period, send a third message to the second node to indicate a configuration failure of the user terminal.

Further, the first message includes a radio resource configuration of the second node, and the radio resource configuration is used by the user terminal to access the second node or synchronize with the second node; and the second receiving unit 22 is further configured to: receive a first reply message from the user terminal, where the first reply message is used to indicate that the user terminal successfully accesses the second node and/or the user terminal accepts the configuration; or receive a second reply message from the user terminal, where the second reply message is used to indicate that the user terminal fails to access the second node and/or the user terminal does not accept the configuration.

Further, the first message includes a radio resource configuration of the second node, and the radio resource configuration is used by the user terminal to access the second node or synchronize with the second node; and the second receiving unit 22 is further configured to: receive a third reply message from the user terminal, where the third reply message is used to indicate that the user terminal successfully accesses the second node; and/or receive a seventh message from the second node, where the seventh message is used to indicate that the user terminal successfully accesses the second node.

Further, the first message includes a radio resource configuration of the second node, and the radio resource configuration is used by the user terminal to access the second node or synchronize with the second node; and the second receiving unit 22 is further configured to: receive a fourth reply message from the user terminal, where the fourth reply message is used to indicate that the user terminal fails to access the second node; and/or receive an eighth message from the second node, where the eighth message is used to indicate that the user terminal fails to access the second node.

Further, the first message includes a radio resource configuration of the second node, and the radio resource configuration is used by the user terminal to access the second node or synchronize with the second node; the second processing unit 23 is further configured to determine whether the fourth reply message sent by the user terminal is received within a second preset time period; and the second sending unit 21 is further configured to: if the fourth reply message sent by the user terminal is not received within the second preset time period, and the third reply message sent by the user terminal is not received within the second preset time period, send a seventh message to the second node to indicate that the user terminal fails to access the second node.

Further, each of the first reply message to the fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

Figure 6:
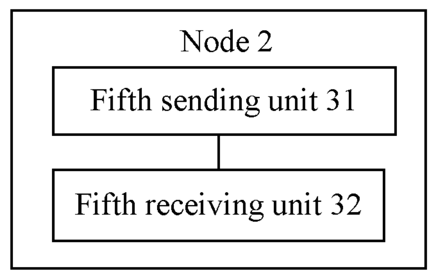
FIG. 6 is a schematic structural diagram 1 of a node 2 according to an embodiment.

As shown in FIG. 6, this embodiment provides a node 2, including: a fifth sending unit 31, configured to send a first message to a terminal device, where the first message includes a radio resource configuration of a second node, and the radio resource configuration is used by the terminal device to access the second node or synchronize with the second node; and a fifth receiving unit 32, configured to: receive a third reply message sent by the terminal device, where the third reply message is used to indicate that the terminal device successfully accesses the second node and/or the configuration succeeds; or receive a fourth reply message sent by the terminal device, where the fourth reply message is used to indicate that the terminal device fails to access the second node and/or the configuration fails.

Further, the first message further includes one or more of the following: a configuration of the first node, a configuration of the second node, or a dual connectivity configuration.

Further, the fifth receiving unit 32 is further configured to: if the terminal device accepts the configuration included in the first message, receive a first reply message sent by the terminal device, so that the first node learns that the terminal device accepts the configuration.

Further, the fifth receiving unit 32 is further configured to: when the first message includes the configuration of the second node and/or the dual connectivity configuration, if the terminal device accepts the configuration of the second node and/or the dual connectivity configuration, receive a first reply message to learn that the configuration or the configurations succeeds or succeed; or when the first message includes the configuration of the first node in addition to the configuration of the second node and/or the dual connectivity configuration, if the terminal device accepts the configuration of the first node and accepts the configuration of the second node and/or the dual connectivity configuration, receive a first reply message to learn that the configurations succeed.

Further, the fifth receiving unit 32 is further configured to: when the first message includes the configuration of the second node and/or the dual connectivity configuration, if the terminal device does not accept the configuration of the second node and/or the dual connectivity configuration, receive a second reply message to learn the configuration failure of the terminal device; or when the first message includes the configuration of the first node in addition to the configuration of the second node and/or the dual connectivity configuration, if the terminal device accepts the configuration of the first node but does not accept the configuration of the second node and/or the dual connectivity configuration, receive a second reply message to learn that the terminal device accepts the configuration of the first node but does not accept the configuration of the second node and/or the dual connectivity configuration.

Further, the fifth receiving unit 32 is further configured to: when the first message includes the configuration of the second node and/or the dual connectivity configuration, and the terminal device accepts the configuration of the second node and/or the dual connectivity configuration, if the terminal device successfully accesses the second node, receive a third reply message to learn that the configuration or the configurations succeeds or succeed and/or the access succeeds, or if the terminal device fails to access the second node, receive a fourth reply message to learn that the configuration or the configurations succeeds or succeed and/or the access succeeds; or when the first message includes the configuration of the first node in addition to the configuration of the second node and/or the dual connectivity configuration, and the terminal device accepts the configuration of the first node and accepts the configuration of the second node and/or the dual connectivity configuration, if the terminal device successfully accesses the second node, receive a third reply message to learn that the configurations succeed and/or the access succeeds, or if the terminal device fails to access the second node, receive a fourth reply message to learn that the configurations succeed and/or the access succeeds.

Further, each of the first reply message to the fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

This embodiment provides a node. A first message is received from a first node, where the first message includes at least a configuration of a second node and/or a dual connectivity configuration. A first reply message is sent to the first node if a configuration in the first message is accepted, so that the first node learns that a user terminal accepts the configuration; or a second reply message is sent to the first node if a configuration in the first message is not accepted, so that the first node learns that a user terminal does not accept the configuration; or no message is sent to the first node if a configuration in the first message is not accepted or the configuration cannot be completed. In the solution, information in a first message is received and configured, all possible configuration results are analyzed, and a first node and/or a second node are notified of the configuration results. Therefore, a process of transmitting a configuration message is efficiently completed.

Embodiment 3

Figure 7:
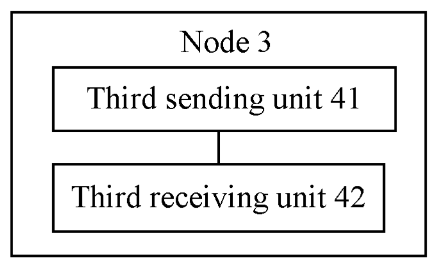
FIG. 7 is a schematic structural diagram 1 of a node 3 according to an embodiment.

As shown in FIG. 7, this embodiment provides a node 3, including: a third sending unit 41, configured to send a fifth message to a first node, where the fifth message includes a configuration of the second node and/or a dual connectivity configuration; and a third receiving unit 42, configured to: receive from the first node a second message indicating the configuration success of a terminal device; or receive from the first node a third message indicating the configuration failure of a user terminal.

Further, the third sending unit 41 is further configured to send a fifth message to the first node, so that the first node sends a first message to the user terminal according to the fifth message, where the first message and/or the fifth message include the configuration of the second node and/or the dual connectivity configuration.

Further, the first message and/or the fifth message further include a configuration of the first node.

Further, the third sending unit 41 is further configured to: generate a sixth message according to the third message, and send the sixth message to the first node, where the sixth message includes an updated configuration provided by the second node.

Further, the fifth message further includes a radio resource configuration of the second node, and the radio resource configuration is used by the user terminal to access the second node or synchronize with the second node.

Further, the third receiving unit 42 is further configured to receive random access initiated by the user terminal; and the third sending unit 41 is further configured to: if the random access succeeds, send a seventh message to the first node, so that the first node learns that the user terminal successfully accesses the second node; or if the random access fails, send an eighth message to the first node, where the eighth message is used by the user terminal to learn a failure in access to the second node.

Further, the third receiving unit 42 is further configured to receive random access initiated by the user terminal; and the third sending unit 41 is further configured to: if the random access succeeds, send a seventh message to the first node, so that the first node learns that the user terminal successfully accesses the second node; or if the random access fails, send an eighth message to the first node, where the eighth message is used by the user terminal to access the second node unsuccessfully.

Further, the third receiving unit 42 is further configured to: receive from the first node a second message indicating an access success of the user terminal; or receive from the first node a third message indicating an access failure of the user terminal; or receive from the first node a second message indicating the configuration success and an access success of the user terminal; or receive from the first node a second message indicating the configuration success and an access failure of the user terminal; or receive from the first node a third message used to instruct to delete a cell the user terminal fails to access, or instruct to delete the second node so that the second node does not communicate with the user terminal any more.

Figure 8:
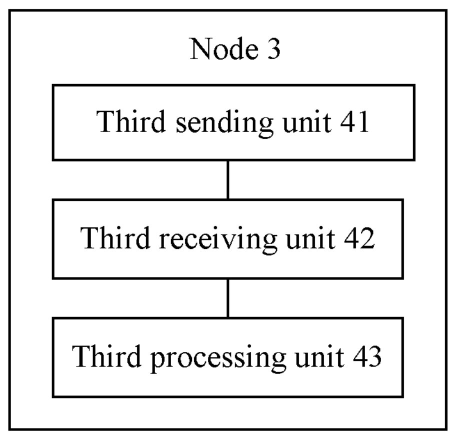
FIG. 8 is a schematic structural diagram 2 of a node 3 according to an embodiment.

Further, as shown in FIG. 8, the node 3 further includes: a third processing unit 43, configured to perform one or more of the following: triggering an RRC reestablishment procedure; releasing a configuration and/or context information that are related to the user terminal; deleting the configuration and/or the context information that are related to the user terminal; deleting a secondary cell configuration that is of the second node and related to the terminal, where a secondary cell is a cell that provides a service for the terminal, and the secondary cell is a secondary cell between the user terminal and the second node; releasing the configuration of the second node and/or the dual connectivity configuration included in the fifth message; resetting the configuration of the second node and/or the dual connectivity configuration included in the fifth message; communicating with the user terminal by using a configuration before the first message is received; or triggering an RRC reestablishment procedure of the user terminal on the second node.

Further, each of the first reply message to a fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

Figure 9:
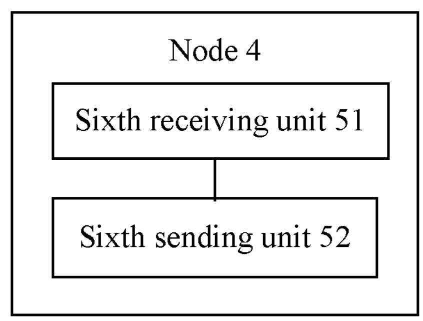
FIG. 9 is a schematic structural diagram 1 of a node 4 according to an embodiment.

As shown in FIG. 9, this embodiment provides a node 4, including: a sixth receiving unit 51, configured to receive random access initiated by the user terminal; and a sixth sending unit 52, configured to: if the terminal device successfully accesses the second node, send a seventh message to the first node, where the seventh message is used to indicate that the terminal device successfully accesses the second node or successfully accesses a cell of the second node; or if the terminal device fails to access the second node, send an eighth message to the first node, where the seventh message is used to indicate that the terminal device fails to access the second node or fails to access a cell of the second node.

Further, the sixth receiving unit 51 is further configured to: before the seventh message or the eighth message is sent to the first node, receive a second message from the first node to learn a configuration success of the user terminal; or receive a third message from the first node to learn a configuration failure of the user terminal.

Further, the sixth sending unit 52 is further configured to send a fifth message to the first node, where the fifth message includes a radio resource configuration of the second node, and the radio resource configuration is used by the terminal device to access the second node or synchronize with the second node.

Further, the fifth message further includes one or more of a configuration of the first node, a configuration of the second node, or a dual connectivity configuration.

Further, the sixth receiving unit 51 is further configured to: receive a ninth message from the first node, where the ninth message is used to indicate that the terminal device successfully accesses the second node; or receive a tenth message from the first node, where the tenth message is used to indicate that the terminal device fails to access the second node.

Further, each of the first message to the tenth message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

This embodiment provides a node. A first message is received from a first node, where the first message includes at least a configuration of a second node and/or a dual connectivity configuration. A first reply message is sent to the first node if a configuration in the first message is accepted, so that the first node learns that a user terminal accepts the configuration; or a second reply message is sent to the first node if a configuration in the first message is not accepted, so that the first node learns that a user terminal does not accept the configuration; or no message is sent to the first node if a configuration in the first message is not accepted or the configuration cannot be completed. In the solution, information in a first message is received and configured, all possible configuration results are analyzed, and a first node and/or a second node are notified of the configuration results. Therefore, a process of transmitting a configuration message is efficiently completed.

Embodiment 4

Figure 10:
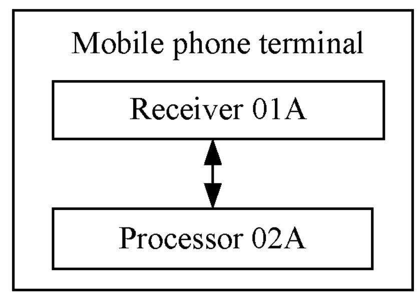
FIG. 10 is a schematic structural diagram 1 of hardware of a mobile phone terminal according to an embodiment.

FIG. 10 shows a schematic structural diagram of hardware of a user terminal according to the embodiments.

The user terminal may be a mobile phone, a tablet computer, a PDA, or the like. In this embodiment, a mobile phone terminal is used as a user terminal for illustration: a receiver 01A, configured to receive a first message from a first node, where the first message includes a configuration of a second node and/or a dual connectivity configuration; and a processor 02A, configured to: send a first reply message to the first node if the configuration in the first message is accepted, so that the first node learns that the user terminal accepts the configuration; or send a second reply message to the first node if the configuration in the first message is not accepted, so that the first node learns that the user terminal does not accept the configuration; or skip sending any message to the first node if the configuration in the first message is not accepted.

Further, the dual connectivity configuration is a configuration applied to both the first node and the second node.

Further, the processor 02A is further configured to: send a first reply message to the first node if the configuration in the first message is accepted, so that the first node sends, according to the first reply message, a second message to the second node to indicate that the user terminal accepts the configuration; or send a second reply message to the first node if the configuration in the first message is not accepted, so that the first node sends, according to the second reply message, a third message to the second node to indicate that the terminal does not accept the configuration.

Further, the first message further includes a configuration of the first node.

Further, the first message further includes the configuration of the first node; and the processor 02A is further configured to: provided that the configuration of the first node in the first message is not accepted, send a second reply message to the first node, so that the first node learns that the user terminal does not accept the configuration; or provided that the configuration of the first node in the first message is not accepted, send a second reply message to the first node, so that the first node sends, according to the second reply message, a third message to the second node to indicate that the terminal does not accept the configuration.

Further, the processor 02A is further configured to: if the configuration of the first node in the first message is not accepted, and the configuration of the second node and/or the dual connectivity configuration are not accepted, send a second reply message to the first node, so that the first node learns that the user terminal does not accept the configuration of the first node in the first message and does not accept the configuration of the second node and/or the dual connectivity configuration; or if the configuration of the first node in the first message is not accepted, but the configuration of the second node is accepted, and/or the dual connectivity configuration is accepted, send a second reply message to the first node, so that the first node learns that the user terminal does not accept the configuration of the first node in the first message but accepts the configuration of the second node and/or accepts the dual connectivity configuration; or if the configuration of the first node in the first message is not accepted, and the configuration of the second node and/or the dual connectivity configuration are not accepted, send a second reply message to the first node, so that the first node sends, according to the second reply message, a second message to the second node to indicate that the terminal does not accept the configuration of the second node and/or the dual connectivity configuration; or if the configuration of the first node in the first message is not accepted, but the configuration of the second node is accepted, and/or the dual connectivity configuration is not accepted, send a second reply message to the first node, so that the first node sends, according to the second reply message, a third message to the second node to indicate that the user terminal does not accept the configuration of the first node in the first message or accepts the configuration of the second node and/or does not accept the dual connectivity configuration; or if the configuration of the first node in the first message is not accepted, but the configuration of the second node is accepted, and/or the dual connectivity configuration is not accepted, send a second reply message to the first node, so that the first node sends, according to the second reply message, a third message to the second node to indicate that the user terminal does not accept the configuration of the first node in the first message but accepts the configuration of the second node and/or accepts the dual connectivity configuration.

Figure 11:
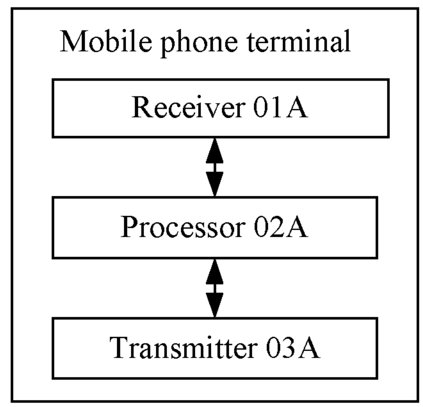
FIG. 11 is a schematic structural diagram 2 of hardware of a mobile phone terminal according to an embodiment.

Further, as shown in FIG. 11, the mobile phone terminal further includes: a transmitter 03A, configured to: send the second reply message to the first node if the configuration of the first node in the first message is not accepted, where the second reply message is an RRC connection reestablishment request message.

Further, the first message further includes the configuration of the first node; and the transmitter 03A is further configured to: if the configuration of the first node is accepted, and the configuration of the second node is accepted, and/or the dual connectivity configuration is accepted, send a first reply message to the first node, so that the first node learns that the user terminal accepts the configurations; or if the configuration of the first node is accepted, but the configuration of the second node is not accepted, and/or the dual connectivity configuration is not accepted, send a second reply message to the first node, so that the first node learns that the user terminal does not accept the configuration or the configurations.

Further, the transmitter 03A is further configured to: if the configuration of the first node is accepted, and the configuration of the second node is accepted, and/or the dual connectivity configuration is accepted, send a first reply message to the first node, so that the first node learns that the user terminal accepts the configuration of the first node and accepts the configuration of the second node and/or accepts the dual connectivity configuration; or if the configuration of the first node is accepted, but the configuration of the second node is not accepted, and/or the dual connectivity configuration is not accepted, send a second reply message to the first node, so that the first node learns that the terminal device accepts the configuration of the first node but does not accept the configuration of the second node and/or does not accept the dual connectivity configuration; or if the configuration of the first node is accepted, and the configuration of the second node is accepted, and/or the dual connectivity configuration is accepted, send a first reply message to the first node, so that the first node sends, according to the first reply message, a second message to the second node to indicate that the user terminal accepts the configuration of the second node and/or accepts the dual connectivity configuration; or if the configuration of the first node is accepted, but the configuration of the second node is not accepted, and/or the dual connectivity configuration is not accepted, send a second reply message to the first node, so that the first node sends, according to the second reply message, a third message to the second node to indicate that the user terminal does not accept the configuration of the second node and/or does not accept the dual connectivity configuration.

Further, the transmitter 03A is further configured to: if the configuration of the first node is accepted, but the configuration of the second node is not accepted, and/or the dual connectivity configuration is not accepted, send a second reply message to the first node, so that the first node learns that the user terminal does not accept the configuration or the configurations, where the second reply message is an RRC connection reconfiguration complete message or an RRC connection reestablishment request message; or if the configuration of the first node is accepted, and the configuration of the second node is accepted, and/or the dual connectivity configuration is accepted, send a first reply message to the first node, so that the first node learns that the user terminal accepts the configurations, where the first reply message is an RRC connection reconfiguration complete message.

Further, the receiver 01A is further configured to receive a fourth message sent by the first node, where the fourth message includes at least an updated configuration provided by the second node; and the transmitter 03A is further configured to: if the updated configuration that is in the fourth message and provided by the second node is accepted, send a first reply message to the first node, so that the first node learns that the user terminal accepts the configuration; or if the updated configuration that is in the fourth message and provided by the second node is not accepted, send a second reply message to the first node, so that the first node learns that the user terminal does not accept the configuration.

Further, the processor 02A is further configured to perform one or more of the following: triggering an RRC reestablishment procedure; releasing configurations of all secondary serving cells Scells; deleting the configurations of all the Scells; releasing configurations of all secondary stations or second stations; deleting the configurations of all the secondary stations or the second stations; resetting MAC; applying a basic configuration of a primary cell of the first node; triggering an RRC reestablishment procedure; releasing the configuration of the second node and/or the dual connectivity configuration included in the first message; resetting the configuration of the second node and/or the dual connectivity configuration included in the first message; releasing a configuration related to the second node; deleting the configuration related to the second node; communicating with the second node by using a configuration before the first message is received; communicating with the first node by using the configuration before the first message is received; or communicating with the first node by using the configuration of the first node included in the first message.

Further, the first message further includes a radio resource configuration of the second node, and the radio resource configuration is used by the user terminal to access the second node or synchronize with the second node; the processor 02A is further configured to initiate random access to the second node; and the transmitter 03A is further configured to: if the random access succeeds, send a third reply message to the first node to indicate that the user terminal successfully accesses the second node and/or the user terminal accepts the configuration; or if the random access fails, send a fourth reply message to the first node to indicate that the user terminal fails to access the second node and/or the user terminal does not accept the configuration.

Further, the first message further includes the radio resource configuration of the second node, and the radio resource configuration is used by the user terminal to access the second node or synchronize with the second node; the processor 02A is further configured to initiate random access to the second node; and the transmitter 03A is further configured to: if the random access succeeds, send a third reply message to the first node to indicate that the user terminal successfully accesses the second node; or if the random access fails, send a fourth reply message to the first node to indicate that the user terminal fails to access the second node.

Further, each of the first reply message to the fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

Figure 12:
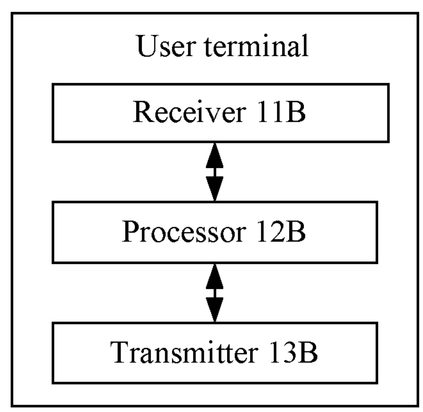
FIG. 12 is a schematic structural diagram 1 of hardware of a user terminal according to an embodiment.

As shown in FIG. 12, this embodiment provides a user terminal, including: a receiver 11B, configured to receive a first message from a first node, where the first message includes a radio resource configuration of a second node, and the radio resource configuration is used by the user terminal to access the second node or synchronize with the second node; a processor 12B, configured to initiate random access to the second node; and a transmitter 13B, configured to: if the random access succeeds, send a third reply message to the first node to indicate that the user terminal successfully accesses the second node and/or the configuration succeeds; or if the random access fails, send a fourth reply message to the first node to indicate that the user terminal fails to access the second node and/or the configuration fails.

Further, the first message further includes one or more of the following: a configuration of the first node, a configuration of the second node, or a dual connectivity configuration.

Further, the transmitter 13B is further configured to: send a first reply message to the first node if the configuration included in the first message is accepted, so that the first node learns that the user terminal accepts the configuration or the configuration succeeds.

Further, the transmitter 13B is further configured to: when the first message includes the configuration of the second node and/or the dual connectivity configuration, if the configuration of the second node and/or the dual connectivity configuration are accepted, send a third reply message to the first node to indicate that the configuration or the configurations succeeds or succeed; or when the first message includes the configuration of the first node in addition to the configuration of the second node and/or the dual connectivity configuration, if the configuration of the first node is accepted, and the configuration of the second node and/or the dual connectivity configuration are accepted, send a third reply message to the first node to indicate that the configurations succeed.

Further, the transmitter 13B is further configured to: if the configuration of the first node is accepted, but the configuration of the second node and/or the dual connectivity configuration are not accepted, send a third reply message to the first node to indicate that the configuration of the first node is accepted but the configuration of the second node and/or the dual connectivity configuration are not accepted; or when the first message includes the configuration of the second node and/or the dual connectivity configuration, if the configuration of the second node and/or the dual connectivity configuration are not accepted, send a third reply message to the first node to indicate that the configuration or the configurations fails or fail.

Further, the transmitter 13B is further configured to: if access succeeds, send a third reply message to the first node to indicate that the access succeeds and the configuration succeeds; or if access fails, send a fourth reply message to the first node to indicate that the access fails and the configuration succeeds.

Further, the transmitter 13B is further configured to: if access succeeds, send a third reply message to the first node to indicate that the access succeeds and indicate that the configuration of the first node is accepted but the configuration of the second node and/or the dual connectivity configuration are not accepted; or if access fails, send a fourth reply message to the first node to indicate that the access fails and indicate that the configuration of the first node is accepted but the configuration of the second node and/or the dual connectivity configuration are not accepted.

Further, the third reply message is an RRC reconfiguration complete message; and/or the fourth reply message is an RRC reconfiguration complete message.

Further, the processor 12B is further configured to perform one or more of the following: triggering an RRC reestablishment procedure; releasing the configuration of the second node and/or the dual connectivity configuration included in the first message; resetting the configuration of the second node and/or the dual connectivity configuration included in the first message; releasing a configuration related to the second node; deleting the configuration related to the second node; communicating with the second node by using a configuration before the first message is received; communicating with the first node by using the configuration before the first message is received; or communicating with the first node by using the configuration of the first node included in the first message.

Further, each of the first reply message to the fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

The user terminal provided in this embodiment receives a first message from a first node, where the first message includes at least a configuration of a second node and/or a dual connectivity configuration; and sends a first reply message to the first node if the configuration in the first message is accepted, so that the first node learns that the user terminal accepts the configuration; or sends a second reply message to the first node if the configuration in the first message is not accepted, so that the first node learns that the user terminal does not accept the configuration; or skips sending any message to the first node if the configuration in the first message is not accepted or the configuration cannot be completed. In the solution, information in a first message is received and configured, all possible configuration results are analyzed, and a first node and/or a second node are notified of the configuration results. Therefore, a process of transmitting a configuration message is efficiently completed.

Embodiment 5

Figure 13:
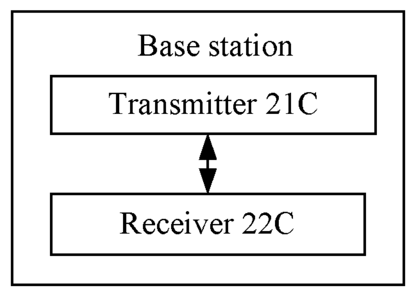
FIG. 13 is a schematic structural diagram 1 of hardware of a base station according to an embodiment.

As shown in FIG. 13, this embodiment provides a node, and a base station is used as an example and includes: a transmitter 21C, configured to send a first message to a user terminal, where the first message includes a configuration of a second node and/or a dual connectivity configuration; and a receiver 22C, configured to: receive a first reply message from the user terminal to learn that the user terminal accepts the configuration; or receive a second reply message from the user terminal to learn that the user terminal does not accept the configuration.

Further, the receiver 22C is further configured to receive a fifth message sent by the second node, where the fifth message includes the configuration of the second node and/or the dual connectivity configuration.

Further, the first message and/or the fifth message further include a configuration of the first node.

Further, a first reply message sent by the user terminal is received, where the first reply message is used to indicate: the configuration of the first node is accepted, and the configuration of the second node is accepted, and/or the dual connectivity configuration is accepted; or the configuration of the first node is accepted, but the configuration of the second node is not accepted, and/or the dual connectivity configuration is accepted; or the configuration of the first node is not accepted, and the configuration of the second node is not accepted, and/or the dual connectivity configuration is accepted; or the configuration of the first node is not accepted, but the configuration of the second node is accepted, and/or the dual connectivity configuration is accepted.

Further, the transmitter 21C is further configured to: if the first reply message is received from the user terminal, send, according to the first reply message, a second message to the second node to indicate a configuration success of the user terminal; or if the second reply message is received from the user terminal, send, according to the second reply message, a third message to the second node to indicate a configuration failure of the user terminal.

Further, the configuration success includes a second node configuration success and/or a dual connectivity configuration success; or the configuration failure includes a second node configuration failure and/or a dual connectivity configuration failure.

Further, the receiver 22C is further configured to receive a sixth message from the second node, where the sixth message includes an updated configuration provided by the second node; and the transmitter 21C is further configured to: generate a fourth message according to the updated configuration that is in the sixth message and provided by the second node, and send the fourth message to the user terminal, where the fourth message includes the updated configuration provided by the second node.

Figure 14:
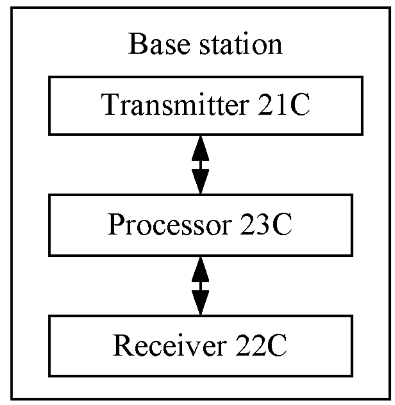
FIG. 14 is a schematic structural diagram 2 of hardware of a base station according to an embodiment.

Further, as shown in FIG. 14, the base station further includes: a processor 23C, configured to determine whether the second reply message sent by the user terminal is received within a first preset time period, where the transmitter 21C is further configured to: if the second reply message sent by the user terminal is not received within the first preset time period, send a third message to the second node to indicate a configuration failure of the user terminal.

Further, the first message includes a radio resource configuration of the second node, and the radio resource configuration is used by the user terminal to access the second node or synchronize with the second node; and the receiver 22C is further configured to: receive a first reply message from the user terminal, where the first reply message is used to indicate that the user terminal successfully accesses the second node and/or the user terminal accepts the configuration; or receive a second reply message from the user terminal, where the second reply message is used to indicate that the user terminal fails to access the second node and/or the user terminal does not accept the configuration.

Further, the first message includes a radio resource configuration of the second node, and the radio resource configuration is used by the user terminal to access the second node or synchronize with the second node; and the receiver 22C is further configured to: receive a third reply message from the user terminal, where the third reply message is used to indicate that the user terminal successfully accesses the second node; and/or receive a seventh message from the second node, where the seventh message is used to indicate that the user terminal successfully accesses the second node.

Further, the first message includes a radio resource configuration of the second node, and the radio resource configuration is used by the user terminal to access the second node or synchronize with the second node; and the receiver 22C is further configured to: receive a fourth reply message from the user terminal, where the fourth reply message is used to indicate that the user terminal fails to access the second node; and/or receive an eighth message from the second node, where the eighth message is used to indicate that the user terminal fails to access the second node.

Further, the first message includes a radio resource configuration of the second node, and the radio resource configuration is used by the user terminal to access the second node or synchronize with the second node; the processor 23C is further configured to determine whether the fourth reply message sent by the user terminal is received within a second preset time period; and the transmitter 21C is further configured to: if the fourth reply message sent by the user terminal is not received within the second preset time period, and the third reply message sent by the user terminal is not received within the second preset time period, send a seventh message to the second node to indicate that the user terminal fails to access the second node.

Further, each of the first reply message to the fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

Figure 15:
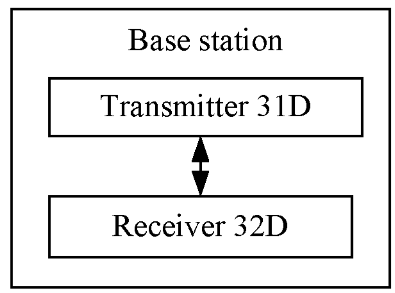
FIG. 15 is a schematic structural diagram 3 of hardware of a base station according to an embodiment.

As shown in FIG. 15, this embodiment provides a node, and a base station is used as an example and includes: a transmitter 31D, configured to send a first message to a terminal device, where the first message includes a radio resource configuration of a second node, and the radio resource configuration is used by the terminal device to access the second node or synchronize with the second node; and a receiver 32D, configured to: receive a third reply message sent by the terminal device, where the third reply message is used to indicate that the terminal device successfully accesses the second node and/or the configuration succeeds; or receive a fourth reply message sent by the terminal device, where the fourth reply message is used to indicate that the terminal device fails to access the second node and/or the configuration fails.

Further, the first message further includes one or more of the following: a configuration of the first node, a configuration of the second node, or a dual connectivity configuration.

Further, the receiver 32D is further configured to: if the terminal device accepts the configuration included in the first message, receive a first reply message sent by the terminal device, so that the first node learns that the terminal device accepts the configuration.

Further, the receiver 32D is further configured to: when the first message includes the configuration of the second node and/or the dual connectivity configuration, if the terminal device accepts the configuration of the second node and/or the dual connectivity configuration, receive a first reply message to learn that the configuration or the configurations succeeds or succeed; or when the first message includes the configuration of the first node in addition to the configuration of the second node and/or the dual connectivity configuration, if the terminal device accepts the configuration of the first node and accepts the configuration of the second node and/or the dual connectivity configuration, receive a first reply message to learn that the configurations succeed.

Figure 16:
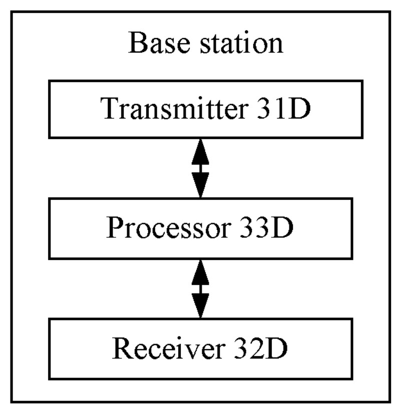
FIG. 16 is a schematic structural diagram 4 of hardware of a base station according to an embodiment.

Further, as shown in FIG. 16, the base station further includes: a processor 33D, configured to determine whether the first message includes the configuration of the second node and/or the dual connectivity configuration, whether the terminal device accepts the configuration of the second node and/or the dual connectivity configuration, and whether the first message further includes the configuration of the first node.

Further, the receiver 32D is further configured to: when the first message includes the configuration of the second node and/or the dual connectivity configuration, if the terminal device does not accept the configuration of the second node and/or the dual connectivity configuration, receive a second reply message to learn the configuration failure of the terminal device; or when the first message includes the configuration of the first node in addition to the configuration of the second node and/or the dual connectivity configuration, if the terminal device accepts the configuration of the first node but does not accept the configuration of the second node and/or the dual connectivity configuration, receive a second reply message to learn that the terminal device accepts the configuration of the first node but does not accept the configuration of the second node and/or the dual connectivity configuration.

Further, the receiver 32D is further configured to: when the first message includes the configuration of the second node and/or the dual connectivity configuration, and the terminal device accepts the configuration of the second node and/or the dual connectivity configuration, if the terminal device successfully accesses the second node, receive a third reply message to learn that the configuration or the configurations succeeds or succeed and/or the access succeeds, or if the terminal device fails to access the second node, receive a fourth reply message to learn that the configuration or the configurations succeeds or succeed and/or the access succeeds; or when the first message includes the configuration of the first node in addition to the configuration of the second node and/or the dual connectivity configuration, and the terminal device accepts the configuration of the first node and accepts the configuration of the second node and/or the dual connectivity configuration, if the terminal device successfully accesses the second node, receive a third reply message to learn that the configurations succeed and/or the access succeeds, or if the terminal device fails to access the second node, receive a fourth reply message to learn that the configurations succeed and/or the access succeeds.

Further, each of the first reply message to the fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

This embodiment provides a node. A first message is received from a first node, where the first message includes at least a configuration of a second node and/or a dual connectivity configuration. A first reply message is sent to the first node if a configuration in the first message is accepted, so that the first node learns that a user terminal accepts the configuration; or a second reply message is sent to the first node if a configuration in the first message is not accepted, so that the first node learns that a user terminal does not accept the configuration; or no message is sent to the first node if a configuration in the first message is not accepted or the configuration cannot be completed. In the solution, information in a first message is received and configured, all possible configuration results are analyzed, and a first node and/or a second node are notified of the configuration results. Therefore, a process of transmitting a configuration message is efficiently completed.

Embodiment 6

Figure 17:
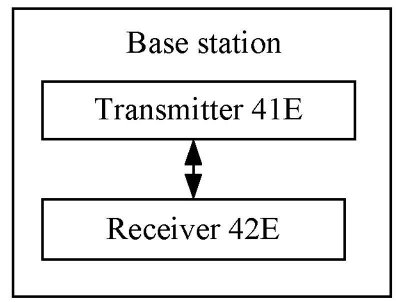
FIG. 17 is a schematic structural diagram 5 of hardware of a base station according to an embodiment.

As shown in FIG. 17, this embodiment provides a node, and a base station is used as an example and includes: a transmitter 41E, configured to send a fifth message to a first node, where the fifth message includes a configuration of the second node and/or a dual connectivity configuration; and a receiver 42E, configured to: receive from the first node a second message indicating the configuration success of a terminal device; or receive from the first node a third message indicating the configuration failure of a user terminal.

Further, the transmitter 41E is further configured to send a fifth message to the first node, so that the first node sends a first message to the user terminal according to the fifth message, where the first message and/or the fifth message include the configuration of the second node and/or the dual connectivity configuration.

Further, the first message and/or the fifth message further include a configuration of the first node.

Further, the transmitter 41E is further configured to: generate a sixth message according to the third message, and send the sixth message to the first node, where the sixth message includes an updated configuration provided by the second node.

Further, the fifth message further includes a radio resource configuration of the second node, and the radio resource configuration is used by the user terminal to access the second node or synchronize with the second node.

Further, the receiver 42E is further configured to receive random access initiated by the user terminal; and the transmitter 41E is further configured to: if the random access succeeds, send a seventh message to the first node, so that the first node learns that the user terminal successfully accesses the second node; or if the random access fails, send an eighth message to the first node, where the eighth message is used by the user terminal to learn a failure in access to the second node.

Further, the receiver 42E is further configured to receive random access initiated by the user terminal; and the transmitter 41E is further configured to: if the random access succeeds, send a seventh message to the first node, so that the first node learns that the user terminal successfully accesses the second node; or if the random access fails, send an eighth message to the first node, where the eighth message is used by the user terminal to access the second node unsuccessfully.

Further, the receiver 42E is further configured to: receive from the first node a second message indicating an access success of the user terminal; or receive from the first node a third message indicating an access failure of the user terminal; or receive from the first node a second message indicating the configuration success and an access success of the user terminal; or receive from the first node a second message indicating the configuration success and an access failure of the user terminal; or receive from the first node a third message used to instruct to delete a cell the user terminal fails to access, or instruct to delete the second node so that the second node does not communicate with the user terminal any more.

Figure 18:
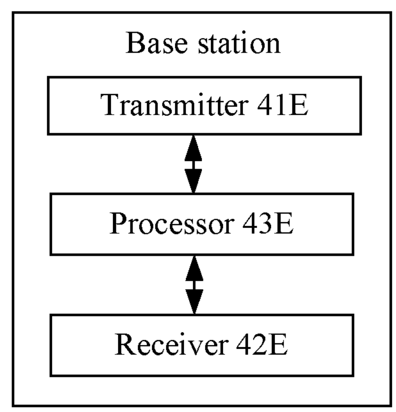
FIG. 18 is a schematic structural diagram 6 of hardware of a base station according to an embodiment.

Further, as shown in FIG. 18, the base station further includes: a processor 43E, configured to perform one or more of the following: triggering an RRC reestablishment procedure; releasing a configuration and/or context information that are related to the user terminal; deleting the configuration and/or the context information that are related to the user terminal; deleting a secondary cell configuration that is of the second node and related to the terminal, where a secondary cell is a cell that provides a service for the terminal, and the secondary cell is a secondary cell between the user terminal and the second node; releasing the configuration of the second node and/or the dual connectivity configuration included in the fifth message; resetting the configuration of the second node and/or the dual connectivity configuration included in the fifth message; communicating with the user terminal by using a configuration before the first message is received; or triggering an RRC reestablishment procedure of the user terminal on the second node.

Further, each of the first reply message to a fourth reply message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

Figure 19:
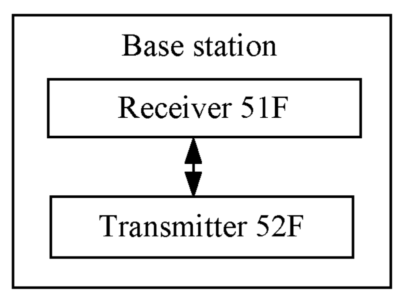
FIG. 19 is a schematic structural diagram 7 of hardware of a base station according to an embodiment.

As shown in FIG. 19, this embodiment provides a node, and a base station is used as an example and includes: a receiver 51F, configured to receive random access initiated by the user terminal; and a transmitter 52F, configured to: if the terminal device successfully accesses the second node, send a seventh message to the first node, where the seventh message is used to indicate that the terminal device successfully accesses the second node or successfully accesses a cell of the second node; or if the terminal device fails to access the second node, send an eighth message to the first node, where the seventh message is used to indicate that the terminal device fails to access the second node or fails to access a cell of the second node.

Figure 20:
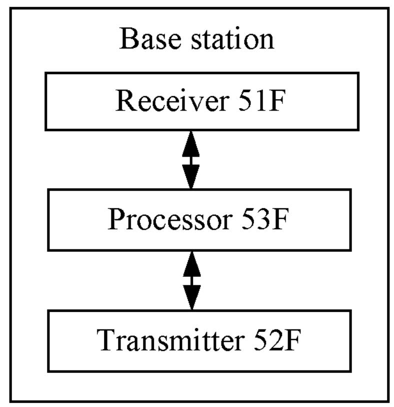
FIG. 20 is a schematic structural diagram 8 of hardware of a base station according to an embodiment.

Further, as shown in FIG. 20, the base station further includes: a processor 53F, configured to determine whether to accept an access request of the user terminal.

The receiver 51F is further configured to: before the seventh message or the eighth message is sent to the first node, receive a second message from the first node to learn a configuration success of the user terminal; or receive a third message from the first node to learn a configuration failure of the user terminal.

Further, the transmitter 52F is further configured to send a fifth message to the first node, where the fifth message includes a radio resource configuration of the second node, and the radio resource configuration is used by the terminal device to access the second node or synchronize with the second node.

Further, the fifth message further includes one or more of a configuration of the first node, a configuration of the second node, or a dual connectivity configuration.

Further, the receiver 50 is further configured to: receive a ninth message from the first node, where the ninth message is used to indicate that the terminal device successfully accesses the second node; or receive a tenth message from the first node, where the tenth message is used to indicate that the terminal device fails to access the second node.

Further, each of the first message to the tenth message includes success indication information and/or failure indication information; the success indication information includes at least one or more of the following: reconfiguration success, configuration success, SeNB reconfiguration success, second node configuration success, SeNB configuration success, dual connectivity reconfiguration success, dual connectivity configuration success, access success, or RACH success; and the failure indication information includes at least one or more of the following: reconfiguration failure, configuration failure, SeNB reconfiguration failure, second node configuration failure, SeNB configuration failure, dual connectivity reconfiguration failure, dual connectivity configuration failure, access failure, or RACH failure.

This embodiment provides a node. A first message is received from a first node, where the first message includes at least a configuration of a second node and/or a dual connectivity configuration. A first reply message is sent to the first node if a configuration in the first message is accepted, so that the first node learns that a user terminal accepts the configuration; or a second reply message is sent to the first node if a configuration in the first message is not accepted, so that the first node learns that a user terminal does not accept the configuration; or no message is sent to the first node if a configuration in the first message is not accepted or the configuration cannot be completed. In the solution, information in a first message is received and configured, all possible configuration results are analyzed, and a first node and/or a second node are notified of the configuration results. Therefore, a process of transmitting a configuration message is efficiently completed.

Embodiment 7

Figure 21:
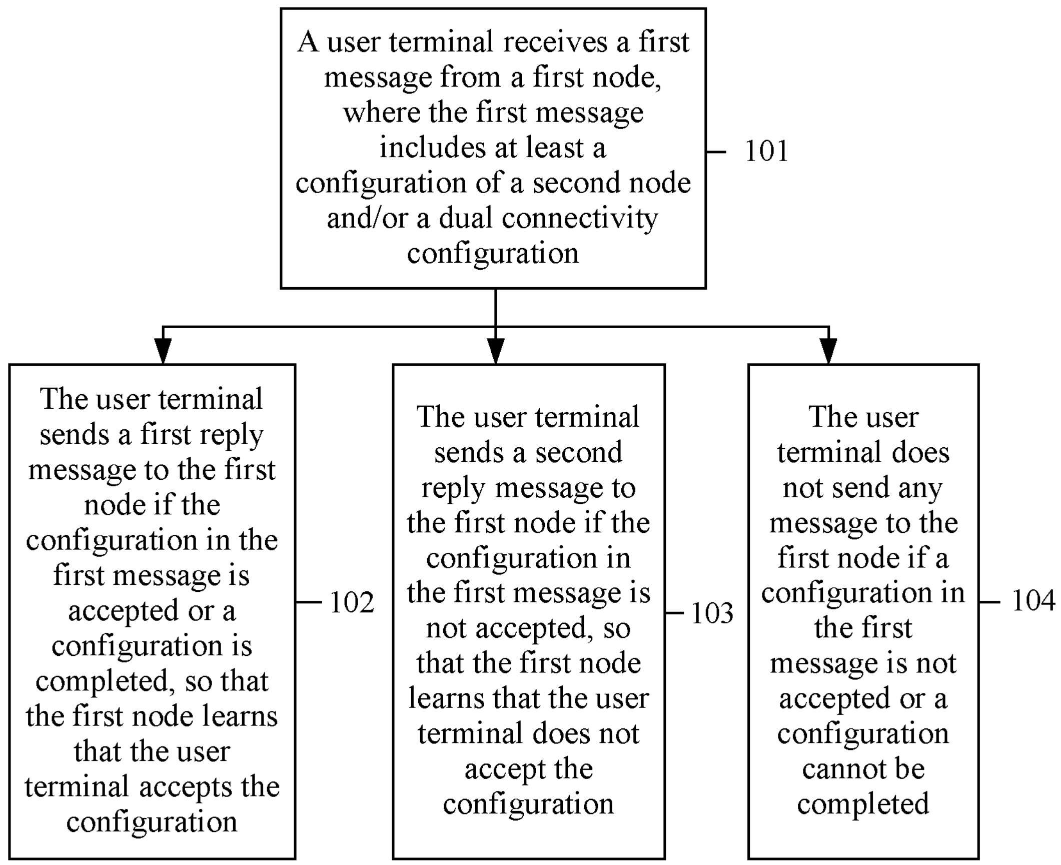
FIG. 21 is a schematic flowchart 1 of a method for transmitting a configuration message according to an embodiment.

As shown in FIG. 21, this embodiment provides a method for transmitting a configuration message, including:

101. A user terminal receives a first message from a first node, where the first message includes at least a configuration of a second node and/or a dual connectivity configuration.

This embodiment provides a method for transmitting a configuration message in an inter-frequency heterogeneous network in a process of collaboratively providing a service by multiple base stations. The inter-frequency heterogeneous network refers to a heterogeneous network (HetNet) deployment including a macro cell and a micro cell that use different frequencies. In this type of inter-frequency heterogeneous network, multiple base stations serve a same user terminal (UE). In this way, a data rate of the UE can be improved, and user experience can be improved. Certainly, alternatively, the embodiments may be applied to a scenario of an intra-frequency heterogeneous network, or may be applied to another scenario, and the embodiments do not set a limitation on a usage scenario. This description is applicable to another embodiment, which is not described herein.

In this embodiment, the first node and/or the second node may be a base station node or base station nodes of different types such as a Macro eNB, a Micro eNB, a Pico eNB, a home eNB (HeNB), a Small Cell eNB, or a relay (relay station).

Figure 22:
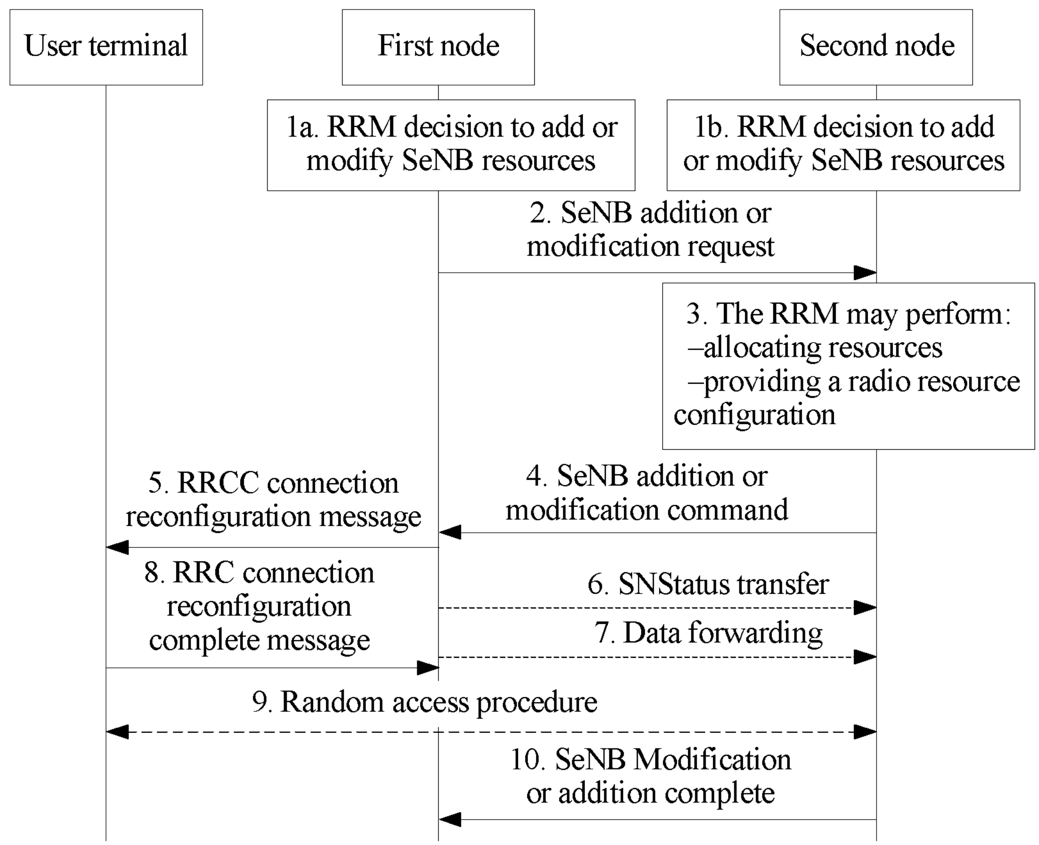
FIG. 22 is a schematic flowchart 2 of a method for transmitting a configuration message according to an embodiment.

Specifically, for example, in a process of providing a service for the UE by the first node (such as a master eNB (MeNB)) and the second node (such as a secondary eNB (SeNB)), the MeNB may serve as a master base station of a terminal, and the master base station is responsible for transferring control plane signaling to the UE. Optionally, the MeNB may carry some service bearers (bearer) of the UE, an RRC connection of the UE is established on a master base station on a node at a basic layer, and the SeNB provides user plane data transmission, that is, a service bearer for the UE. As shown in FIG. 22, a process such as providing a configuration for the UE by the SeNB (adding a cell of the SeNB to provide a service for the UE, and modifying a configuration of the UE on the SeNB) is provided.

Dual Connectivity: For a terminal in connected state, radio resources used by the terminal are provided by at least two different network nodes (a master base station and a secondary base station). Dual connectivity may be explained as follows: Operation where a given UE consumes radio resources provided by at least two different network points (Master and Secondary eNBs) connected with non-ideal backhaul while in RRC_CONNECTED.

Master eNB: In a dual connectivity scenario, a base station provides a service for a terminal, where the base station is connected to a mobility management entity (MME) of the UE, and is a termination point of at least an S1-MME interface. Therefore, the base station is a mobility anchor of the terminal. The master eNB may be explained as follows: in dual connectivity, the eNB that terminates at least S1-MME and therefore acts as a mobility anchor towards the correspondent node (CN).

Secondary eNB: In a dual connectivity scenario, a base station provides an additional radio resource for a terminal, where this base station is not a master base station of the terminal (in dual connectivity, an eNB provides additional radio resources for the UE, which is not the Master eNB).

For the dual connectivity, the master base station, and the secondary base station, only possible definitions are illustrated in the embodiments. However, the dual connectivity, the master base station, and the secondary base station are not limited to the foregoing definition descriptions.

Specifically, the user terminal first receives the first message from the first node, where the first message includes at least the configuration of the second node and/or the dual connectivity configuration.

The configuration of the second node may be a configuration used when the user terminal communicates by using a link between the user terminal and the second node, or a configuration used when the user terminal communicates with the second node. Particularly, in a dual connectivity scenario, the user terminal communicates with at least two nodes, and radio resources used by the user terminal are provided by the at least two nodes, where one node is a master node (the master node provides a control message such as an RRC message for the user terminal, and serves as a mobility anchor of the user terminal), and another node is a secondary node. The second node is a secondary node of the user terminal, and the configuration of the second node is a configuration of the secondary node.

In embodiments, the dual connectivity configuration may be a general term for a configuration of a secondary node (that is, a configuration used when the user terminal communicates with the secondary node), and the dual connectivity configuration may be a configuration used by the terminal in the dual connectivity scenario. Alternatively, the dual connectivity configuration may be a designated configuration. The dual connectivity configuration is a configuration applied to both the first node and the second node. Particularly, two configurations are interdependent. Therefore, one configuration (such as an SeNB configuration) is not accepted, the SeNB configuration needs to be modified, it also means that an MeNB configuration needs to be adjusted accordingly, which is equivalent to a case in which the two configurations are not accepted.

Exemplarily, a representation form of the dual connectivity configuration may be two parameters, and the sum of values of the two parameters cannot fall beyond a range. For example, a UE capacity-SeNB parameter and a UE capacity-MeNB parameter. For example, if a maximum transmit power used by UE to communicate with a first station is P1, and a maximum transmit power used by the UE to communicate with a second station is P2, P1+P2 cannot exceed a maximum transmit power Pmax used by the UE. Alternatively, a representation form of the dual connectivity configuration may be one parameter, which indicates an allocated ratio (such as a UE capacity split ratio) between two stations that provide splitting (bearer split) for a terminal.

For example, a first station bears 60% services of the UE, and a second station bears 40% services of the UE.

In the embodiments, the dual connectivity configuration and the configuration of the second node may be two different configurations. The dual connectivity configuration may be used as a general term for a configuration used when the user terminal communicates with the second node in dual connectivity and a configuration applied to both the first node and the second node; or the configuration of the second node may be used as a general term for a configuration used when the user terminal communicates with the second node in dual connectivity and a configuration applied to both the first node and the second node.

Further, the first message may include one or more of the following: information or corresponding configuration information of adding an SeNB (adding a primary cell (Pcell)), adding/deleting an Scell, activating/deactivating a secondary cell (Scell), modifying an SeNB configuration, or deleting an SeNB (deleting a Pcell).

102. The user terminal sends a first reply message to the first node if the configuration in the first message is accepted or a configuration is completed, so that the first node learns that the user terminal accepts the configuration.

Specifically, after receiving the first message from the first node, the user terminal may parse the first message to obtain configuration information in the first message, where the configuration information may be the configuration of the second node and/or the dual connectivity configuration.

That the configuration in the first message is accepted or the configuration is completed may be that the user terminal agrees to comply with (comply with) the configuration, may be that the terminal performs (perform)/applies (apply) the configuration in the first message or completes the configuration, may be that the user terminal agrees to comply with (comply with) the configuration included in the message, may be that the terminal performs (perform)/applies (apply) the configuration, may be that the terminal completes the configuration, or the like. The content is applicable to all embodiments and is not described again.

That the configuration is accepted may be that the configuration is complied with (comply with), may be that the terminal performs (perform)/applies (apply) the configuration, may be that the terminal completes the configuration, may be that the configuration is configured successfully, or the like. The content is applicable to all the embodiments and is not described again.

Further, the configuration information in the first message may further include a configuration of the first node.

After obtaining the configuration information in the first message, the user terminal determines whether to accept one or more pieces of the configuration information.

The user terminal sends the first reply message to the first node if the configuration in the first message is accepted, so that the first node learns that the user terminal accepts the configuration. It should be noted that the configuration includes one or more of the configuration of the first node, the configuration of the second node, and the dual connectivity configuration. Therefore, that the configuration is accepted includes that the configuration of the second node and the dual connectivity configuration are accepted, or one of the configuration of the second node or the dual connectivity configuration is accepted.

For that the user terminal accepts the configuration, "accepting the configuration" may be indicated as a configuration success. Specifically, the configuration success includes the following.

Optionally, the configuration success herein includes configuration successes of all configurations included in the first message or acceptance of all configurations included in the first message; or specifically, when the first message includes the configuration of the first node in addition to the configuration of the second node and/or the dual connectivity configuration, the configuration success or accepting the configuration may be as follows.

Optionally, the configuration success or accepting the configuration includes accepting the configuration of the first node, and accepting the configuration of the second node and/or the dual connectivity configuration.

Certainly, alternatively, a range of "accepting the configuration" may be extended to include the following.

Optionally, the configuration of the first node is not accepted, but the configuration of the second node and/or the dual connectivity configuration are accepted; or optionally, the configuration of the first node is accepted, but the configuration of the second node and/or the dual connectivity configuration are not accepted; or optionally, the configuration of the first node is accepted, the configuration of the second node is accepted or not accepted, and the dual connectivity configuration is accepted or not accepted.

Further, after the configuration in the first message is accepted or the configuration is completed, a first reply message is sent to the first node, so that the first node sends, according to the first reply message, a second message to the second node to indicate that the user terminal accepts the configuration.

In addition, the first reply message and/or the second message are used to indicate that the user terminal accepts the configuration, and the first message carries success indication information.

The success indication information includes at least one or more of the following: reconfiguration success, configuration success, SeNB reconfiguration success, SeNB configuration success, dual configuration reconfiguration success, or dual connectivity configuration success.

In all the embodiments, two terms: configuration and reconfiguration may be interchanged. For example, the configuration of the first node may also be referred to as a reconfiguration of the first node.

103. The user terminal sends a second reply message to the first node if the configuration in the first message is not accepted, so that the first node learns that the user terminal does not accept the configuration.

That the configuration in the first message is not accepted may be that the user terminal does not agree on/comply with (comply with) the configuration, or may be that the terminal does not perform (perform)/apply (apply) the configuration or does not accept the configuration, that the configuration is configured unsuccessfully (for example, the (re)configuration is (re)configured unsuccessfully, or (re)configuration failure) or the configuration fails. The content is applicable to all embodiments and is not described again.

That the configuration is not accepted may be that the configuration is not complied with (comply with), may be that the configuration is not performed (perform)/applied (apply), may be that the configuration cannot be completed, may be that the configuration is configured unsuccessfully (for example, the (re)configuration is (re)configured unsuccessfully, or (re)configuration failure) or the configuration fails, or the like. The content is applicable to all the embodiments and is not described again.

Specifically, after receiving the first message from the first node, the user terminal may parse the first message to obtain configuration information in the first message, where the configuration information may be the configuration of the second node and/or the dual connectivity configuration. Further, the configuration information in the first message may further include the configuration of the first node.

After obtaining the configuration information in the first message, the user terminal determines whether to accept one or more pieces of the configuration information.

The user terminal sends the second reply message to the first node if the configuration in the first message is not accepted, so that the first node learns that the user terminal does not accept the configuration. Correspondingly, it should be noted that the configuration includes one or more of the configuration of the first node, the configuration of the second node, and the dual connectivity configuration. Therefore, for that the user terminal does not accept the configuration, non-acceptance of the configuration may be indicated as a configuration failure. Specifically, the configuration failure includes the following:

Optionally, the configuration failure herein includes configuration failures of all configurations included in the first message or non-acceptance of all configurations/some configurations included in the first message; or specifically, when the first message includes the configuration of the first node in addition to the configuration of the second node and/or the dual connectivity configuration, the configuration failure or non-acceptance of the configuration may include the following:

Optionally, the configuration of the first node is not accepted, and the configuration of the second node and/or the dual connectivity configuration are not accepted; or optionally, the configuration of the first node is not accepted, but the configuration of the second node and/or the dual connectivity configuration are accepted; or optionally, the configuration of the first node is accepted, but the configuration of the second node and/or the dual connectivity configuration are not accepted; or optionally, that the configuration is not accepted includes that the configuration of the first node is not accepted, the configuration of the second node is accepted or not accepted, and the dual connectivity configuration is accepted or not accepted.

Optionally, that the configuration is accepted includes that the configuration of the first node is not accepted, the configuration of the second node is accepted or not accepted, and the dual connectivity configuration is accepted or not accepted. Provided that there is a case in which one configuration is not accepted, the case may belong to a case in which the configuration is not accepted.

In addition, an example is also provided herein for a case in which one of the configuration of the first node and the dual connectivity configuration is accepted, and neither is accepted. If the first message includes the configuration of the second node and the dual connectivity configuration, and a case in which one configuration succeeds but the other configuration fails occurs, the case is classified as a configuration failure. Which configuration succeeds and which configuration fails need to be specifically indicated in the message. Certainly, alternatively, the case may be classified into a step of a configuration success from a perspective of an implementation method, which is not limited in the embodiments.

In step 102 or step 103, a radio resource configuration used for access may belong to content in the configuration of the second node.

Still further, after the configuration in the first message is not accepted or the configuration cannot be completed, a second reply message is sent to the first node, so that the first node sends, according to the second reply message, a third message to the second node to indicate that the terminal does not accept the configuration. For example, the second reply message may be an RRC connection reestablishment request message.

In addition, if the first message includes the configuration of the first node, after receiving the first message from the first node, the user terminal further determines whether to accept the configuration of the first node.

Specifically, provided that the configuration of the first node in the first message is not accepted, a second reply message is sent to the first node, so that the first node learns that the user terminal does not accept the configuration; or provided that the configuration of the first node in the first message is not accepted, a second reply message is sent to the first node, so that the first node sends, according to the second reply message, a third message to the second node to indicate that the terminal does not accept the configuration. For example, the second reply message may be an RRC connection reestablishment request message (RRC Connection Reestablishment Request message).

If the configuration of the first node in the first message is not accepted, and the configuration of the second node and/or the dual connectivity configuration are not accepted, a second reply message is sent to the first node, so that the first node learns that the user terminal does not accept the configuration of the first node in the first message and does not accept the configuration of the second node and/or the dual connectivity configuration, where for example, the second reply message may be an RRC connection reestablishment request message; or if the configuration of the first node in the first message is not accepted, but the configuration of the second node is accepted, and/or the dual connectivity configuration is not accepted, a second reply message is sent to the first node, so that the first node learns that the user terminal does not accept the configuration of the first node in the first message but accepts the configuration of the second node and/or accepts the dual connectivity configuration, where for example, the second reply message may be an RRC connection reestablishment request message; or if the configuration of the first node in the first message is not accepted, and the configuration of the second node and/or the dual connectivity configuration are not accepted, a second reply message is sent to the first node, so that the first node sends, according to the first reply message, a second message to the second node to indicate that the terminal does not accept the configuration of the second node and/or the dual connectivity configuration, where for example, the second reply message may be an RRC connection reestablishment request message; or if the configuration of the first node in the first message is not accepted, but the configuration of the second node is accepted, and/or the dual connectivity configuration is not accepted, a second reply message is sent to the first node, so that the first node sends, according to the first reply message, a third message to the second node to indicate that the user terminal does not accept the configuration of the first node in the first message or indicate that the configuration of the first node in the first message is not accepted but the configuration of the second node is accepted and/or the dual connectivity configuration is accepted, where for example, the second reply message may be an RRC connection reestablishment request message.

Alternatively, if the configuration of the first node in the first message is not accepted, the foregoing second reply message may be another message, which is not limited in the embodiments. In addition, the second reply messages described in the foregoing multiple cases may be a same message or may be different messages. For example, a second reply message used for a case 1 in which the configuration of the first node in the first message is not accepted, but the configuration of the second node is not accepted, and/or the dual connectivity configuration is not accepted is a message A; and a second reply message used for a case 2 in which the configuration of the first node in the first message is not accepted, but the configuration of the second node is accepted, and/or the dual connectivity configuration is not accepted may be the message A or may be a message B, which is not limited in the embodiments. Likewise, the first reply message, a third reply message, a fourth reply message, and the like in the embodiments may be processed in a manner similar to that of the first reply message.

If the configuration of the first node is accepted, and the configuration of the second node is accepted, and/or the dual connectivity configuration is accepted, a first reply message is sent to the first node, so that the first node learns that the user terminal accepts the configuration of the first node and accepts the configuration of the second node and/or accepts the dual connectivity configuration, where the second reply message is an RRC connection reestablishment request message or an RRC connection reconfiguration complete message; or if the configuration of the first node is accepted, but the configuration of the second node is not accepted, and/or the dual connectivity configuration is not accepted, a second reply message is sent to the first node, so that the first node learns that the user terminal accepts the configuration of the first node but does not accept the configuration of the second node and/or does not accept the dual connectivity configuration; or if the configuration of the first node is accepted, and the configuration of the second node is accepted, and/or the dual connectivity configuration is accepted, a first reply message is sent to the first node, so that the first node sends, according to the first reply message, a second message to the second node to indicate that the user terminal accepts the configuration of the second node and/or accepts the dual connectivity configuration; or if the configuration of the first node is accepted, but the configuration of the second node is not accepted, and/or the dual connectivity configuration is not accepted, a second reply message is sent to the first node, so that the first node sends, according to the second reply message, a third message to the second node to indicate that the user terminal does not accept the configuration of the second node and/or does not accept the dual connectivity configuration.

The second reply message is a radio resource control RRC connection reestablishment request message or an RRC connection reconfiguration complete message or another message.

If the configuration of the first node in the first message is not accepted, when the user terminal sends the second reply message to the first node (or before sending the second reply message to the first node or after sending the second reply message to the first node), the user terminal further performs one or more of the following: triggering an RRC reestablishment procedure; releasing configurations of all Scells; deleting the configurations of all the Scells; releasing configurations of all secondary stations or second stations; deleting the configurations of all the secondary stations or the second stations; resetting MAC; or applying a basic configuration of a primary cell of the first node. For releasing the configurations of all the secondary cells and deleting the configurations of all the Scells, the Scells may be cells related to the second node (which are, if the second node is an SeNB, serving cells associated with the SeNB) or secondary cells related to the second node (which do not include a primary cell), where the cell provides a service for the user terminal.

Alternatively, the Scell may be the second node or a secondary cell that is of the second node and related to the first node, where the cell provides a service for the user terminal.

Releasing a configuration related to the SeNB may be specifically one or more of the following: reset MAC; release the SCell(s), if configured; release the secondary TAG(s), if configured; apply the default physical channel configuration; apply the default semi-persistent scheduling configuration; apply the default MAC main configuration; release reportProximityConfig and clear any associated proximity status reporting timer; release measSubframePatternPCell, if configured.

If the configuration of the first node in the first message is accepted, when the user terminal sends the second reply message to the first node (or before sending the second reply message to the first node or after sending the second reply message to the first node), the user terminal further performs one or more of the following: triggering an RRC reestablishment procedure; releasing the configuration of the second node and/or the dual connectivity configuration included in the first message; resetting the configuration of the second node and/or the dual connectivity configuration included in the first message; releasing a configuration related to the second node; deleting the configuration related to the second node; communicating with the second node by using a configuration before the first message is received; or communicating with the first node by using the configuration of the first node included in the first message.

Further, after the user terminal sends the second reply message to the first node, the user terminal receives a fourth message sent by the first node, where the fourth message includes at least an updated configuration provided by the second node. If the updated configuration that is in the fourth message and provided by the second node is accepted, the user terminal sends a first reply message to the first node, so that the first node learns that the user terminal accepts the configuration; or if the updated configuration that is in the fourth message and provided by the second node is not accepted, the user terminal sends a second reply message to the first node, so that the first node learns that the user terminal does not accept the configuration.

If the user terminal does not accept a configuration in the first message or cannot complete a configuration, there is one more possible solution. For details, refer to a description in step 104.

104. The user terminal does not send any message to the first node if a configuration in the first message is not accepted or a configuration cannot be completed.

Specifically, after the UE receives the first message sent by the first node, if the UE cannot perform configuration successfully or does not accept the configuration, the UE does not send any message to the MeNB.

Optionally, alternatively, the UE may start a timer T1 after receiving the first configuration message, and if within a time that is set on T1, configuration cannot be performed successfully or the configuration is not accepted, the UE does not send any message to the MeNB. Optionally, the UE communicates with the SeNB by using an original old configuration (where a configuration in the first message is a new configuration, and a configuration prior to the configuration in the first message is an old configuration); or the UE releases a configuration related to the SeNB. Releasing the configuration related to the SeNB may be specifically one or more of the following: reset MAC; release the SCell(s), if configured; release the secondary TAG(s), if configured; apply the default physical channel configuration; apply the default semi-persistent scheduling configuration; apply the default MAC main configuration; release reportProximityConfig and clear any associated proximity status reporting timer; release measSubframePatternPCell, if configured.

Alternatively, if within a time that is set on T1, configuration cannot be performed successfully or the configuration is not accepted, the UE does not send any message to the MeNB. The UE may specifically perform one or more of the following: triggering an RRC reestablishment procedure; releasing configurations of all secondary serving cells Scells; deleting the configurations of all the Scells; releasing configurations of all secondary stations or second stations; deleting the configurations of all the secondary stations or the second stations; resetting MAC; or applying a basic configuration of a primary cell of the first node. For releasing the configurations of all the secondary cells (Secondary Cell) and deleting the configurations of all the Scells, the Scells may be cells related to the second node (which are, if the second node is an SeNB, the serving cells associated with the SeNB) or secondary cells related to the second node (which do not include a primary cell), where the cell provides a service for the user terminal.

Alternatively, the Scell may be the second node or a secondary cell that is of the second node and related to the first node, where the cell provides a service for the user terminal.

In addition, a second reply message and/or a third message are used to indicate that the user terminal does not accept the configuration, and the first message carries failure indication information.

The failure indication information includes at least one or more of the following: reconfiguration failure, configuration failure, SeNB reconfiguration failure, SeNB configuration failure, dual configuration reconfiguration failure, or dual connectivity configuration failure.

So far, after receiving the first message from the first node, the user terminal performs configuration according to the information in the first message, and feeds back a configuration result to the first node.

Apparently, steps 102 to 104 are three optional implementation solutions following step 101. Therefore, steps 102 to 104 are in a parallel relationship.

Figure 23:
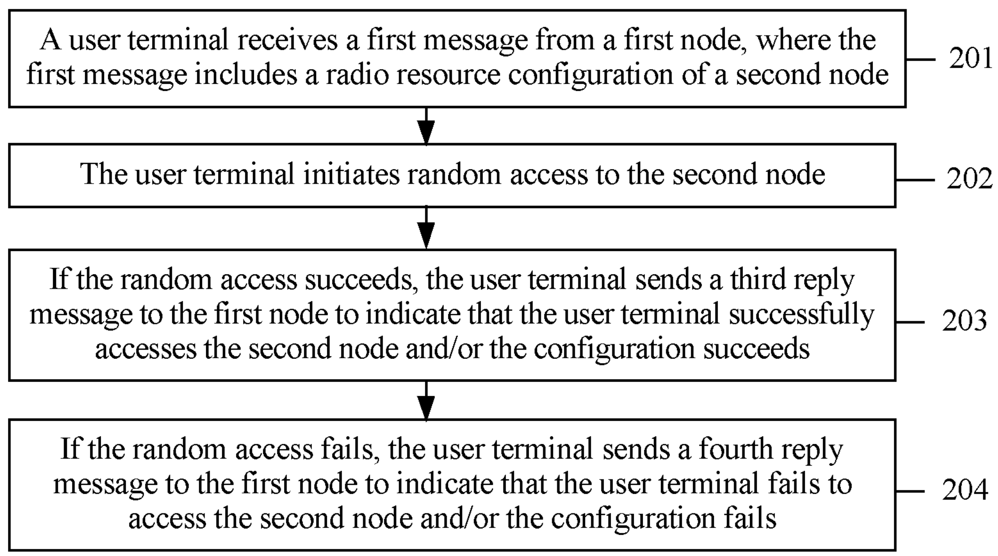
FIG. 23 is a schematic flowchart 3 of a method for transmitting a configuration message according to an embodiment.

As shown in FIG. 23, this embodiment provides a method for transmitting a configuration message, including:

201. A user terminal receives a first message from a first node, where the first message includes a radio resource configuration of a second node.

The radio resource configuration is used by the user terminal to access the second node or synchronize with the second node.

The radio resource configuration may be a random access resource configuration such as providing a dedicated preamble and/or a dedicated random access resource for the user terminal.

The user terminal initiates random access to the second node by using the radio resource configuration, which may be specifically that the user terminal sends a preamble on a random access resource, or the like. How the user equipment initiates random access belongs to the prior art and is not described in detail herein.

The radio resource configuration is used by the user terminal to access the second node. Specifically, the user terminal initiates random access to the second node by using the radio resource configuration, so that the user terminal accesses the second node. That the user terminal accesses the second node may mean that the user terminal accesses a cell of the second node, accesses one or more cells of the second node, or the like.

The radio resource configuration is used by the user terminal to synchronize with the second node. Specifically, the user terminal may synchronize with the second node by using the radio resource configuration, so as to access the second node by means of random access (For example, if the second node is an SeNB, UE performs synchronization to SeNB and accesses the cell of SeNB via RACH).

Specifically, in a process in which the user terminal performs configuration with the first node and/or the second node, the user terminal may initiate random access to the second node, so as to complete access of the user terminal to the second node. A random access procedure may be performed after the user terminal performs configuration successfully; or a random access procedure may start to be performed in the process in which the user terminal performs configuration.

In addition, the first message may further include one or more of the following: a configuration of the first node, a configuration of the second node, or a dual connectivity configuration.

202. The user terminal initiates random access to the second node.

Specifically, that the user terminal initiates random access to the second node may occur in the following two cases.

Case 1: Before step 202 is performed, the method further includes: sending, by the user terminal, a first reply message to the first node, so that the first node learns that the user terminal accepts the configuration or the configuration succeeds. Then, the user terminal performs a random access procedure in step 202. Subsequently, if access succeeds, the user terminal performs step 203; or if access fails, the user terminal performs step 204. After the user terminal accepts a configuration included in the first message, and sends a first reply message to the first node, so that the first node learns that the user terminal accepts the configuration or the configuration succeeds, the user terminal then initiates random access to the second node. If the random access succeeds, a third reply message is sent to the first node to indicate that the user terminal successfully accesses the second node and/or the configuration succeeds; or if the random access fails, a fourth reply message is sent to the first node to indicate that the user terminal fails to access the second node and/or the configuration fails.

Case 2: After step 201, the user performs step 202, that is, performs a process of accessing the second node. Subsequently, if access succeeds, step 203 is to be performed; or if access succeeds, the user terminal performs step 204.

203. If the random access succeeds, the user terminal sends a third reply message to the first node to indicate that the user terminal successfully accesses the second node and/or the configuration succeeds.

204. If the random access fails, the user terminal sends a fourth reply message to the first node to indicate that the user terminal fails to access the second node and/or the configuration fails.

For step 203 and step 204, one case is that when the random access succeeds, the user terminal may perform step 203, and when the random access fails, perform step 204. Another case is that the user terminal feeds back only one type of information (such as a success or a failure), and the other one may be fed back by the second node. Specifically, when the random access fails, the user terminal performs step 204; however, when the random access succeeds, the user terminal may not perform step 203, and information about a success may be fed back by the second node.

When the user terminal accepts the radio resource configuration, the user terminal initiates random access to the second node. In this case, any of the following five cases occurs.

In case 1, all configurations in the first message are accepted. For example, if the first message includes the configuration of the second node and/or the dual connectivity configuration, and the configuration of the second node and/or the dual connectivity configuration are accepted, a third reply message is sent to the first node to indicate that the configuration or the configurations succeeds or succeed. That the configuration or the configurations succeeds or succeed is that at least one of the configuration of the second node and the dual connectivity configuration is configured successfully.

In case 2, if the first message includes the configuration of the first node in addition to the configuration of the second node and/or the dual connectivity configuration, if the configuration of the first node is accepted, and the configuration of the second node and/or the dual connectivity configuration are accepted, a third reply message is sent to the first node to indicate that the configurations succeed; or if the configuration of the first node is accepted, but the configuration of the second node and/or the dual connectivity configuration are not accepted, a third reply message is sent to the first node to indicate that the configuration of the first node is accepted but the configuration of the second node and/or the dual connectivity configuration are not accepted.

In case 3, if the first message includes the configuration of the second node and/or the dual connectivity configuration, and the configuration of the second node and/or the dual connectivity configuration are accepted, a third reply message is sent to the first node to indicate that the configuration or the configurations fails or fail, where that the configuration or the configurations fails or fail is that both the configuration of the second node and the dual connectivity configuration fail.

In case 4, if the first message includes the configuration of the first node in addition to the configuration of the second node and/or the dual connectivity configuration, provided that the configuration of the first node is not accepted, an RRC connection reestablishment request message is sent to trigger a reestablishment procedure.

In case 5, for a case in which only one configuration in the configuration of the second node and the dual connectivity configuration is accepted, refer to content in steps 101 to 103 in Embodiment 7.

Further, if access succeeds, a third reply message is sent to the first node to indicate that the access succeeds and the configuration succeeds, where the third reply message may be an RRC reconfiguration complete message; or if access fails, a fourth reply message is sent to the first node to indicate that the access fails and the configuration succeeds, where the fourth reply message may be an RRC reconfiguration complete message; or if access fails, a fourth reply message is sent to the first node to indicate that a configuration fails or instruct to trigger a reestablishment procedure, that is, if another type of configuration succeeds, but the access fails, the RRC reestablishment process is still enabled, where the fourth reply message may be an RRC connection reestablishment message.

In addition, when the random access fails, and the user terminal sends the fourth reply message to the first node, the user terminal may perform one or more choices of the following: triggering an RRC reestablishment procedure; releasing the configuration of the second node and/or the dual connectivity configuration included in the first message; resetting the configuration of the second node and/or the dual connectivity configuration included in the first message; releasing a configuration related to the second node; deleting the configuration related to the second node; communicating with the second node by using a configuration before the first message is received; communicating with the first node by using the configuration before the first message is received; and communicating with the first node by using the configuration of the first node included in the first message.

Further, each of the first reply message to the fourth reply message includes success indication information and/or failure indication information; the success indication information includes at least one or more of the following: reconfiguration success, configuration success, SeNB reconfiguration success, SeNB configuration success, dual configuration reconfiguration success, dual connectivity configuration success, access success, or RACH success; and the failure indication information includes at least one or more of the following: reconfiguration failure, configuration failure, SeNB reconfiguration failure, SeNB configuration failure, dual configuration reconfiguration failure, dual connectivity configuration failure, access failure, or RACH failure.

So far, the user terminal completes a solution to random access to the second node.

This embodiment provides a method for transmitting a configuration message. A first message is received from a first node, where the first message includes at least a configuration of a second node and/or a dual connectivity configuration. A first reply message is sent to the first node if a configuration in the first message is accepted, so that the first node learns that a user terminal accepts the configuration; or a second reply message is sent to the first node if a configuration in the first message is not accepted, so that the first node learns that a user terminal does not accept the configuration; or no message is sent to the first node if a configuration in the first message is not accepted or the configuration cannot be completed. In the solution, information in a first message is received and configured, all possible configuration results are analyzed, and a first node and/or a second node are notified of the configuration results. Therefore, a process of transmitting a configuration message is efficiently completed.

Embodiment 8

Figure 24:
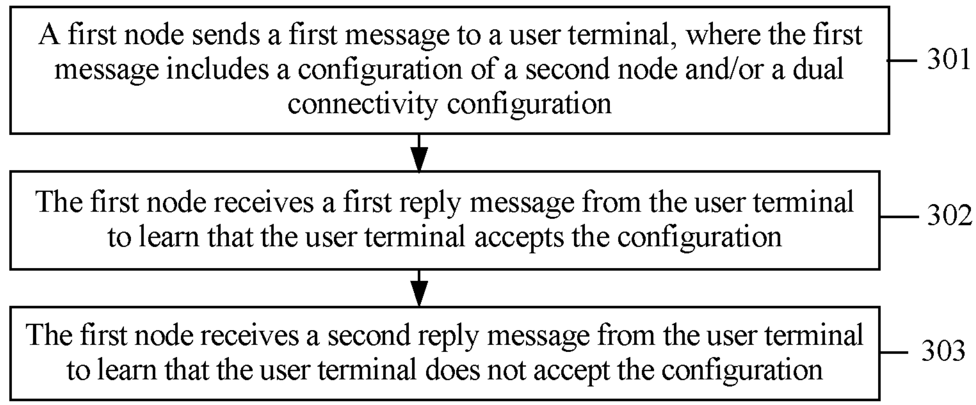
FIG. 24 is a schematic flowchart 4 of a method for transmitting a configuration message according to an embodiment.

As shown in FIG. 24, this embodiment provides a method for transmitting a configuration message, including:

301. A first node sends a first message to a user terminal, where the first message includes a configuration of a second node and/or a dual connectivity configuration.

This embodiment provides a method for transmitting a configuration message in an inter-frequency heterogeneous network in a process of collaboratively providing a service by multiple base stations. The inter-frequency heterogeneous network refers to a heterogeneous network (HetNet) deployment including a macro cell and a micro cell that use different frequencies. In this type of inter-frequency heterogeneous network, multiple base stations serve a same user terminal (UE). In this way, a data rate of the UE can be improved, and user experience can be improved. Certainly, alternatively, the embodiments may be applied to a scenario of an intra-frequency heterogeneous network, or may be applied to another scenario, and the embodiments do not set a limitation on a usage scenario. This description is applicable to another embodiment, which is not described herein.

In this embodiment, the first node and/or the second node may be a base station node or base station nodes of different types such as a Macro eNB, a Micro eNB, a Pico eNB, an HeNB, a Small Cell eNB, or a relay (relay station).

Further, before the first message is sent to the user terminal, the first node further needs to receive a fifth message sent by the second node, where the fifth message includes the configuration of the second node and/or the dual connectivity configuration.

The first message and/or the fifth message further include a configuration of the first node.

302. The first node receives a first reply message from the user terminal to learn that the user terminal accepts the configuration.

303. The first node receives a second reply message from the user terminal to learn that the user terminal does not accept the configuration.

For that the user terminal accepts the configuration, "accepting the configuration" may be indicated as a configuration success. That the user terminal accepts the configuration may include the following cases:

Optionally, the configuration success herein includes configuration successes of all configurations included in the first message or acceptance of all configurations included in the first message; or specifically, when the first message includes the configuration of the first node in addition to the configuration of the second node and/or the dual connectivity configuration, the configuration success or accepting the configuration may be as follows:

Optionally, the configuration success or accepting the configuration includes accepting the configuration of the first node, and accepting the configuration of the second node and/or the dual connectivity configuration.

Certainly, alternatively, a range of "accepting the configuration" may be extended to include the following:

Optionally, the configuration of the first node is not accepted, but the configuration of the second node and/or the dual connectivity configuration are accepted; or optionally, the configuration of the first node is accepted, but the configuration of the second node and/or the dual connectivity configuration are not accepted; or optionally, the configuration of the first node is accepted, the configuration of the second node is accepted or not accepted, and the dual connectivity configuration is accepted or not accepted.

That the user terminal does not accept the configuration may include the following case: the configuration of the second node fails and the dual connectivity configuration fails. The configuration failure includes the following:

Optionally, the configuration failure includes configuration failures of all configurations included in the first message or non-acceptance of all configurations/some configurations included in the first message; or specifically, when the first message includes the configuration of the first node in addition to the configuration of the second node and/or the dual connectivity configuration, the configuration failure or non-acceptance of the configuration may include the following:

Optionally, the configuration of the first node is not accepted, and the configuration of the second node and/or the dual connectivity configuration are not accepted; or optionally, the configuration of the first node is not accepted, but the configuration of the second node and/or the dual connectivity configuration are accepted; or optionally, the configuration of the first node is accepted, but the configuration of the second node and/or the dual connectivity configuration are not accepted; or optionally, that the configuration is not accepted includes that the configuration of the first node is not accepted, the configuration of the second node is accepted or not accepted, and the dual connectivity configuration is accepted or not accepted.

Optionally, that the configuration is accepted includes that the configuration of the first node is not accepted, the configuration of the second node is accepted or not accepted, and the dual connectivity configuration is accepted or not accepted. Provided that there is a case in which one configuration is not accepted, the case may belong to a case in which the configuration is not accepted.

In addition, an example is also provided herein for a case in which one of the configuration of the first node and the dual connectivity configuration is accepted, and neither is accepted. If the first message includes the configuration of the second node and the dual connectivity configuration, and a case in which one configuration succeeds but the other configuration fails occurs, the case is classified as a configuration failure. Which configuration succeeds and which configuration fails need to be specifically indicated in the message. Certainly, alternatively, the case may be classified into a step of a configuration success from a perspective of an implementation method, which is not limited in the embodiments.

In step 302 or step 303, a radio resource configuration used for access may belong to content in the configuration of the second node.

The configuration of the second node fails and/or the user terminal does not accept the configuration.

In addition, if a first reply message is received from the user terminal, the first node sends, according to the first reply message, a second message to the second node to indicate a configuration success of the user terminal; or if a second reply message is received from the user terminal, the first node sends, according to the second reply message, a third message to the second node to indicate a configuration failure of the user terminal.

For the foregoing solutions about the configuration failure in step 303, there is one more possible solution: After the first message is sent to the user terminal, the first node determines whether the second reply message or the first reply message sent by the user terminal is received within a first preset time period; and if the second reply message or the first reply message sent by the user terminal is not received within the first preset time period, the first node sends a third message to the second node to indicate a configuration failure of the user terminal. In the solution, the user terminal feeds back a first reply message if accepting the configuration; or the user terminal sends no reply message if not accepting the configuration.

Optionally, the first message includes a radio resource configuration of the second node. After the first message is sent to the user terminal or after the first reply message is received from the user terminal, the first node determines whether a fourth reply message or a third reply message (used to indicate an access success) sent by the user terminal is received within a second preset time period; and if the fourth reply message or the third reply message (used to indicate an access success) sent by the user terminal is not received within the second preset time period, and the third reply message sent by the user terminal is not received within the second preset time period, the first node sends a seventh message to the second node to indicate that the user terminal fails to access the second node.

Further, after sending, according to the second reply message, the third message to the second node to indicate a configuration failure of the user terminal, the first node may further receive a sixth message from the second node, where the sixth message includes an updated configuration provided by the second node. Then, the first node generates a fourth message according to the updated configuration that is in the sixth message and provided by the second node, and sends the fourth message to the user terminal, where the fourth message includes the updated configuration provided by the second node.

It should be noted that each of the first reply message to the fourth reply message includes success indication information and/or failure indication information; the success indication information includes at least one or more of the following: reconfiguration success, configuration success, SeNB reconfiguration success, SeNB configuration success, dual configuration reconfiguration success, dual connectivity configuration success, access success, or RACH success; and the failure indication information includes at least one or more of the following: reconfiguration failure, configuration failure, SeNB reconfiguration failure, SeNB configuration failure, dual configuration reconfiguration failure, dual connectivity configuration failure, access failure, or RACH failure.

Figure 25:
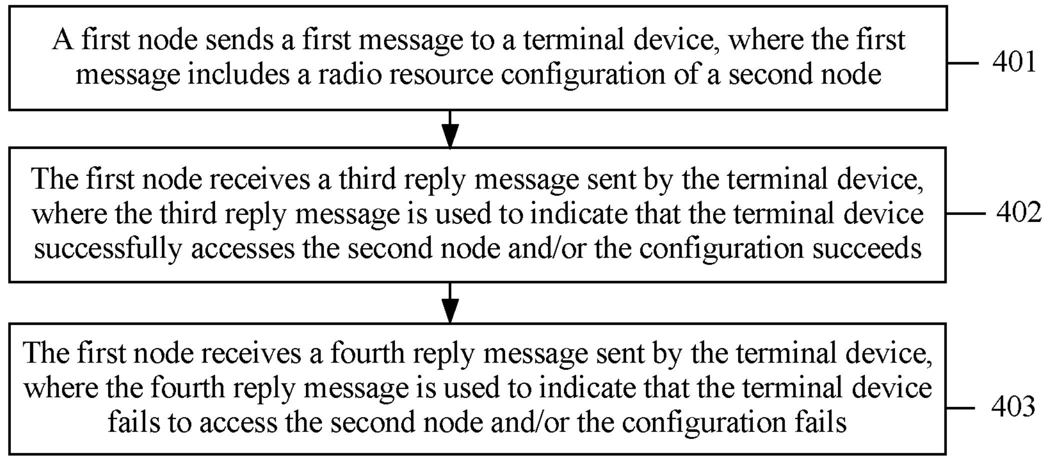
FIG. 25 is a schematic flowchart 5 of a method for transmitting a configuration message according to an embodiment.

As shown in FIG. 25, this embodiment provides a method for transmitting a configuration message, including.

401. A first node sends a first message to a terminal device, where the first message includes a radio resource configuration of a second node.

The radio resource configuration is used by the user terminal to access the second node or synchronize with the second node.

The radio resource configuration may be a random access resource configuration such as providing a dedicated preamble and/or a dedicated random access resource for the user terminal.

The user terminal initiates random access to the second node by using the radio resource configuration, which may be specifically that the user terminal sends a preamble on a random access resource, or the like.

The radio resource configuration is used by the user terminal to access the second node. Specifically, the user terminal initiates random access to the second node by using the radio resource configuration, so that the user terminal accesses the second node. That the user terminal accesses the second node may mean that the user terminal accesses a cell of the second node, accesses one or more cells of the second node, or the like.

The radio resource configuration is used by the user terminal to synchronize with the second node. Specifically, the user terminal may synchronize with the second node by using the radio resource configuration, so as to access the second node by means of random access (For example, if the second node is an SeNB, UE performs synchronization to SeNB and accesses the cell of SeNB via RACH).

Specifically, in a process in which the user terminal performs configuration with the first node and/or the second node, the user terminal may initiate random access to the second node, so as to complete access of the user terminal to the second node. A random access procedure may be performed after the user terminal performs configuration successfully; or a random access procedure may start to be performed in the process in which the user terminal performs configuration.

In addition, the first message further includes one or more of the following: a configuration of the first node, a configuration of the second node, or a dual connectivity configuration.

402. The first node receives a third reply message sent by the terminal device, where the third reply message is used to indicate that the terminal device successfully accesses the second node and/or the configuration succeeds.

403. The first node receives a fourth reply message sent by the terminal device, where the fourth reply message is used to indicate that the terminal device fails to access the second node and/or the configuration fails.

It should be noted that meanings or a meaning of the configuration success and/or the configuration failure are already described in detail in Embodiment 7. Therefore, details are not described herein again.

Specifically, in case 1, the random access procedure is performed after the user terminal performs configuration successfully.

First, the user terminal sends a first reply message to the second node, so that the first node learns that the user terminal accepts the configuration. That the configuration is accepted may specifically include the following:

Optionally, that the configuration is accepted may be that all configurations in the first message are accepted.

Alternatively, specifically, when the message includes the configuration of the first node and the configuration of the second node and/or the dual connectivity configuration, optionally, that the configuration is accepted may indicate that the configuration of the first node is accepted, but the configuration of the second node and/or the dual connectivity configuration are not accepted.

Optionally, that the configuration is accepted may indicate that the configuration of the first node is accepted, the configuration of the second node is accepted or not accepted, and the dual connectivity configuration is accepted or not accepted. That is, the first reply message may indicate that the configuration of the second node is accepted, the configuration of the second node is accepted, but the dual connectivity configuration is not accepted.

Second, the first node sends, according to the first reply message, a second message to the second node to indicate that the user terminal accepts the configuration. For a case in which the user terminal accepts the configuration, which is indicated in the second message, the configuration may be the configuration of the second node and/or the dual connectivity configuration. Specifically, that the configuration is accepted may be that the configuration of the second node and/or the dual connectivity configuration are accepted, the configuration of the second node is accepted but the dual connectivity configuration is not accepted, or the configuration of the second node is not accepted but the dual connectivity configuration is accepted.

Further, the user terminal initiates random access to the second node.

If the random access initiated by the user terminal to the second node succeeds, the first node receives a third reply message sent by the terminal device, or the second node may send a seventh message to the first node, so that the first node learns that the user terminal successfully accesses the second node; or if the random access initiated by the user terminal to the second node fails, the first node receives a fourth reply message that is sent by the terminal device and indicates that the user terminal fails to access the second node. Optionally, subsequently, the first node is made to send a tenth message to the second node to indicate that the user terminal fails to access the second node.

Specifically, in case 2, the random access procedure may start to be performed in the process in which the user terminal performs configuration.

First, the user terminal initiates random access to the second node.

Optionally, the user terminal determines, according to the first message, whether to accept a configuration in the first message.

If the access succeeds, the user terminal sends a third reply message to the first node to indicate that the access succeeds and/or the configuration succeeds (alternatively, that the configuration succeeds may be indicated as that the configuration succeeds or fails). The configuration success herein includes the following:

Optionally, the configuration success herein includes configuration successes of all configurations included in the first message.

Optionally, when the first message further includes the radio resource configuration and the configuration of the second node and/or the dual connectivity configuration, if the configuration of the second node and/or the dual connectivity configuration are accepted, a third reply message is sent to the first node to indicate that the configuration or the configurations succeeds or succeed. That the configuration or the configurations succeeds or succeed is specifically that both the configuration of the second node and the dual connectivity configuration are configured successfully or one of the configuration of the second node or the dual connectivity configuration is configured successfully.

Optionally, if the configuration of the first node is accepted, and the configuration of the second node and/or the dual connectivity configuration are accepted, a third reply message is sent to the first node to indicate that the configurations succeed.

Optionally, if the configuration of the first node is accepted, but the configuration of the second node and/or the dual connectivity configuration are not accepted, a third reply message is sent to the first node to indicate that the configuration of the first node is accepted but the configuration of the second node and/or the dual connectivity configuration are not accepted.

Optionally, when the first message includes the configuration of the second node and/or the dual connectivity configuration, if the configuration of the second node and/or the dual connectivity configuration are not accepted, a third reply message is sent to the first node to indicate that the configuration or the configurations fails or fail, where that the configuration or the configurations fails or fail is specifically that both the configuration of the second node and the dual connectivity configuration are configured unsuccessfully.

Optionally, after the user terminal accesses the second node, the first node receives a first reply message that is sent by the user terminal and indicates that the access succeeds and/or a configuration succeeds. In addition, the first node further receives a message sent by the second node, where the message is used to indicate an access success of the user terminal.

The foregoing third reply message may be an RRC reconfiguration complete message, and the foregoing fourth reply message may be an RRC reconfiguration complete message, or certainly, may be another message.

Alternatively, if the access fails, the user terminal sends a fourth reply message to the first node to indicate that the access fails.

In addition, after the user terminal fails to access the second node, optionally, after the user terminal fails to access the second node, the first node receives a second reply message that is sent by the user terminal and indicates that the access fails and the configuration fails. In addition, the first node further receives a message sent by the second node, where the message is used to indicate an access failure of the user terminal.

Optionally, a second reply message that is sent by the user terminal and received by the first node after the user terminal fails to access the second node includes access failure indication information. Therefore, the first node knows that the terminal fails to access the second node, and knows that a configuration also fails. Therefore, this second reply message actually indicates that the access fails and the configuration fails.

Optionally, after the user terminal fails to access the second node, the first node receives a second reply message that is sent by the user terminal and indicates that a configuration fails. Optionally, in addition, the first node further receives a message sent by the second node, where the message is used to indicate an access failure of the user terminal.

In addition, when (or before or after) the user terminal sends the fourth reply message to the first node, the method further includes one or more of the following: triggering an RRC reestablishment procedure; releasing the configuration of the second node and/or the dual connectivity configuration included in the first message; resetting the configuration of the second node and/or the dual connectivity configuration included in the first message; releasing a configuration related to the second node; deleting the configuration related to the second node; communicating with the second node by using a configuration before the first message is received; communicating with the first node by using the configuration before the first message is received; or communicating with the first node by using the configuration of the first node included in the first message.

It should be noted that each of the first reply message to the fourth reply message includes success indication information and/or failure indication information; the success indication information includes at least one or more of the following: reconfiguration success, configuration success, SeNB reconfiguration success, SeNB configuration success, dual configuration reconfiguration success, dual connectivity configuration success, access success, or RACH success; and the failure indication information includes at least one or more of the following: reconfiguration failure, configuration failure, SeNB reconfiguration failure, SeNB configuration failure, dual configuration reconfiguration failure, dual connectivity configuration failure, access failure, or RACH failure.

This embodiment provides a method for transmitting a configuration message. A first message is received from a first node, where the first message includes at least a configuration of a second node and/or a dual connectivity configuration. A first reply message is sent to the first node if a configuration in the first message is accepted, so that the first node learns that a user terminal accepts the configuration; or a second reply message is sent to the first node if a configuration in the first message is not accepted, so that the first node learns that a user terminal does not accept the configuration; or no message is sent to the first node if a configuration in the first message is not accepted or the configuration cannot be completed. In the solution, information in a first message is received and configured, all possible configuration results are analyzed, and a first node and/or a second node are notified of the configuration results. Therefore, a process of transmitting a configuration message is efficiently completed.

Embodiment 9

Figure 26:
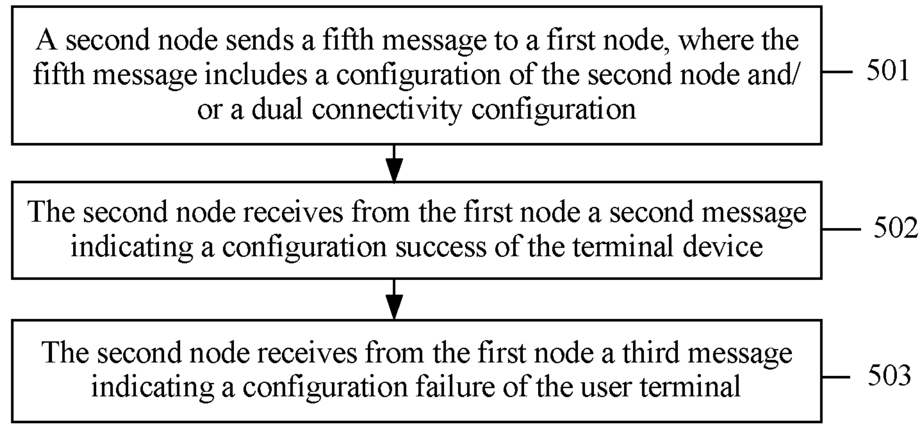
FIG. 26 is a schematic flowchart 6 of a method for transmitting a configuration message according to an embodiment.

As shown in FIG. 26, this embodiment provides a method for transmitting a configuration message, including:

501. A second node sends a fifth message to a first node, where the fifth message includes a configuration of the second node and/or a dual connectivity configuration.

The second node sends a fifth message to the first node, so that the first node sends a first message to a user terminal according to the fifth message, where the first message and/or the fifth message include the configuration of the second node and/or the dual connectivity configuration.

This embodiment provides a method for transmitting a configuration message in an inter-frequency heterogeneous network in a process of collaboratively providing a service by multiple base stations. The inter-frequency heterogeneous network refers to a heterogeneous network (HetNet) deployment including a macro cell and a micro cell that use different frequencies. In this type of inter-frequency heterogeneous network, multiple base stations serve a same user terminal (UE). In this way, a data rate of the UE can be improved, and user experience can be improved. Certainly, alternatively, the embodiments may be applied to a scenario of an intra-frequency heterogeneous network, or may be applied to another scenario, and the embodiments do not set a limitation on a usage scenario. This description is applicable to another embodiment, which is not described herein.

In this embodiment, the first node and/or the second node may be a base station node or base station nodes of different types such as a Macro eNB, a Micro eNB, a Pico eNB, an HeNB, a Small Cell eNB, or a relay (relay station).

Further, the first message and/or the fifth message may further include a configuration of the first node. The fifth message may further include a radio resource configuration of the second node, and the radio resource configuration is used by the user terminal to access the second node or synchronize with the second node.

502. The second node receives from the first node a second message indicating the configuration success of a terminal device.

Further, after the second node receives from the first node the second message indicating a configuration success of the user terminal, the second node may further receive random access initiated by the user terminal. If the random access succeeds, the second node may send a seventh message to the first node, so that the first node learns that the user terminal successfully accesses the second node; or if the random access fails, the second node may send an eighth message to the first node, where the eighth message is used by the user terminal to learn a failure in access to the second node.

The second message indicates the configuration success of the terminal device, where the configuration success may be a configuration second node configuration success and/or the dual connectivity configuration. From a perspective of an implementation method, a case in which one of the second node and the dual connectivity configuration succeeds and the other one fails may be indicated in the second message or may be indicated in a third message, which is not limited in the embodiments.

503. The second node receives from the first node a third message indicating the configuration failure of a user terminal.

Specifically, after the second node receives from the first node the third message indicating that the user terminal performs configuration unsuccessfully according to the first message, the second node may further generate a sixth message according to the third message, and send the sixth message to the first node, where the sixth message includes an updated configuration provided by the second node.

Further, after the second node receives the third message from the first node to indicate that the user terminal performs configuration unsuccessfully according to the first message, one or more of the following may be further performed: triggering an RRC reestablishment procedure; releasing a configuration and/or context information that are related to the user terminal; deleting the configuration and/or the context information that are related to the user terminal; deleting a secondary cell configuration that is of the second node and related to the terminal, where a secondary cell is a cell that provides a service for the terminal, and the secondary cell is a secondary cell between the user terminal and the second node; releasing the configuration of the second node and/or the dual connectivity configuration included in the fifth message; resetting the configuration of the second node and/or the dual connectivity configuration included in the fifth message; communicating with the user terminal by using a configuration before the first message is received; or triggering an RRC reestablishment procedure of the user terminal on the second node.

For example, after the second node receives the third message, and knows that the user terminal fails to access a cell of the second node, or knows that a configuration that instructs, by using the fifth message previously, the user terminal to access the second node fails, or the third message is directly used to instruct the second node to delete the cell the user terminal fails to access, the second node enables, after receiving the third message, a procedure of deleting the cell the user terminal fails to access. Specifically, the second node sends a message to the first node, where the message includes configuration information of the to-be-deleted cell. Therefore, the first node sends a message to the user terminal to instruct the user terminal to delete the cell. In this way, the second node and the end user delete a configuration related to the cell, and the second node and the terminal do not communicate with each other by using the cell any more. Specifically, the third message may include a cell identity (cell ID, for example, ECGI E-UTRAN cell global identifier) of the cell the user terminal fails to access.

It should be noted that meanings or a meaning of the configuration success and/or the configuration failure are already described in detail in Embodiment 7. Therefore, details are not described herein again.

It should be noted that each of the first reply message to a fourth reply message includes success indication information and/or failure indication information; the success indication information includes at least one or more of the following: reconfiguration success, configuration success, SeNB reconfiguration success, SeNB configuration success, dual configuration reconfiguration success, dual connectivity configuration success, access success, or RACH success; and the failure indication information includes at least one or more of the following: reconfiguration failure, configuration failure, SeNB reconfiguration failure, SeNB configuration failure, dual configuration reconfiguration failure, dual connectivity configuration failure, access failure, or RACH failure.

Figure 27:
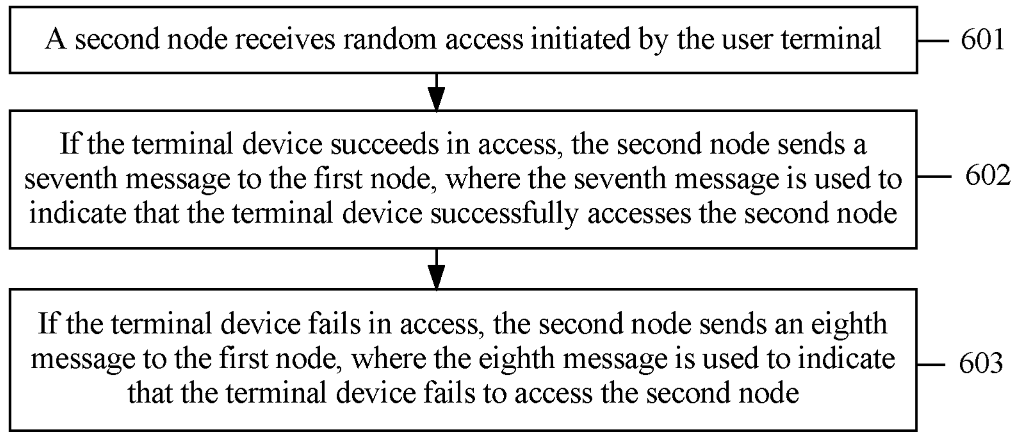
FIG. 27 is a schematic flowchart 7 of a method for transmitting a configuration message according to an embodiment.

As shown in FIG. 27, this embodiment of the embodiments provides a method for transmitting a configuration message, including: 601. A second node receives random access initiated by the user terminal.

Specifically, the second node receives a preamble sent by the user terminal; then, an access procedure is performed between the second node and the user terminal. A specific performing method is not limited in the embodiments.

Further, after step 601 is performed, one solution is that after the second node receives the random access initiated by the user terminal, the second node may further receive a ninth message from a first node, where the ninth message is used to indicate that the terminal device successfully accesses the second node; or receive a tenth message from a first node, where the tenth message is used to indicate that the terminal device fails to access the second node. After step 601, for content in another solution, reference may be further made to a description in the following step.

602. If the terminal device successfully accesses the second node, the second node sends a seventh message to the first node, where the seventh message is used to indicate that the terminal device successfully accesses the second node.

Further, before the second node sends the seventh message to the first node, the second node may receive a second message from the first node to learn a configuration success of the user terminal; or receive a third message from the first node to learn a configuration failure of the user terminal.

Still further, before the second node receives the second message from the first node to learn a configuration success of the user terminal or receives the third message from the first node to learn a configuration failure of the user terminal, the second node may send a fifth message to the first node, where the fifth message includes a radio resource configuration of the second node, and the radio resource configuration is used by the terminal device to access the second node or synchronize with the second node.

The fifth message further includes one or more of a configuration of the first node, a configuration of the second node, or a dual connectivity configuration.

603. If the terminal device fails to access the second node, the second node sends an eighth message to the first node, where the eighth message is used to indicate that the terminal device fails to access the second node.

It should be noted that each of the first message to the tenth message includes success indication information and/or failure indication information; the success indication information includes at least one or more of the following: reconfiguration success, configuration success, SeNB reconfiguration success, SeNB configuration success, dual configuration reconfiguration success, dual connectivity configuration success, access success, or RACH success; and the failure indication information includes at least one or more of the following: reconfiguration failure, configuration failure, SeNB reconfiguration failure, SeNB configuration failure, dual configuration reconfiguration failure, dual connectivity configuration failure, access failure, or RACH failure.

For usage descriptions of step 602 and step 603, the second node may choose a to-be-performed step according to an access success or an access failure. Another possibility is that the second node may perform one of the steps only for one of the cases, and the other case may be indicated by the user terminal. For example, in a case of an access success, the second node performs step 602; however, a case of an access failure may be fed back by the user terminal, and the second node does not need to perform step 603 in the case of an access failure.

This embodiment of the embodiments provides a method for transmitting a configuration message. A first message is received from a first node, where the first message includes at least a configuration of a second node and/or a dual connectivity configuration. A first reply message is sent to the first node if a configuration in the first message is accepted, so that the first node learns that a user terminal accepts the configuration; or a second reply message is sent to the first node if a configuration in the first message is not accepted, so that the first node learns that a user terminal does not accept the configuration; or no message is sent to the first node if a configuration in the first message is not accepted or the configuration cannot be completed. In the solution, information in a first message is received and configured, all possible configuration results are analyzed, and a first node and/or a second node are notified of the configuration results. Therefore, a process of transmitting a configuration message is efficiently completed.

Embodiment 10

Figure 28:
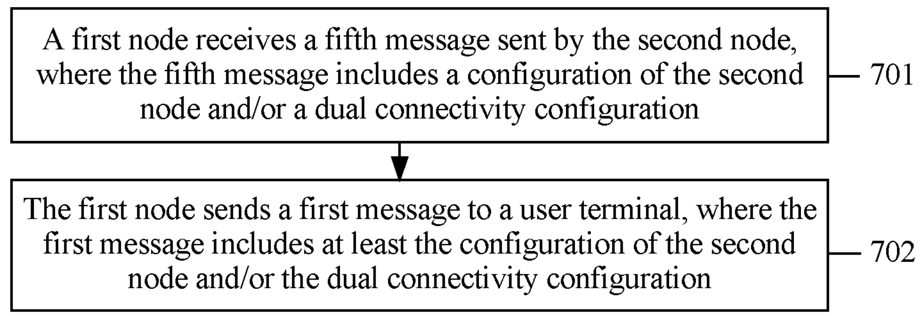
FIG. 28 is a schematic flowchart 8 of a method for transmitting a configuration message according to an embodiment.

As shown in FIG. 28, this embodiment provides a method for transmitting a configuration message, including:

701. A first node receives a fifth message sent by the second node, where the fifth message includes a configuration of the second node and/or a dual connectivity configuration.

In this embodiment, the first node and/or the second node may be a base station node or base station nodes of different types such as a Macro eNB, a Micro eNB, a Pico eNB, an HeNB, a Small Cell eNB, or a relay (relay station).

In a process of providing a service for UE by the first node (MeNB) and the second node (SeNB), the MeNB may serve as a master base station of the terminal, and the master base station is responsible for transferring control plane signaling to the UE. Optionally, the MeNB may carry some service bearers (bearer) of the UE, an RRC connection of the UE is established on a master base station on a node at a basic layer, and the SeNB provides user plane data transmission, that is, a service bearer for the UE. As shown in FIG. 22, a process such as providing a configuration for the UE by the SeNB (adding a cell of the SeNB to provide a service for the UE, and modifying a configuration of the UE on the SeNB) is provided. For descriptions of the master base station and the secondary base station, refer to illustrated definitions in the embodiment. However, definitions of the master base station and the secondary base station are not limited in the embodiments.

Specifically, the first node receives a fifth message sent by the second node, so that the first node generates a first message according to the fifth message, and sends the first message to the user equipment. The fifth message includes the configuration of the second node and/or the dual connectivity configuration.

702. The first node sends a first message to a user terminal, where the first message includes at least the configuration of the second node and/or the dual connectivity configuration.

Further, the first message may further include a configuration of the first node.

For detailed explanations of the configuration of the first node, the configuration of the second node, and the dual connectivity configuration, referring to content in Embodiment 1. Details are not described in the embodiments again.

Figure 29:
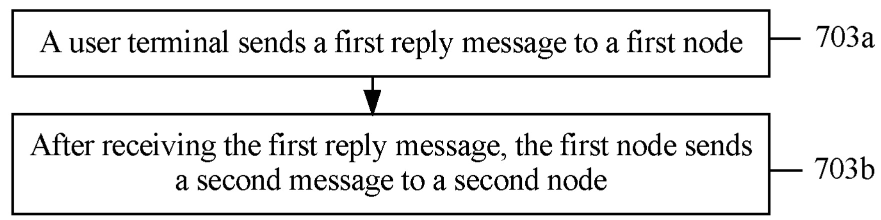
FIG. 29 is a schematic flowchart 9 of a method for transmitting a configuration message according to an embodiment.

As shown in FIG. 29, if the user terminal accepts a configuration in the first message, there are steps 703*a* to 703*b*.

703*a*. The user terminal sends a first reply message to the first node.

The first reply message may be an RRC reconfiguration complete message, and is used to indicate that the configuration succeeds or used to indicate that the UE accepts the configuration.

That the configuration is accepted may be that the configuration is complied with (comply with), may be that the terminal performs (perform)/applies (apply) the configuration, may be that the terminal completes the configuration, may be that the configuration is configured successfully, or the like. The content is applicable to all embodiments and is not described again.

For the "being used to indicate that the configuration succeeds or used to indicate that the UE accepts the configuration", the configuration success herein includes the following.

Optionally, the configuration success herein includes configuration successes of all configurations included in the first message.

Optionally, when the first message includes the configuration of the second node and/or the dual connectivity configuration, if the configuration of the second node and/or the dual connectivity configuration are accepted, a third reply message is sent to the first node to indicate that the configuration or the configurations succeeds or succeed, where that the configuration or the configurations succeeds or succeed is specifically that both the configuration of the second node and the dual connectivity configuration are configured successfully. Certainly, that one of the configuration of the second node and the dual connectivity configuration is successfully configured may be fed back by using a first reply message (or a second reply message), for example, a message that includes information about whether the configuration of the second node is configured successfully and whether the dual connectivity configuration is configured successfully.

For an explanation and content of the configuration success, reference may be further made to content in steps 101 to 103 in Embodiment 7, and details are not described herein.

Specifically, when the first message includes the configuration of the first node in addition to the configuration of the second node and/or the dual connectivity configuration, specifically, for example, the first reply message may include one piece of success indication information, which is used to indicate that the configuration succeeds or indicate that the UE accepts the configuration (for example, a representation method is any one of the following: reconfiguration success/configuration success, SeNB reconfiguration success/SeNB configuration success, and dual configuration reconfiguration success/dual connectivity configuration success). Certainly, alternatively, the first reply message may not include indication information. For example, after receiving the message, the MeNB knows that the UE indicates that the configuration succeeds or is used to indicate that the UE accepts the configuration.

703*b*. After receiving the first reply message, the first node sends a second message to the second node.

The second message is used to indicate that the configuration succeeds or used to indicate that the UE accepts the configuration. The second message may be used to indicate that the configuration of the second node and/or the dual connectivity configuration are configured successfully. In all the embodiments of the embodiments, acceptance of the configuration may be indicated as a configuration success, and details are not described again.

The second message may include indication information or may not include indication information. Specifically, for example, the second message includes one piece of indication information, which is used to indicate that the configuration succeeds or indicate that the UE accepts the configuration (for example, a representation method is any one of the following: reconfiguration success/configuration success, SeNB reconfiguration success/SeNB configuration success, and dual configuration reconfiguration success/dual connectivity configuration success). Certainly, alternatively, the message may not include indication information. For example, after receiving the message, the MeNB knows that the UE indicates that the configuration succeeds or is used to indicate that the UE accepts the configuration.

So far, the user terminal performs configuration successfully for the second node and/or the first node according to the first message.

Figure 30:
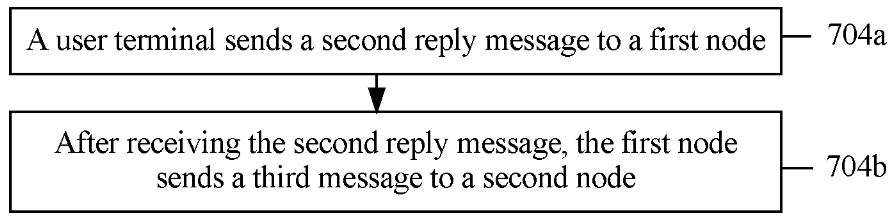
FIG. 30 is a schematic flowchart 10 of a method for transmitting a configuration message according to an embodiment.

Alternatively, as shown in FIG. 30, if the user terminal does not accept a configuration in the first message, there are steps 704*a* to 704*b*.

704*a*. The user terminal sends a second reply message to the first node.

The second reply message may be an RRC connection reconfiguration complete message, and is used to indicate that the configuration fails or used to indicate that the UE does not accept the configuration.

Specifically, the second reply message may include one piece of indication information, which is used to indicate that the configuration succeeds or indicate that the UE accepts the configuration (for example, a representation method is any one of the following: reconfiguration failure/configuration failure, SeNB reconfiguration failure/SeNB configuration failure, and dual configuration reconfiguration failure/dual connectivity configuration failure).

Being used to indicate that the configuration fails or used to indicate that the UE does not accept the configuration specifically includes the following.

Optionally, it is indicated that all configurations or some configurations in the first message are not accepted; or optionally, it is indicated that the configuration of the first node is not accepted, but the configuration of the second node and/or the dual connectivity configuration are accepted; or optionally, the configuration of the first node is not accepted, the configuration of the second node is accepted or not accepted, and the dual connectivity configuration is accepted or not accepted.

For an explanation and content of the configuration failure, reference may be further made to content in steps 101 to 103 in Embodiment 7, and details are not described herein.

704*b*. After receiving the second reply message, the first node sends a third message to the second node.

The third message is used to indicate that the configuration fails or used to indicate that the UE does not accept the configuration. The configuration failure or non-acceptance of the configuration by the UE may specifically include any one of three cases: a case in which the configuration of the second node and/or the dual connectivity configuration are not accepted, a case in which the configuration of the second node is not accepted but the dual connectivity configuration is accepted, and a case in which the configuration of the second node is accepted but the dual connectivity configuration is not accepted.

The third message may include indication information. Specifically, for example, the third message includes one piece of indication information, which is used to indicate that the configuration succeeds or indicate that the UE accepts the configuration (for example, a representation method is any one of the following: reconfiguration failure/configuration failure, SeNB reconfiguration failure/SeNB configuration failure, and dual configuration reconfiguration failure/dual connectivity configuration failure).

Certainly, alternatively, the third message may not include indication information. For example, after receiving the message, the MeNB knows that the UE indicates that the configuration fails or is used to indicate that the UE does not accept the configuration.

So far, the user terminal implements a solution 1 in which the user terminal performs configuration unsuccessfully with the second node and/or the first node according to the first message.

Figure 31:
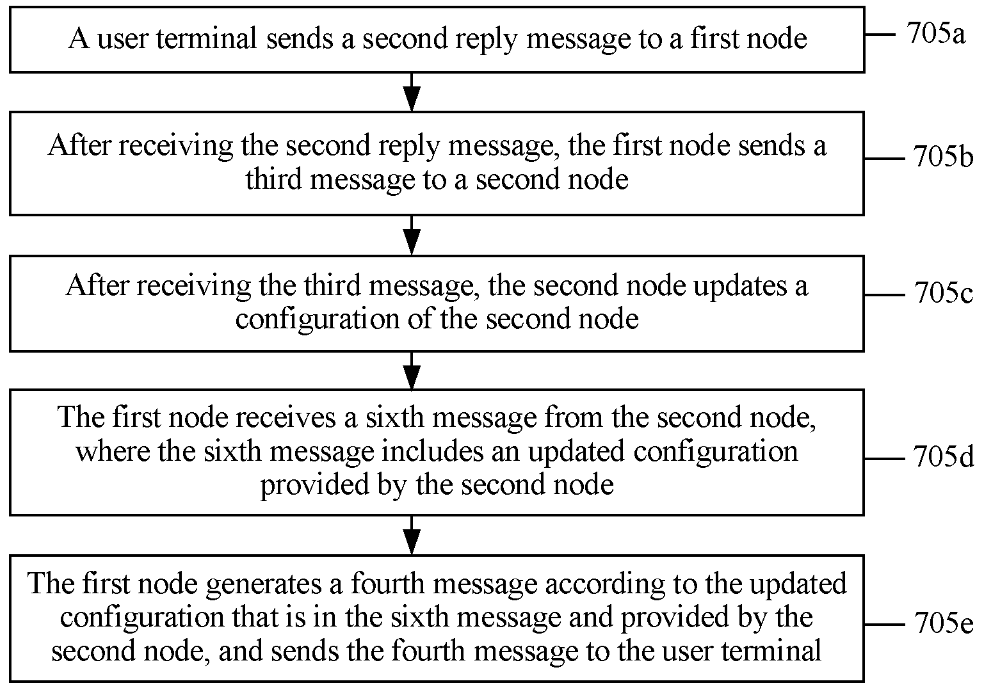
FIG. 31 is a schematic flowchart 11 of a method for transmitting a configuration message according to an embodiment.

Alternatively, as shown in FIG. 31, if the user terminal does not accept a configuration in the first message, there are steps 705*a* to 705*e*.

705*a*. The user terminal sends a second reply message to the first node.

The second reply message may be an RRC connection reestablishment request message, and is used to indicate that the configuration fails or used to indicate that the UE does not accept the configuration.

Specifically, the second reply message includes indication information reconfiguration failure/configuration failure, which is used to indicate that the configuration included in the first message is configured unsuccessfully. Alternatively, specific indication information reconfiguration failure/configuration failure may be represented by using another method. All embodiments of the embodiments merely provide illustrative descriptions, and do not set a limitation on a specific form of the indication information.

Specifically, for example, the first message includes the configuration of the second node and the dual connectivity configuration, and the second reply message may specifically feed back which configuration fails; for example, the configuration of the second node and the dual connectivity configuration fail. The indication information may be reconfiguration failure/configuration failure or dual configuration reconfiguration failure/dual connectivity configuration failure.

Specifically, for example, the first message includes the configuration of the first node, the dual connectivity configuration, and the configuration of the first node, and the second reply message (such as an RRC connection reconfiguration complete message) may be used to feed back that the configuration of the first node succeeds but the second node and/or the dual connectivity configuration are not accepted. The second reply message includes indication information, which is used to indicate that the first node and/or the dual connectivity configuration fail or fails. For specific indication information, reconfiguration failure/configuration failure or dual configuration reconfiguration failure/dual connectivity configuration failure may be used to indicate that the second node and/or the dual connectivity configuration are not accepted (comply with). Specifically, in a case of single connectivity (for example, the UE communicates with only one station) in the prior art, the UE communicates with the first node, and if the configuration of the first node is not accepted, the UE initiates a connection reestablishment procedure; or if the configuration of the first node is accepted, the UE sends an RRC connection reconfiguration complete message. Specifically, on the premise that the configuration of the first node is accepted, if the configuration of the second node and/or the dual connectivity configuration are not accepted, in the embodiments, an RRC connection reconfiguration complete message may be used to indicate the case in which the configuration of the second node and/or the dual connectivity configuration fail or fails. After receiving the RRC connection reconfiguration complete message, the first node knows that the configuration of the first node provided in the first message is configured successfully, then discovers that there is a configuration failure indication in the RRC connection reconfiguration complete message, and therefore, knows that the second node and/or the dual connectivity configuration fail or fails. During specific implementation of the foregoing solution, it may be further limited that on the premise that the first message further includes the configuration of the first node, provided that the configuration of the first node is not accepted, the UE initiates a connection reestablishment procedure; or if the configuration of the first node is accepted, the UE sends an RRC connection reconfiguration complete message. A configuration success or a configuration second node configuration failure and/or the dual connectivity configuration is indicated by using indication information in the RRC connection reconfiguration complete message. Certainly, there are many forms in which the second reply message is used to indicate that the configuration of the first node is accepted, but the configuration of the second node and/or the dual connectivity configuration are not accepted. For example, the second reply message used may not necessarily be an RRC connection reconfiguration complete message, or may be another RRC message; for example, another representation manner of indication information is used. The embodiments do not set a limitation.

Further, before the user terminal sends the second reply message to the first node, the user terminal further performs one or more of the following: triggering an RRC reestablishment procedure; releasing configurations of all Scells; deleting the configurations of all the Scells; releasing configurations of all secondary stations or second stations; deleting the configurations of all the secondary stations or the second stations; resetting MAC; or applying a basic configuration of a primary cell of the first node. For releasing the configurations of all the secondary cells (Secondary Cell) and deleting the configurations of all the Scells, the Scells may be cells related to the second node (which are, if the second node is an SeNB, the serving cells associated with the SeNB) or secondary cells related to the second node (which do not include a primary cell), where the cell provides a service for the user terminal.

Alternatively, the Scell may be the second node or a secondary cell that is of the second node and related to the first node, where the cell provides a service for the user terminal.

The user terminal releases a configuration/a dual connectivity configuration related to the SeNB. Performing, by the UE, the configuration related to the SeNB may be one or more of the following: reset MAC; release the SCell(s), if configured; release the secondary TAG(s), if configured; apply the default physical channel configuration; apply the default semi-persistent scheduling configuration; apply the default MAC main configuration; release reportProximityConfig and clear any associated proximity status reporting timer; release measSubframePatternPCell, if configured.

705*b*. After receiving the second reply message, the first node sends a third message to the second node.

The third message is used to indicate that the configuration fails or used to indicate that the UE does not accept the configuration.

The third message may include indication information. Specifically, for example, the third message includes one piece of indication information, which is used to indicate that the configuration succeeds or indicate that the UE accepts the configuration (for example, a representation method is any one of the following: reconfiguration failure/configuration failure, SeNB reconfiguration failure/SeNB configuration failure, and dual configuration reconfiguration failure/dual connectivity configuration failure).

Certainly, alternatively, the third message may not include indication information. For example, after receiving the message, the MeNB knows that the UE indicates that the configuration fails or is used to indicate that the UE does not accept the configuration.

Subsequent steps 705$c$ to rose are optional steps.

705$c$. After receiving the third message, the second node updates the configuration of the second node.

Specifically, after receiving the third message, the second node learns that the configuration fails or the UE does not accept the configuration, updates the configuration of the second node, and sends an updated configuration of the second node to the first node, so that a configuration is established for the user terminal.

Alternatively, after receiving the third message, the second node learns that the configuration fails or the UE does not accept the configuration, and releases a related configuration related to the UE. Specifically, releasing the related configuration related to the UE may include one or more of the following: reset MAC; release the SCell(s), if configured; release the secondary TAG(s), if configured; apply the default physical channel configuration; apply the default semi-persistent scheduling configuration; apply the default MAC main configuration; release reportProximityConfig and clear any associated proximity status reporting timer; release measSubframePatternPCell, if configured.

Alternatively, after receiving the third message, the second node learns that the configuration fails or the UE does not accept the configuration, and communicates with the UE by using an original old configuration.

705$d$. The first node receives a sixth message from the second node, where the sixth message includes an updated configuration provided by the second node.

705$e$. The first node generates a fourth message according to the updated configuration that is in the sixth message and provided by the second node, and sends the fourth message to the user terminal.

The fourth message includes at least the updated configuration provided by the second node.

Specifically, the first node generates the fourth message according to the updated configuration that is in the sixth message and provided by the second node, and sends the fourth message to the user terminal, so that the user terminal sends an RRC connection reestablishment complete message according to the updated configuration in the fourth message.

So far, the user terminal implements a solution 2 in which the user terminal performs configuration unsuccessfully with the second node and/or the first node according to the first message.

Figure 32:
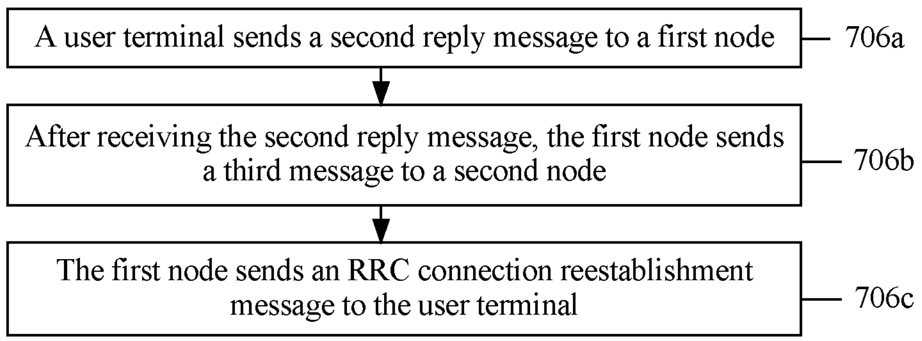
FIG. 32 is a schematic flowchart 12 of a method for transmitting a configuration message according to an embodiment.

Alternatively, as shown in FIG. 32, if the user terminal does not accept a configuration in the first message, there are steps 706$a$ to 706$c$.

706$a$. The user terminal sends a second reply message to the first node.

The second reply message may be an RRC connection reestablishment request message, and is used to indicate that the configuration fails or used to indicate that the UE does not accept the configuration.

Indicating that the configuration fails or being used to indicate that the UE does not accept the configuration specifically includes: indicating that the configuration in the first message is not accepted, that is, the configuration of the first node is not accepted, and the configuration of the second node and/or the dual connectivity configuration are not accepted; or indicating that the configuration of the first node is not accepted but the configuration of the second node and/or the dual connectivity configuration are accepted; or indicating that the configuration of the first node is not accepted, where whether the configuration of the second node and the dual connectivity configuration are configured successfully is respectively indicated by using two pieces of indication information.

In a case of single connectivity in the prior art, after receiving a configuration message of an eNB, if the configuration is not accepted, UE sends an RRC connection reestablishment request message, where the message includes one piece of indication information reconfiguration failure, which indicates a configuration failure/reconfiguration failure.

Specifically, an RRC connection reestablishment request message used in the embodiments includes indication information reconfiguration failure, which indicates that all configurations in the first message fail or that a configuration provided in the first message is not accepted.

Specifically, an RRC connection reestablishment request message used in embodiments includes indication information reconfiguration failure, which indicates an MeNB configuration failure. In addition, the message further includes indication information, which is used to indicate that the configuration of the second node and/or the dual connectivity configuration are configured unsuccessfully. Specifically, only one piece of indication information needs to be used to describe a configuration failure, which is specifically indicated by using either of the following: SeNB reconfiguration failure/SeNB configuration failure and dual configuration reconfiguration failure/dual connectivity configuration failure.

Specifically, an RRC connection reestablishment request message used in the embodiments includes indication information reconfiguration failure, which indicates an MeNB configuration failure. In addition, the message further includes indication information, which is used to indicate that the configuration of the second node and/or the dual connectivity configuration are configured successfully. Specifically, only one piece of indication information needs to be used to describe a configuration success, which is specifically indicated by using any one of the following: reconfiguration success, configuration success, SeNB reconfiguration success, SeNB configuration success, dual configuration reconfiguration success, and dual connectivity configuration success. Certainly, alternatively, two pieces of indication information may be used to describe whether the configuration of the second node succeeds and whether the dual connectivity configuration succeeds.

Further, before the user terminal sends the second reply message to the first node, the method further includes: releasing, by the user terminal, a configuration/a dual connectivity configuration related to the SeNB. Performing, by the UE, the configuration related to the SeNB may be one or more of the following: reset MAC; release the SCell(s), if configured; release the secondary TAG(s), if configured; apply the default physical channel configuration; apply the default semi-persistent scheduling configuration; apply the default MAC main configuration; release reportProximity- Config and clear any associated proximity status reporting timer; release measSubframePatternPCell, if configured.

Still further, when (or before or after) the user terminal sends the second reply message to the first node, the method further includes: releasing all configurations related to the SeNB (which is equivalent to a case of unilaterally deleting the SeNB, that is, a case in which a service of the SeNB is not accepted anymore/communication is not performed with the SeNB any more).

706*b*. After receiving the second reply message, the first node sends a third message to the second node.

The third message is used to indicate that the configuration fails or used to indicate that the UE does not accept the configuration. For the configuration failure indicated in the third message, the configuration may be the configuration of the second node and/or the dual connectivity configuration.

The third message may include indication information. Specifically, for example, the third message includes one piece of indication information, which is used to indicate that the configuration succeeds or indicate that the UE accepts the configuration (for example, a representation method is any one of the following: reconfiguration failure/configuration failure, SeNB reconfiguration failure/SeNB configuration failure, and dual configuration reconfiguration failure/dual connectivity configuration failure).

Certainly, alternatively, the third message may not include indication information. For example, after receiving the message, the MeNB knows that the UE indicates that the configuration fails or is used to indicate that the UE does not accept the configuration.

706*c*. The first node sends an RRC connection reestablishment message to the user terminal.

Specifically, after the first node receives the second reply message and sends the third message to the second node, the first node sends the RRC connection reestablishment message to the user terminal, so that the user terminal performs configuration with the second node again according to the RRC connection reestablishment message. Optionally, before the first node sends the RRC connection reestablishment message to the user terminal, the first node obtains an updated configuration from the second node, and provides the updated configuration for the user terminal.

So far, the user terminal implements a solution 3 in which the user terminal performs configuration unsuccessfully with the second node and/or the first node according to the first message.

Figure 33:
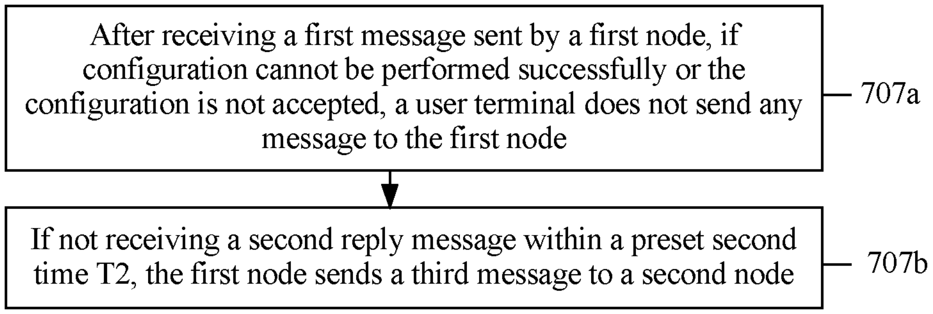
FIG. 33 is a schematic flowchart 13 of a method for transmitting a configuration message according to an embodiment.

Alternatively, as shown in FIG. 33, if the user terminal does not accept a configuration in the first message, there are steps 707*a* to 707*b*.

707*a*. After receiving the first message sent by the first node, if configuration cannot be performed successfully or the configuration is not accepted, the user terminal does not send any message to the first node.

Optionally, alternatively, the UE may start a timer T1 after receiving the first configuration message, and if within a time that is set on T1, configuration cannot be performed successfully or the configuration is not accepted, the UE does not send any message to the MeNB.

Optionally, the UE communicates with the SeNB by using an original old configuration (where a configuration in the first configuration message is a new configuration, and a configuration prior to the configuration in the first configuration message is an old configuration); or the UE releases a configuration related to the SeNB. Releasing the configuration related to the SeNB may be specifically one or more of the following: reset MAC; release the SCell(s), if configured; release the secondary TAG(s), if configured; apply the default physical channel configuration; apply the default semi-persistent scheduling configuration; apply the default MAC main configuration; release reportProximityConfig and clear any associated proximity status reporting timer; release measSubframePatternPCell, if configured.

707*b*. If not receiving a second reply message within a preset second time T2, the first node sends a third message to the second node.

The first node enables a timer 2 when sending the first message, and if not receiving the second reply message within the second time T2, determines that the terminal performs configuration unsuccessfully, and sends the third message to the second node.

The third message is used to indicate a configuration failure of the UE or used to indicate that the UE does not accept the configuration. For the configuration failure indicated in the third message, the configuration may be the configuration of the second node and/or the dual connectivity configuration.

So far, the user terminal implements a solution 4 in which the user terminal performs configuration unsuccessfully with the second node and/or the first node according to the first message.

This embodiment provides a method for transmitting a configuration message. A first message is received from a first node, where the first message includes at least a configuration of a second node and/or a dual connectivity configuration. A first reply message is sent to the first node if a configuration in the first message is accepted, so that the first node learns that a user terminal accepts the configuration; or a second reply message is sent to the first node if a configuration in the first message is not accepted, so that the first node learns that a user terminal does not accept the configuration; or no message is sent to the first node if a configuration in the first message is not accepted or the configuration cannot be completed. In the solution, information in a first message is received and configured, all possible configuration results are analyzed, and a first node and/or a second node are notified of the configuration results. Therefore, a process of transmitting a configuration message is efficiently completed.

Figure 34:
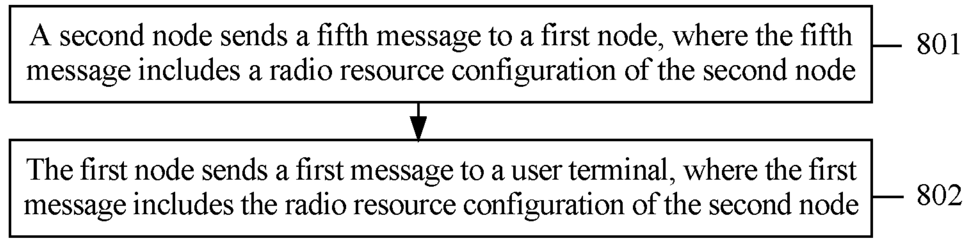
FIG. 34 is a schematic flowchart 14 of a method for transmitting a configuration message according to an embodiment.

As shown in FIG. 34, this embodiment provides a method for transmitting a configuration message, including.

801. A second node sends a fifth message to a first node, where the fifth message includes a radio resource configuration of the second node.

The radio resource configuration is used by the user terminal to access the second node or synchronize with the second node.

Specifically, in a process in which the user terminal performs configuration with the first node and/or the second node, the user terminal may initiate random access to the second node, so as to complete access of the user terminal to the second node. A random access procedure may be performed after the user terminal performs configuration successfully; or a random access procedure may start to be performed in the process in which the user terminal performs configuration.

802. The first node sends a first message to a user terminal, where the first message includes the radio resource configuration of the second node.

Further, the first message further includes one or more of a configuration of the first node, a configuration of the second node, or a dual connectivity configuration.

Figure 35:
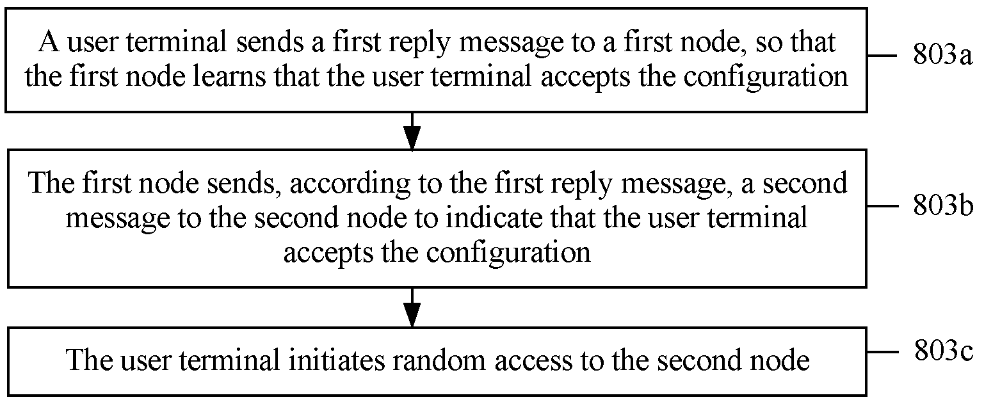
FIG. 35 is a schematic flowchart 15 of a method for transmitting a configuration message according to an embodiment.

In this case, as shown in FIG. 35, if the random access procedure of the user terminal and the configuration process of the user terminal are separately completed, steps 803*a* to 803*c* are included.

803*a*. The user terminal sends a first reply message to the first node, so that the first node learns that the user terminal accepts the configuration.

For sending the first reply message to the first node, so that the first node learns that the user terminal accepts the configuration, that the configuration is accepted may specifically include the following:

Optionally, that the configuration is accepted may be that all configurations in the first message are accepted.

Alternatively, specifically, when the message includes the configuration of the first node and the configuration of the second node and/or the dual connectivity configuration, in this embodiment, for an explanation related to a case in which the configuration is accepted or the configuration succeeds and an explanation related to a case in which the configuration is not accepted or the configuration fails, refer to content in steps 101 to 103 in Embodiment 7. Details are not described in subsequent steps in this embodiment.

803*b*. The first node sends, according to the first reply message, a second message to the second node to indicate that the user terminal accepts the configuration.

For a case in which the user terminal accepts the configuration, which is indicated in the second message, the configuration may be the configuration of the second node and/or the dual connectivity configuration. Specifically, that the configuration is accepted may be that the configuration of the second node and/or the dual connectivity configuration are accepted, the configuration of the second node is accepted but the dual connectivity configuration is not accepted, or the configuration of the second node is not accepted but the dual connectivity configuration is accepted.

803*c*. The user terminal initiates random access to the second node.

If the random access initiated by the user terminal to the second node succeeds, the user terminal sends a seventh message to the first node, so that the first node learns that the user terminal successfully accesses the second node; or if the random access initiated by the user terminal to the second node succeeds, the second node sends a seventh message to the first node, so that the first node learns that the user terminal successfully accesses the second node; or if the random access initiated by the user terminal to the second node fails, the user terminal sends a third reply message to the first node, so that the first node learns that the user terminal fails to access the second node; or if the random access initiated by the user terminal to the second node fails, the second node sends a third reply message to the first node, so that the first node learns that the user terminal fails to access the second node.

A solution in which the second node receives information about an access success or an access failure is a combination of the foregoing four possible solutions. For example, in a case of an access success, the first node receives an access indication sent by the second node, and in a case of an access failure, the first node receives an access failure indication sent by the user terminal. Alternatively, regardless of an access failure or success, the first node always receives a feedback sent by the user terminal. During specific implementation, examples are not listed one by one.

According to the foregoing possibilities, if the user terminal sends a message to the first node to indicate a failure in access to the second node, optionally, the first node may send a message to the second node to notify that the user terminal fails to access the second node or fails to access a cell of the second node.

According to the foregoing possibilities, if the user terminal sends a message to the first node to indicate a success in access to the second node, optionally, the first node may send a message to the second node to notify that the user terminal successfully accesses the second node.

Figure 36:
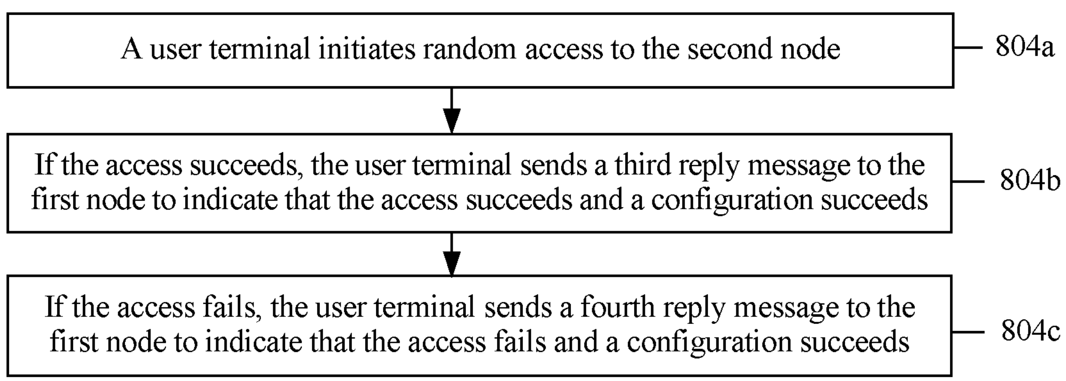
FIG. 36 is a schematic flowchart 16 of a method for transmitting a configuration message according to an embodiment.

In this case, as shown in FIG. 36, if the random access procedure of the user terminal and the configuration process of the user terminal are performed at the same time, steps 804*a* to 804*c* are included.

804*a*. The user terminal initiates random access to the second node.

Optionally, the user terminal determines, according to the first message, whether to accept a configuration in the first message.

The first message further includes one or more of the following: the configuration of the first node, the configuration of the second node, or the dual connectivity configuration.

804*b*. If the access succeeds, the user terminal sends a third reply message to the first node to indicate that the access succeeds and/or the configuration succeeds (alternatively, that the configuration succeeds may be indicated as that the configuration succeeds or fails).

The configuration success herein includes the following.

Optionally, the configuration success herein includes configuration successes of all configurations included in the first message.

Optionally, when the first message further includes the radio resource configuration and the configuration of the second node and/or the dual connectivity configuration, if the configuration of the second node and/or the dual connectivity configuration are accepted, a third reply message is sent to the first node to indicate that the configuration or the configurations succeeds or succeed. That the configuration or the configurations succeeds or succeed is specifically that both the configuration of the second node and the dual connectivity configuration are configured successfully or one of the configuration of the second node or the dual connectivity configuration is configured successfully.

Specifically, when the first message includes the configuration of the first node in addition to the configuration of the second node and/or the dual connectivity configuration, optionally, if the configuration of the first node is accepted, and the configuration of the second node and/or the dual connectivity configuration are accepted, a third reply message is sent to the first node to indicate that the configurations succeed.

Optionally, if the configuration of the first node is accepted, but the configuration of the second node and/or the dual connectivity configuration are not accepted, a third reply message is sent to the first node to indicate that the configuration of the first node is accepted but the configuration of the second node and/or the dual connectivity configuration are not accepted.

Optionally, when the first message includes the configuration of the second node and/or the dual connectivity configuration, if the configuration of the second node and/or the dual connectivity configuration are not accepted, a third reply message is sent to the first node to indicate that the configuration or the configurations fails or fail, where that the configuration or the configurations fails or fail is specifically that both the configuration of the second node and the dual connectivity configuration are configured unsuccessfully.

In addition, after the user terminal accesses the second node, optionally, after the user terminal accesses the second node, the first node receives a first reply message that is sent by the user terminal and indicates that the configuration succeeds. In addition, the first node further receives a message sent by the second node, where the message is used to indicate an access success of the user terminal.

Optionally, after the user terminal accesses the second node, the first node receives a first reply message that is sent by the user terminal and indicates that the access succeeds and the configuration succeeds. Optionally, in addition, the first node further receives a message sent by the second node, where the message is used to indicate an access success of the user terminal. Optionally, the first node sends a message to the second node to indicate an access success of the user terminal.

804*c*. If the access fails, the user terminal sends a fourth reply message to the first node to indicate that the access fails and/or the configuration succeeds (alternatively, that the configuration succeeds may be indicated as that the configuration succeeds or fails).

For a description of the configuration success in step 804*c*, reference may be made to explanation content of the configuration success in step 804*b*.

The third reply message may be an RRC reconfiguration complete message, and the fourth reply message may be an RRC reconfiguration complete message, or certainly, may be another message.

In addition, after the user terminal fails to access the second node, optionally, after the user terminal fails to access the second node, the first node receives a second reply message that is sent by the user terminal and indicates that the access fails and the configuration fails. In addition, the first node further receives a message sent by the second node, where the message is used to indicate an access failure of the user terminal.

Optionally, a second reply message that is sent by the user terminal and received by the first node after the user terminal fails to access the second node includes access failure indication information. Therefore, the first node knows that the terminal fails to access the second node, and knows that a configuration also fails. Therefore, this second reply message actually indicates that the access fails and the configuration fails.

Optionally, after the user terminal fails to access the second node, the first node receives a second reply message that is sent by the user terminal and indicates that a configuration fails. Optionally, in addition, the first node further receives a message sent by the second node, where the message is used to indicate an access failure of the user terminal.

Specifically, when (or before or after) the user terminal sends the fourth reply message to the first node, the method further includes one or more of the following: triggering an RRC reestablishment procedure; releasing the configuration of the second node and/or the dual connectivity configuration included in the first message; resetting the configuration of the second node and/or the dual connectivity configuration included in the first message; releasing a configuration related to the second node; deleting the configuration related to the second node; communicating with the second node by using a configuration before the first message is received; communicating with the first node by using the configuration before the first message is received; or communicating with the first node by using the configuration of the first node included in the first message.

Further, each of the first reply message to the fourth reply message includes success indication information and/or failure indication information; the success indication information includes at least one or more of the following: reconfiguration success, configuration success, SeNB reconfiguration success, SeNB configuration success, dual configuration reconfiguration success, dual connectivity configuration success, access success, or RACH success; and the failure indication information includes at least one or more of the following: reconfiguration failure, configuration failure, SeNB reconfiguration failure, SeNB configuration failure, dual configuration reconfiguration failure, dual connectivity configuration failure, access failure, or RACH failure.

There is one more possible solution different from solutions listed in step 804*c*: After failing to access the second node, the user terminal does not send any message, which is specifically described in the following:

Optionally, alternatively, the UE may start a timer T1 after receiving the first configuration message, and if access cannot succeed within a time that is set on T1, the UE does not send any message to an MeNB. Specifically, optionally, the UE communicates with an SeNB by using an original old configuration (where a configuration in the first configuration message is a new configuration, and a configuration prior to the configuration in the first configuration message is an old configuration); or the UE releases a configuration related to the SeNB. For specific content related to releasing of the configuration of the SeNB, refer to another embodiment.

Optionally, the first node enables a timer 2 when sending the first message, and if within a preset second time T2, the first node does not receive a message sent by the UE, the first node determines that access fails/a configuration fails.

Optionally, the second node sends a message to the first node to indicate an access failure of the terminal.

This embodiment=provides a method for transmitting a configuration message. A first message is received from a first node, where the first message includes at least a configuration of a second node and/or a dual connectivity configuration. A first reply message is sent to the first node if a configuration in the first message is accepted, so that the first node learns that a user terminal accepts the configuration; or a second reply message is sent to the first node if a configuration in the first message is not accepted, so that the first node learns that a user terminal does not accept the configuration; or no message is sent to the first node if a configuration in the first message is not accepted or the configuration cannot be completed. In the solution, information in a first message is received and configured, all possible configuration results are analyzed, and a first node and/or a second node are notified of the configuration results. Therefore, a process of transmitting a configuration message is efficiently completed.

In all the embodiments=, a configuration may be written as a reconfiguration, and a reconfiguration may be referred to as a configuration. For example, configuration information of a second node may be referred to as reconfiguration information of the second node, and a configuration success may be referred to as a reconfiguration success. Examples are not listed one by one. In conclusion, configuration may be written as (re)-configuration.

Various aspects are described in this specification with reference to a terminal and/or a base station and/or a base station controller.

The user equipment may be a wireless terminal or may be a wired terminal. The wireless terminal may refer to a device that provides voice and/or data connectivity for a user, a handheld device with a radio connection function, or another processing device connected to a radio modem. The wireless terminal may communicate with one or more core networks by using a radio access network (RAN). The wireless terminal may be a mobile terminal such as a mobile phone (or referred to as a "cellular" phone) or a computer with a mobile terminal, for example, may be a portable, pocket-sized, handheld, computer built-in, or in-vehicle mobile apparatus, which exchanges voice and/or data with the radio access network, and which is, for example, a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, user equipment, or a user apparatus.

The base station (for example, an access point) may refer to a device that is in an access network and communicates, over an air interface, with the wireless terminal by using one or more sectors. The base station may be configured to mutually convert a received over-the-air frame and an IP packet and serve as a router between the wireless terminal and a rest portion of the access network, where the rest portion of the access network may include an Internet Protocol (IP) network. The base station may further coordinate attribute management of the air interface. For example, the base station may be a base transceiver station (BTS) in GSM or CDMA, or may be a NodeB in WCDMA, or may be an evolved NodeB in LTE, which is not limited in the embodiments.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of embodiments essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the embodiments. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the embodiments, but are not intended to limit the protection scope of the embodiments. Any variation or replacement readily figured out by a person skilled in the art within the technical scope disclosed in the embodiments shall fall within the protection scope of the embodiments. Therefore, the protection scope of the embodiments shall be subject to the protection scope of the claims.

What is claimed is:

1. A user terminal, comprising:

a storage medium including executable instructions;

and a processor;

wherein the executable instructions, when executed by the processor, cause the user terminal to:

receive a first message from a first node, wherein the first message comprises a configuration of a second node;

send a first reply message to the first node indicating that the user terminal accepts the configuration in the first message, wherein the first reply message triggers the first node to send a second message to the second node indicating that the user terminal accepts the configuration in the first message;

initiate random access to the second node; and in response to the random access failing, send a second reply message to the first node indicating that the user terminal fails to access the second node, wherein the second reply message triggers the first node to send a third message to the second node indicating that the user terminal fails to access the second node.

2. A method, comprising:

receiving, by a user terminal, a first message from a first node, wherein the first message comprises a configuration of a second node;

sending, by the user terminal, a first reply message to the first node indicating that the user terminal accepts the configuration in the first message, wherein the first reply message triggers the first node to send a second message to the second node indicating that the user terminal accepts the configuration in the first message;

initiating, by the user terminal, random access to the second node; and in response to the random access failing, sending, by the user terminal, a second reply message to the first node indicating that the user terminal fails to access the second node, wherein the second reply message triggers the first node to send a third message to the second node indicating that the user terminal fails to access the second node.

3. A first node, comprising:

a storage medium including executable instructions; and a processor;

wherein the executable instructions, when executed by the processor, cause the first node to:

send a first message to a user terminal, wherein the first message comprises a configuration of a second node;

receive a first reply message from the user terminal, wherein the first reply message indicates that the user terminal accepts a configuration in the first message;

send, according to the first reply message, a second message to the second node indicating that the user terminal accepts the configuration in the first message;

receive a second reply message from the user terminal, wherein the second reply message indicates that the user terminal fails to access the second node; and send, according to the second reply message, a third message to the second node indicating that the user terminal fails to access the second node.

4. The first node according to claim 3, wherein the first message comprises a radio resource configuration of the second node, and the radio resource configuration enables the user terminal to access the second node.

5. The first node according to claim 3, wherein before sending the first message to the user terminal, the executable instructions, when executed by the processor, cause the first node to:

receive a fourth message from the second node, wherein the fourth message comprises the configuration of the second node.

6. A second node, comprising:

a storage medium including executable instructions; and a processor;

wherein the executable instructions, when executed by the processor, cause the second node to:

send a first message to a first node, wherein the first message comprises a configuration of a second node;

receive a second message from the first node, wherein the second message indicates that a user terminal accepts a configuration in the first message; and receive a third message from the first node, wherein the third message indicates that the user terminal fails to access the second node.

7. The second node according to claim 6, wherein the first message further comprises a radio resource configuration of the second node, and wherein the radio resource configuration enables the user terminal to access the second node or to synchronize with the second node.

8. A method, comprising:

receiving, by a user terminal, a first message from a first node, wherein the first message comprises a configuration of a second node;

sending, by the user terminal, a first reply message to the first node indicating that the user terminal accepts the configuration in the first message, wherein the first message triggers the first node to send a second message to the second node indicating that the user terminal accepts the configuration in the first message;

initiating, by the user terminal, random access to the second node; and in response to the random access failing, sending, by the user terminal, a second reply message to the first node indicating that the user terminal fails to access the second node, wherein the second reply message triggers the first node to send a third message to the second node indicating that the user terminal fails to access the second node.

9. The method according to claim 8, wherein the first message further comprises radio resource configuration of the second node, and the radio resource configuration triggers the user terminal to access the second node.

10. A method, comprising:

sending, by a first node, a first message to a user terminal, wherein the first message comprises a configuration of a second node;

receiving, by the first node, a first reply message from the user terminal, wherein the first reply message indicates that the user terminal accepts a configuration in the first message;

send, according to the first reply message, a second message to the second node indicating that the user terminal accepts the configuration in the first message;

receiving, by the first node, a second reply message from the user terminal, wherein the second reply message indicates that the user terminal fails to access the second node; and send, according to the second reply message, a third message to the second node indicating that the user terminal fails to access the second node.

11. The method according to claim 10, wherein the first message comprises a radio resource configuration of the second node, and the radio resource configuration triggers the user terminal to access the second node.

12. The method according to claim 10, wherein before sending the first message to the user terminal, the method further comprises:

receiving, by the first node, a fourth message from the second node, wherein the fourth message comprises the configuration of the second node.

13. A method, comprising:

sending, by a second node, a fourth message to a first node, wherein the fourth message comprises a configuration of a second node;

receiving, by the second node, a second message from the first node, wherein the second message indicates that a user terminal accepts the configuration in a first message; and receiving, by the second node, a third message from the first node, wherein the third message indicates that the user terminal fails to access the second node.

14. The method according to claim 13, wherein the first message further comprises a radio resource configuration of the second node, and wherein the radio resource configuration triggers the user terminal to access the second node or to synchronize with the second node.

* * * * *

UNITED STATES PATENT AND TRADEMARK OFFICE

CERTIFICATE OF CORRECTION

PATENT NO. : 10,904,815 B2
APPLICATION NO. : 15/222600
DATED : January 26, 2021
INVENTOR(S) : Liangliang Zhang et al.

It is certified that error appears in the above-identified patent and that said Letters Patent is hereby corrected as shown below:

In the Claims

In Column 100, Lines 1 and 2, Claim 8, delete "first message" and insert --first reply message--.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*